United States Patent
Risley et al.

(10) Patent No.: US 11,694,684 B1
(45) Date of Patent: Jul. 4, 2023

(54) GENERATION OF COMPUTING FUNCTIONALITY USING DEVICES

(71) Applicant: Amazon Technologies, Inc., Seattle, WA (US)

(72) Inventors: Michael Risley, San Francisco, CA (US); Daniel Jeffrey Wilday, Seattle, WA (US); Sche I. Wang, Pasadena, CA (US); Alex Carter, El Cerrito, CA (US)

(73) Assignee: Amazon Technologies, Inc., Seattle, WA (US)

( * ) Notice: Subject to any disclaimer, the term of this patent is extended or adjusted under 35 U.S.C. 154(b) by 117 days.

(21) Appl. No.: 17/094,076

(22) Filed: Nov. 10, 2020

(51) Int. Cl.
| | |
|---|---|
| G10L 15/00 | (2013.01) |
| G10L 15/22 | (2006.01) |
| G10L 15/02 | (2006.01) |
| G10L 15/06 | (2013.01) |
| G10L 15/08 | (2006.01) |

(52) U.S. Cl.
CPC .............. G10L 15/22 (2013.01); G10L 15/02 (2013.01); *G10L 15/063* (2013.01); *G10L 15/08* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,499,146 B2 * | 12/2019 | Lang | .................... | H04R 29/007 |
| 11,315,554 B2 * | 4/2022 | Bhattacharya | ........ | H04L 65/403 |

* cited by examiner

*Primary Examiner* — Vu B Hang
(74) *Attorney, Agent, or Firm* — Pierce Atwood LLP

(57) ABSTRACT

Techniques for generating a skill using skill portion device-skill portion devices are described. A user generates a skill by connecting skill portion deviceskill portion devices in a particular manner. As devices are connected, a speech controllable device or a distributed system may maintain a data structure representing a skill configuration corresponding to the presently connected devices.

18 Claims, 38 Drawing Sheets

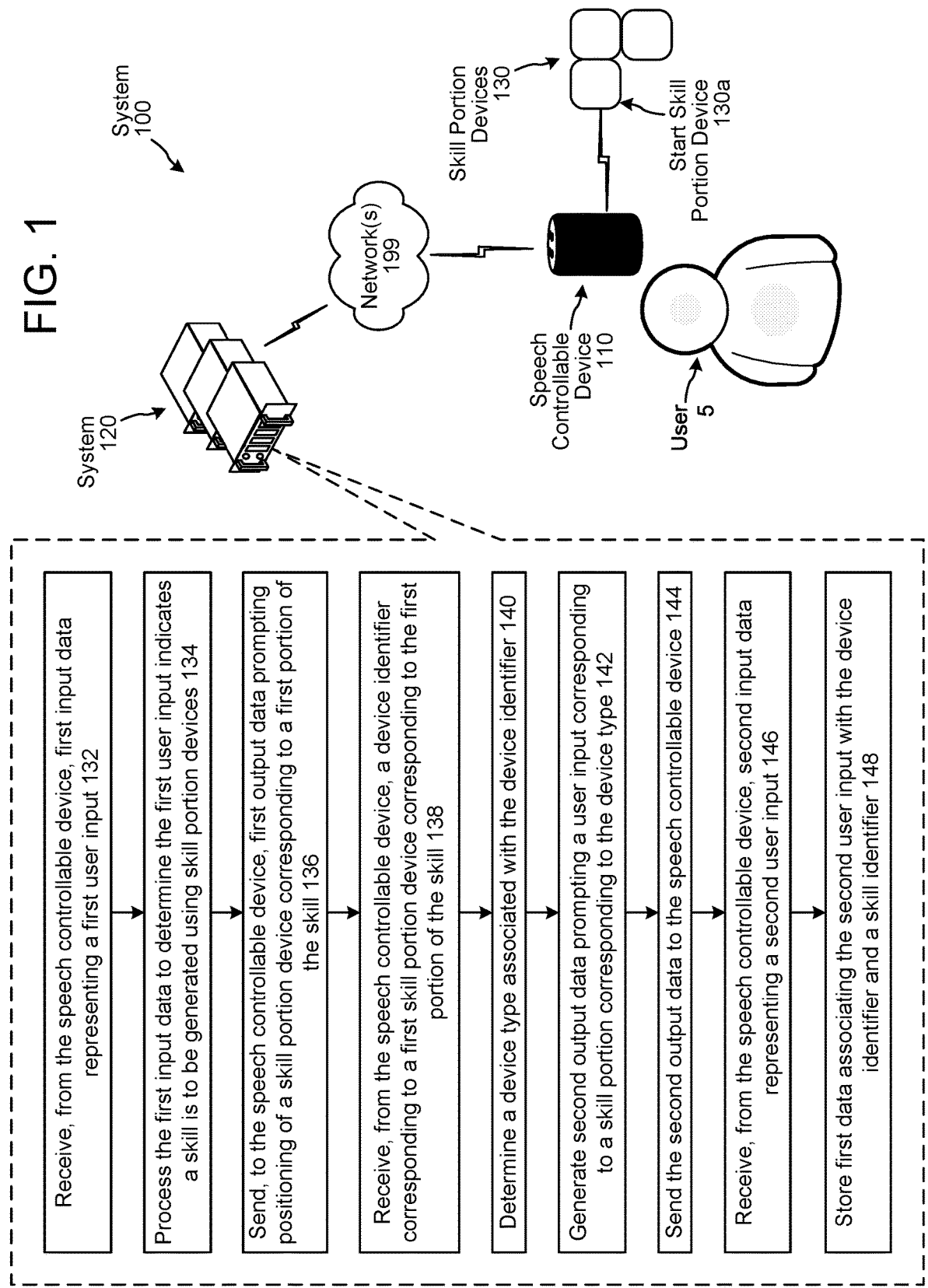

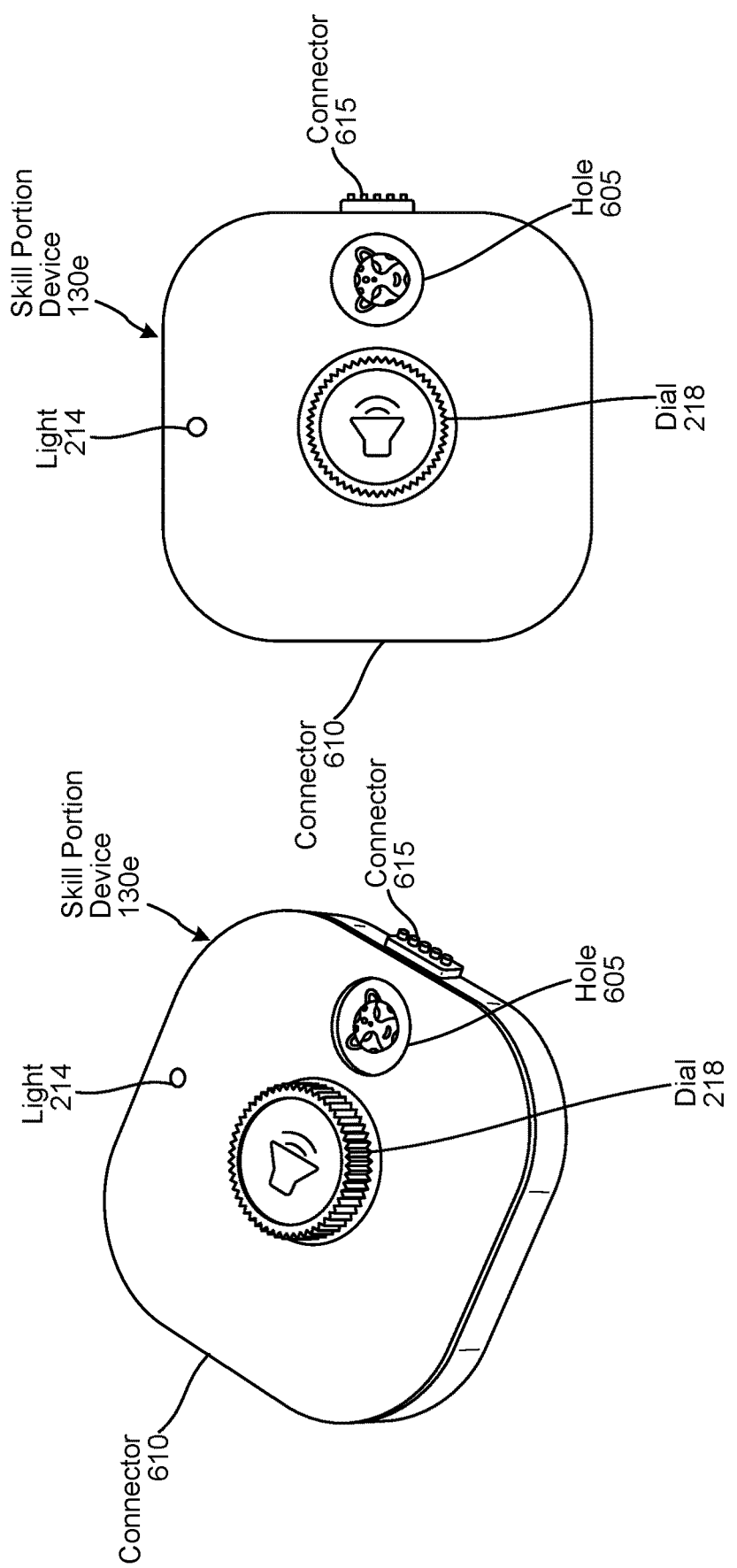

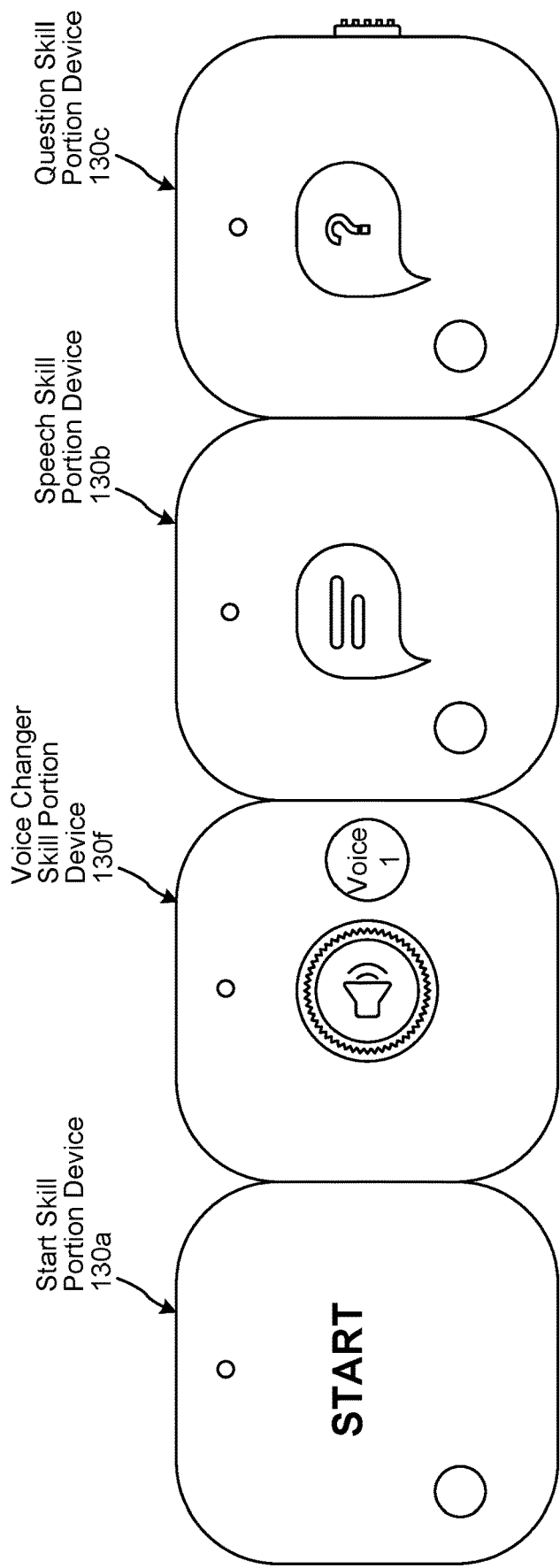

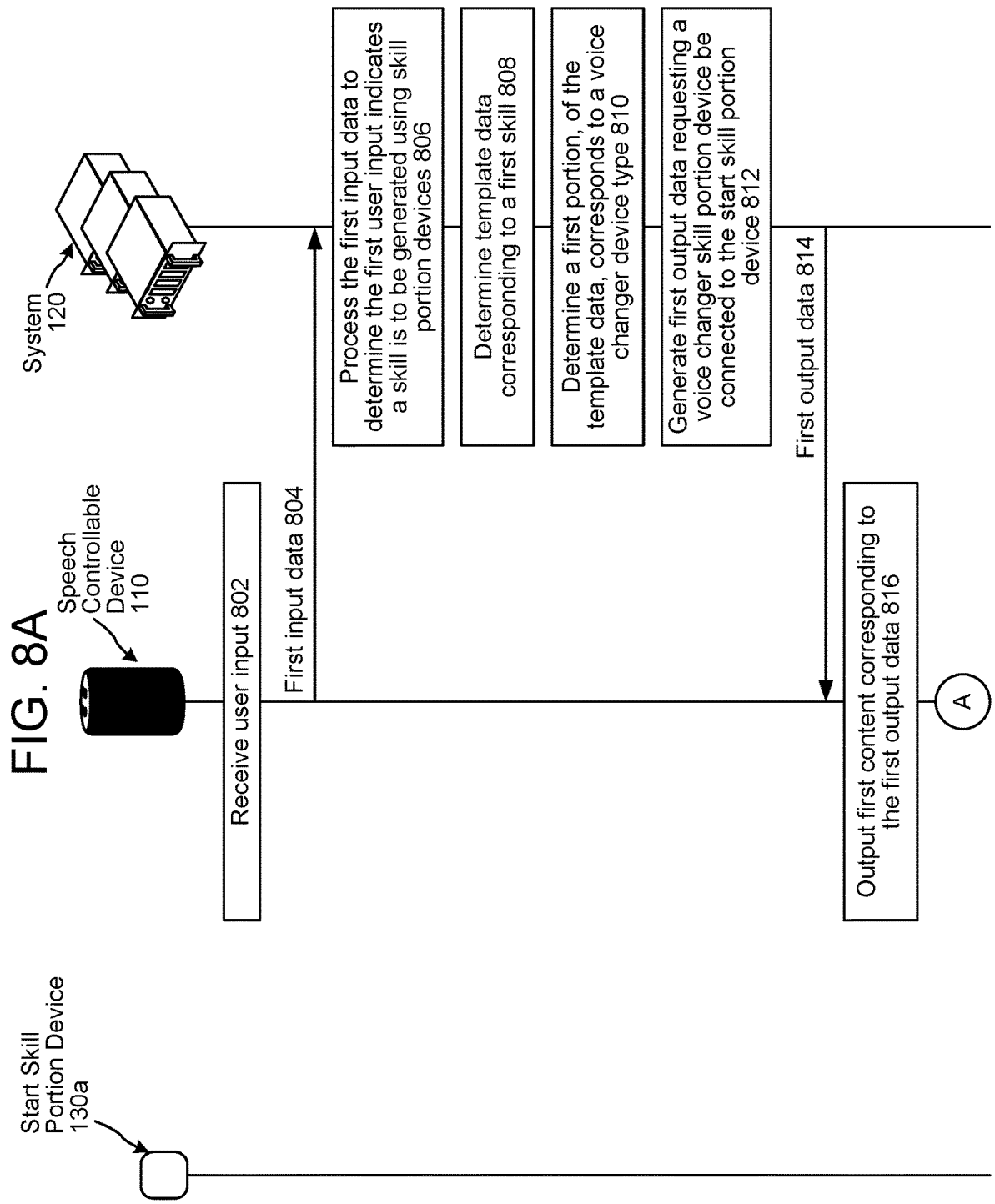

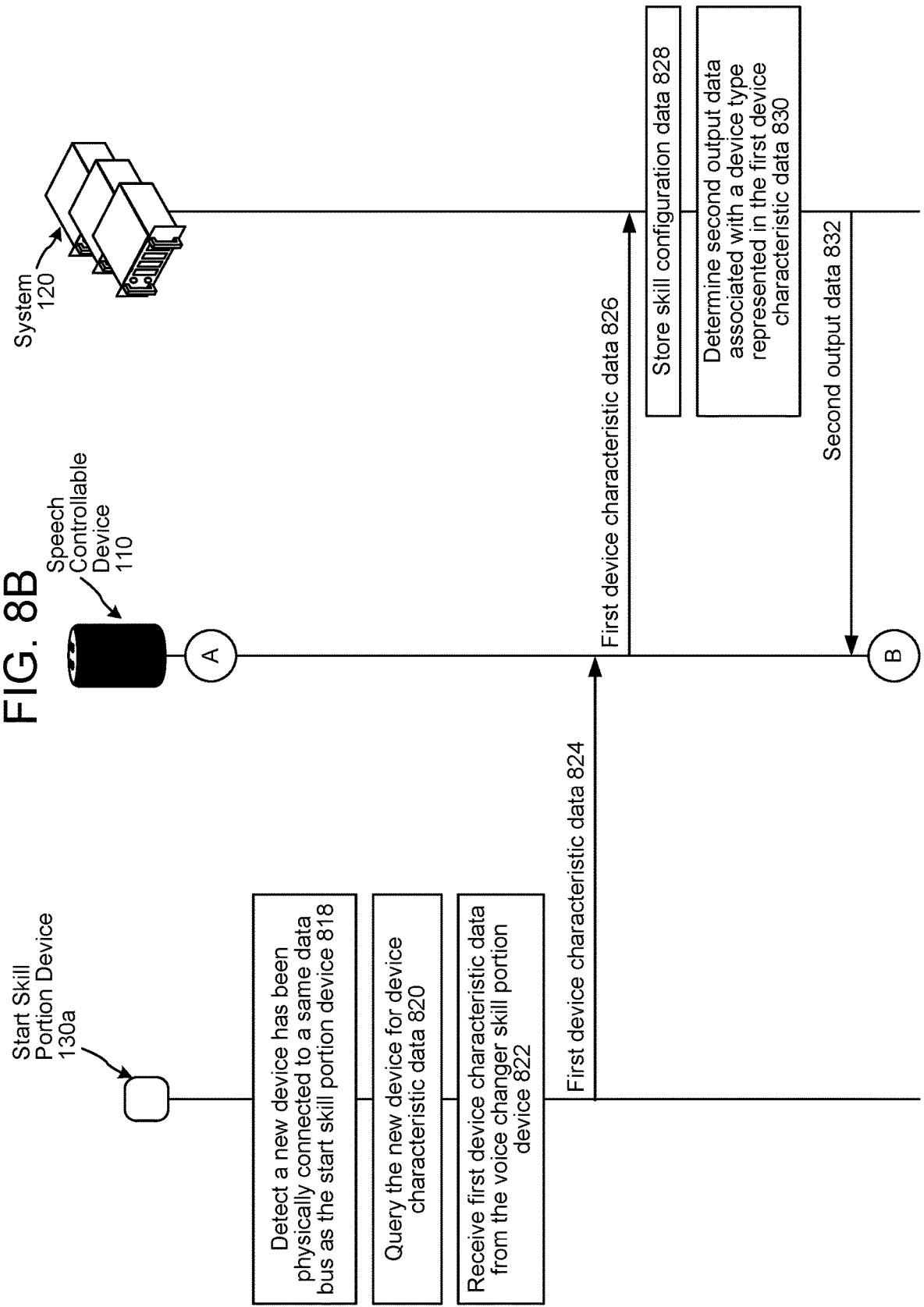

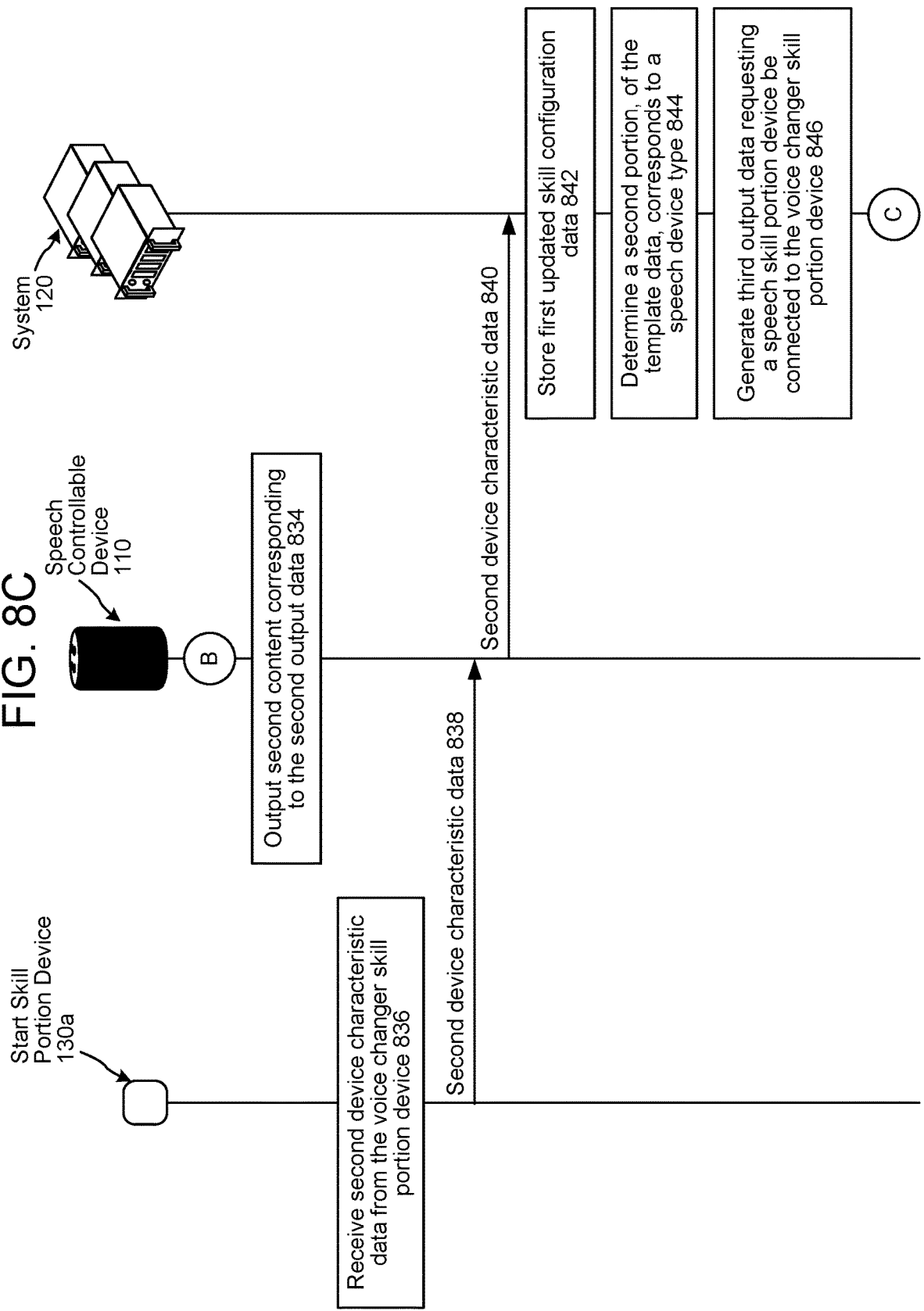

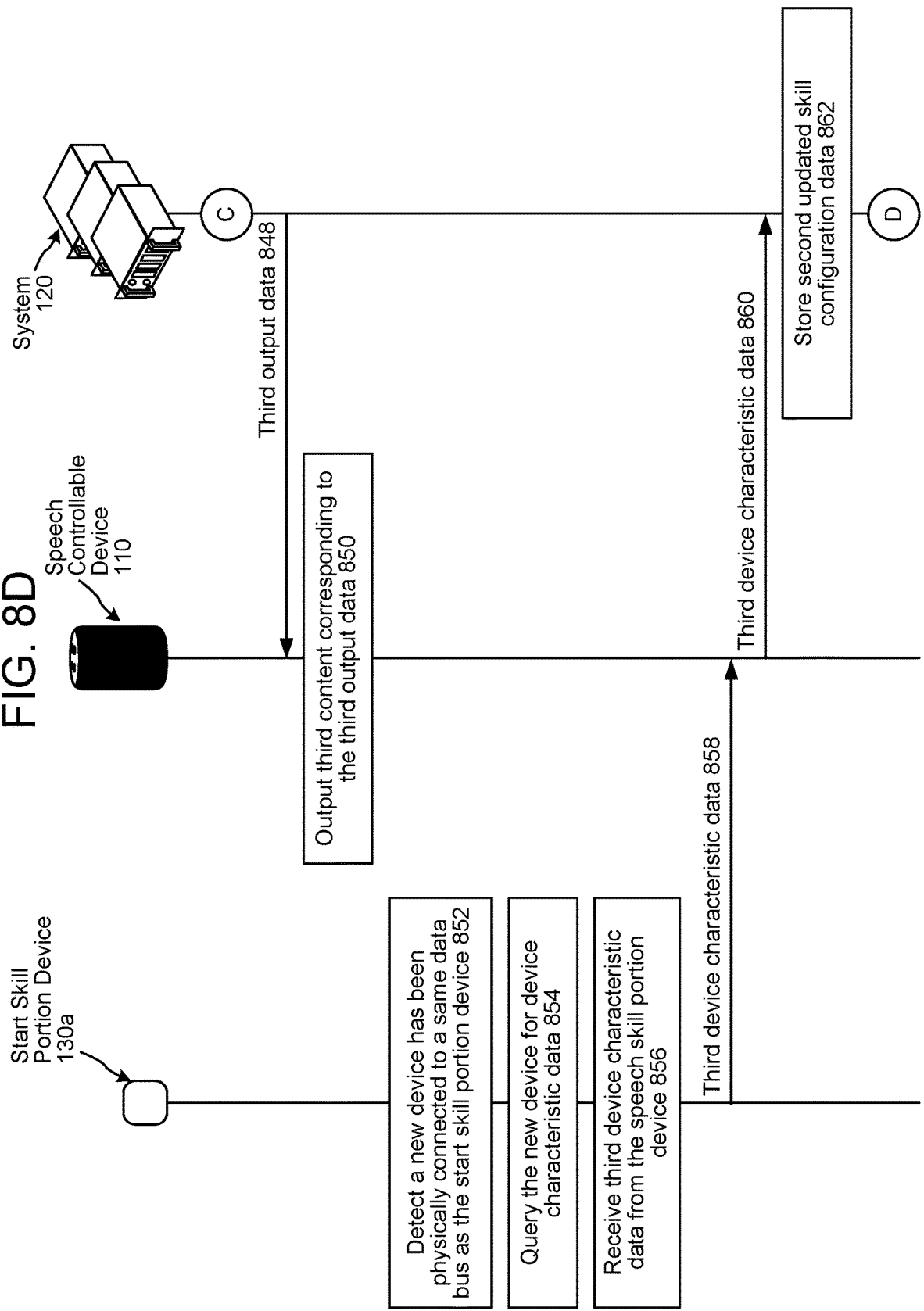

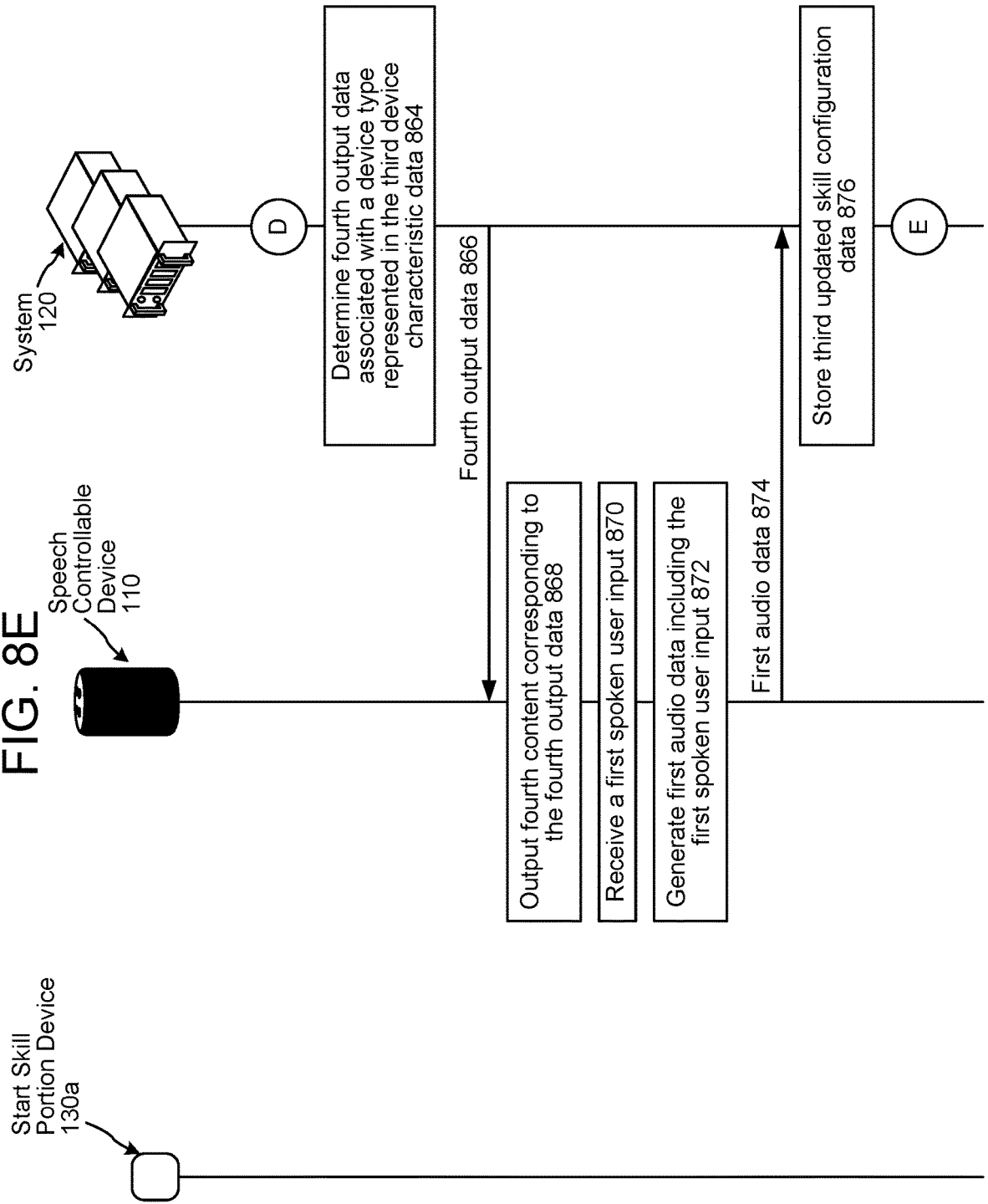

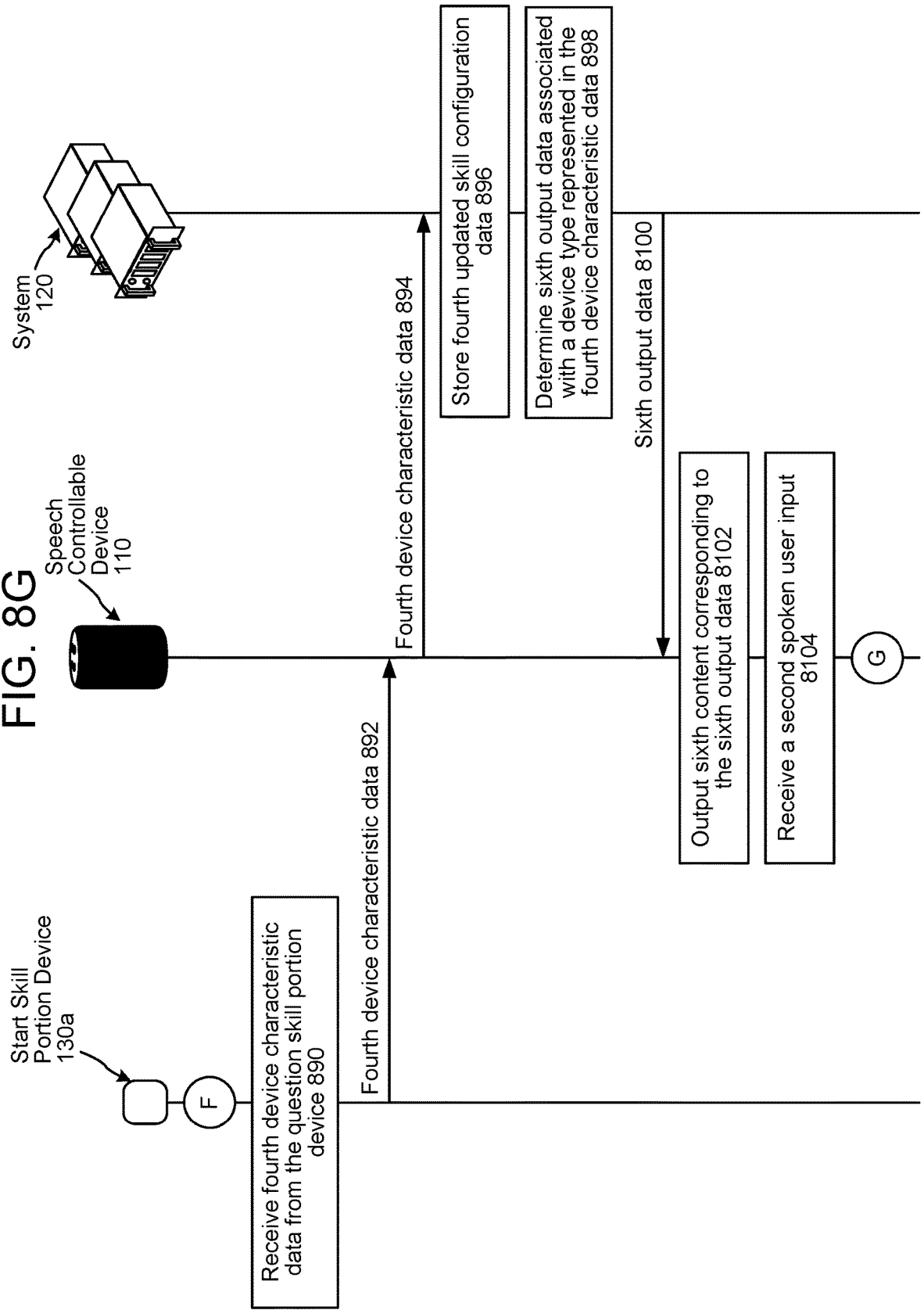

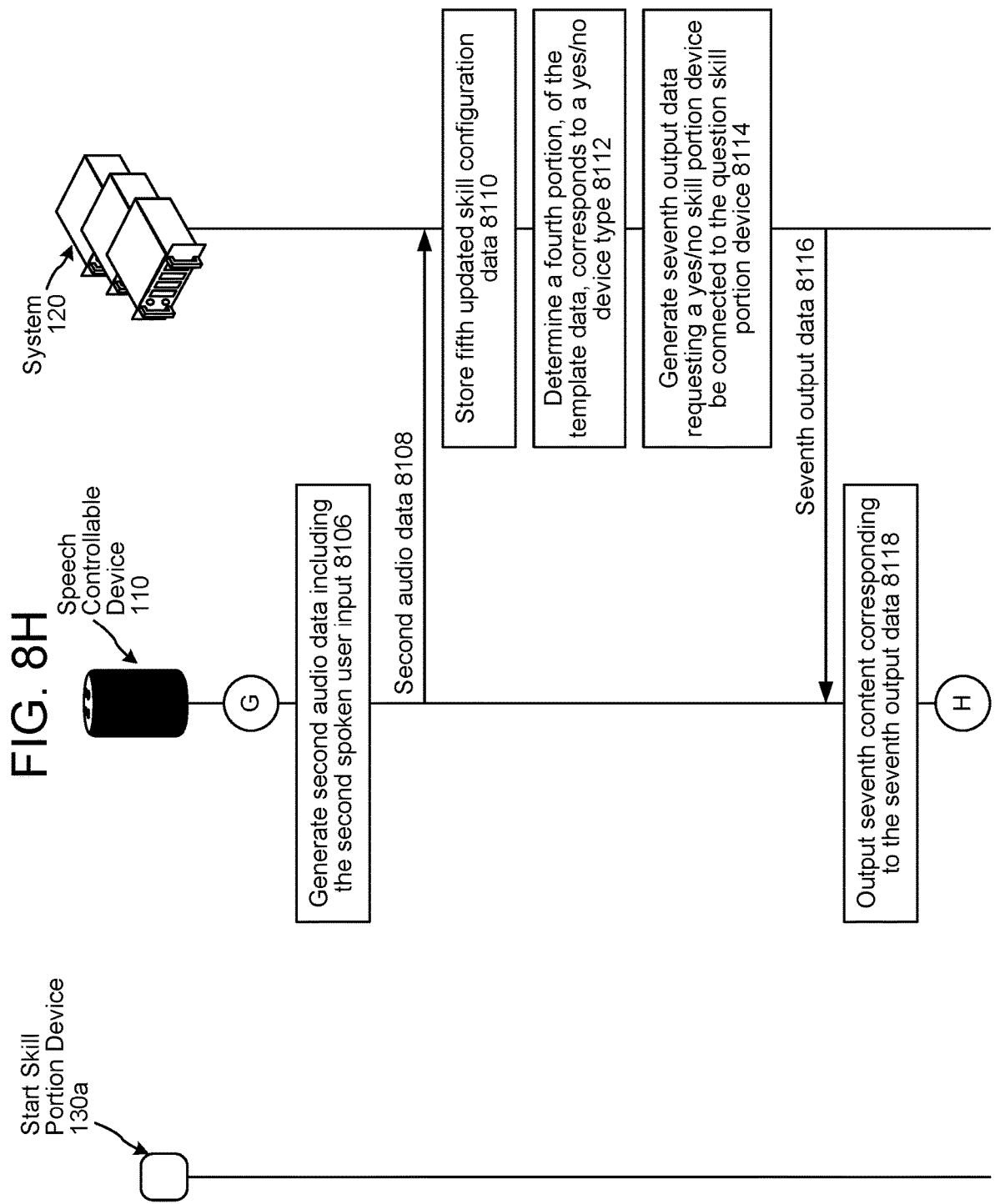

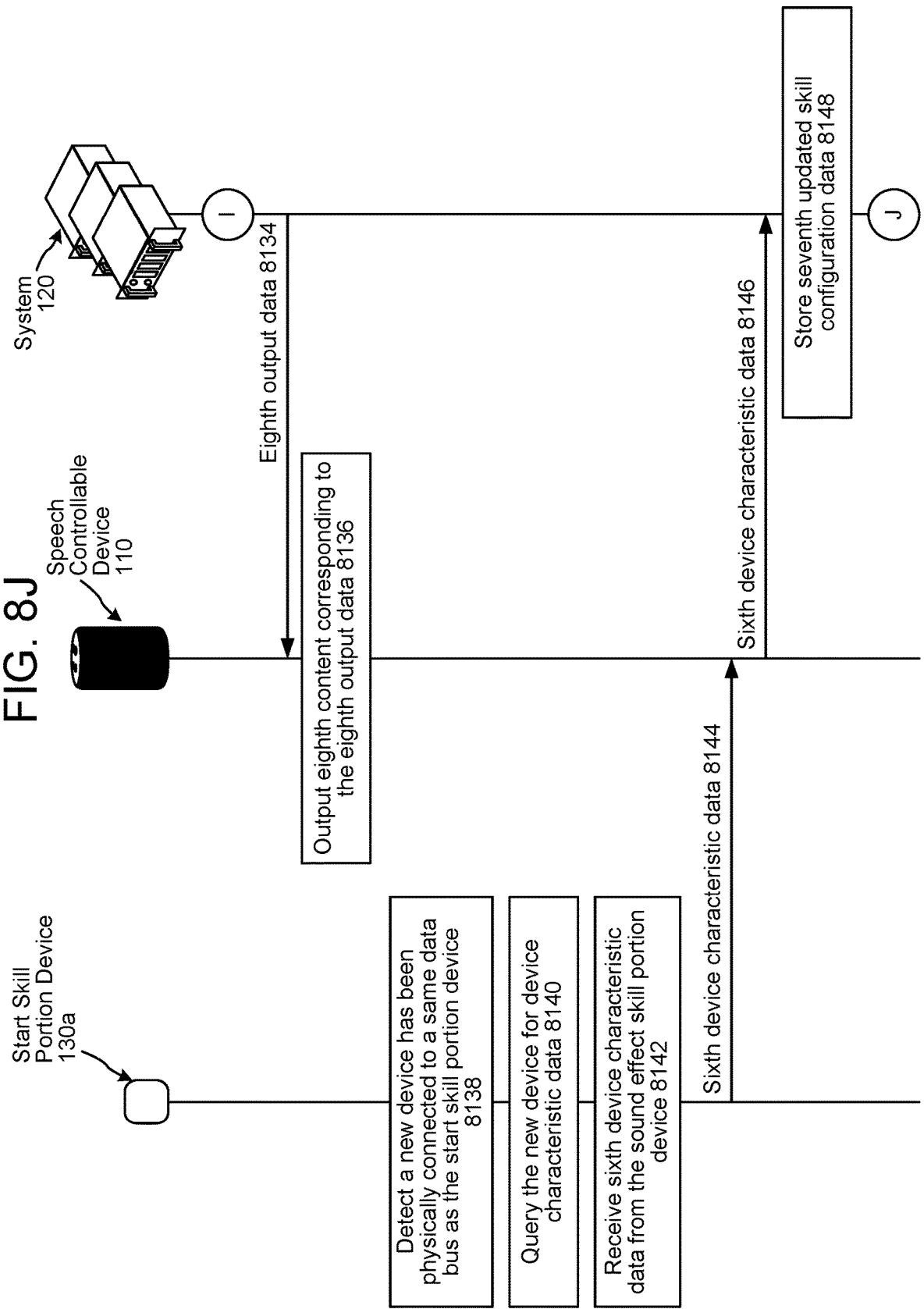

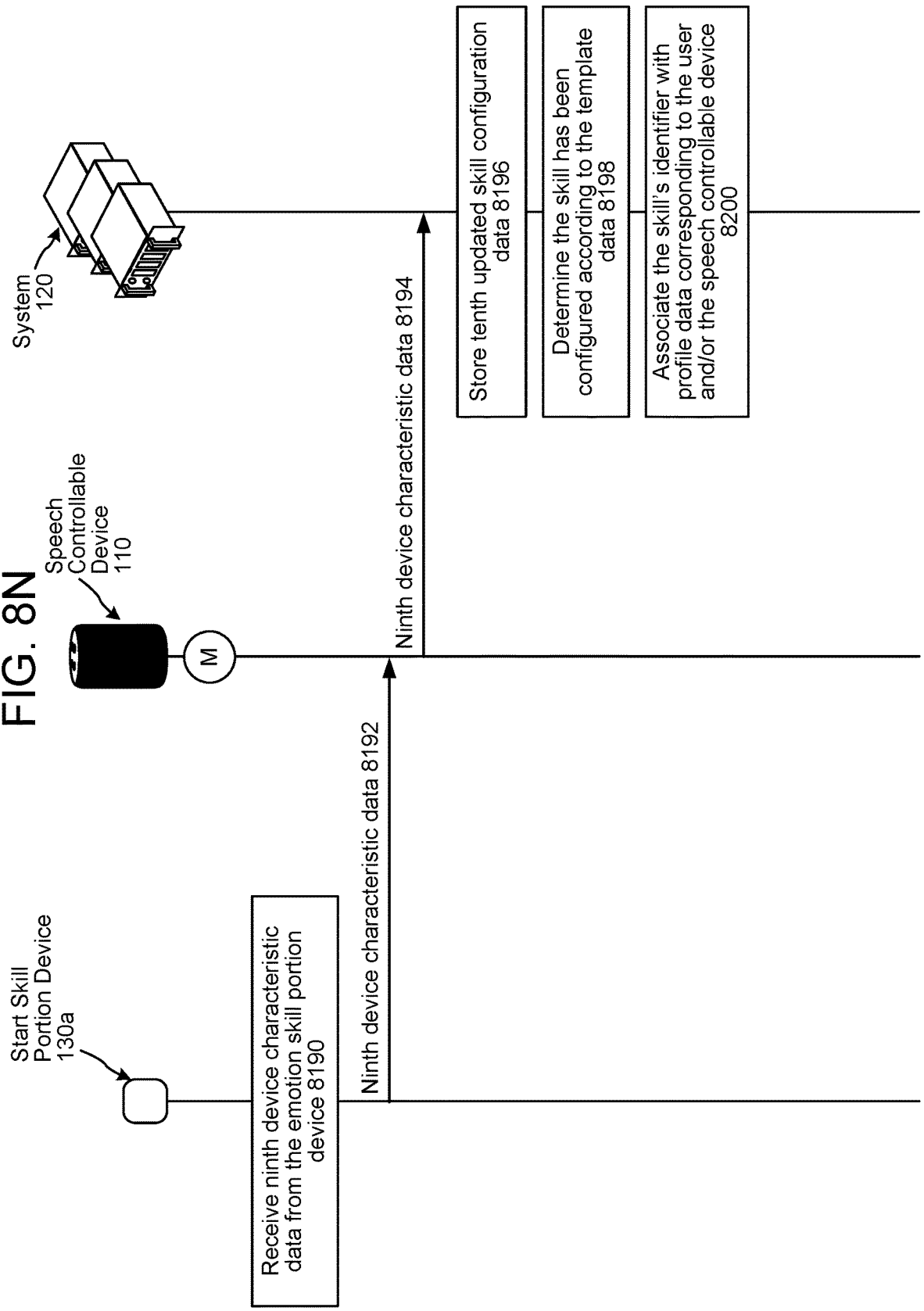

Skill id: [skill identifier]
Device id: [voice changer skill portion device identifier]
    Type: voice changer
    Input_east: null
    Input_west: [start skill portion device identifier]

FIG. 9A

Skill id: [skill identifier]
Device id: [voice changer skill portion device identifier]
    Type: voice changer
    Input_east: null
    Input_west: [start skill portion device identifier]
    Position: [position of dial]

FIG. 9B

Skill id: [skill identifier]
Device id: [voice changer skill portion device identifier]
    Type: voice changer
    Input_east: [speech skill portion device identifier]
    Input_west: [start skill portion device identifier]
    Position: [position of dial]
Device id: [speech skill portion device identifier]
    Type: speech
    Input_east: null
    Input_west: [voice changer skill portion device identifier]

FIG. 9C

Skill id: [skill identifier]
Device id: [voice changer skill portion device identifier]
    Type: voice changer
    Input_east: [speech skill portion device identifier]
    Input_west: [start skill portion device identifier]
    Position: [position of dial]
Device id: [speech skill portion device identifier]
    Type: speech
    Input_east: null
    Input_west: [voice changer skill portion device identifier]
    Speech data id: [stored data identifier]

FIG. 9D

Skill id: [skill identifier]
Device id: [voice changer skill portion device identifier]
    Type: voice changer
    Input_east: [speech skill portion device identifier]
    Input_west: [start skill portion device identifier]
    Position: [position of dial]
Device id: [speech skill portion device identifier]
    Type: speech
    Input_east: [question skill portion device identifier]
    Input_west: [voice changer skill portion device identifier]
    Speech data id: [stored data identifier]
Device id: [question skill portion device identifier]
    Type: question
    Input_east: null
    Input_west: [speech skill portion device identifier]

FIG. 9E

Skill id: [skill identifier]
Device id: [voice changer skill portion device identifier]
    Type: voice changer
    Input_east: [speech skill portion device identifier]
    Input_west: [start skill portion device identifier]
    Position: [position of dial]
Device id: [speech skill portion device identifier]
    Type: speech
    Input_east: [question skill portion device identifier]
    Input_west: [voice changer skill portion device identifier]
    Speech data id: [stored data identifier]
Device id: [question skill portion device identifier]
    Type: question
    Input_east: null
    Input_west: [speech skill portion device identifier]
    Question data id: [stored data identifier]

Skill id: [skill identifier]
Device id: [voice changer skill portion device identifier]
　　　Type: voice changer
　　　Input_east: [speech skill portion device identifier]
　　　Input_west: [start skill portion device identifier]
　　　Position: [position of dial]
Device id: [speech skill portion device identifier]
　　　Type: speech
　　　Input_east: [question skill portion device identifier]
　　　Input_west: [voice changer skill portion device identifier]
　　　Speech data id: [stored data identifier]
Device id: [question skill portion device identifier]
　　　Type: question
　　　Input_east: [yes/no skill portion device identifier]
　　　Input_west: [speech skill portion device identifier]
　　　Question data id: [stored data identifier]
Device id: [yes/no skill portion device identifier]
　　　Type: yes/no
　　　Input_north: null
　　　Input_west: [question skill portion device identifier]
　　　Input_south: null

FIG. 9H

Skill id: [skill identifier]
Device id: [voice changer skill portion device identifier]
    Type: voice changer
    Input_east: [speech skill portion device identifier]
    Input_west: [start skill portion device identifier]
    Position: [position of dial]
Device id: [speech skill portion device identifier]
    Type: speech
    Input_east: [question skill portion device identifier]
    Input_west: [voice changer skill portion device identifier]
    Speech data id: [stored data identifier]
Device id: [question skill portion device identifier]
    Type: question
    Input_east: [yes/no skill portion device identifier]
    Input_west: [speech skill portion device identifier]
    Question data id: [stored data identifier]
Device id: [yes/no skill portion device identifier]
    Type: yes/no
    Input_north: [sound effect skill portion device identifier]
    Input_west: [question skill portion device identifier]
    Input_south: null
Device id: [sound effect skill portion device identifier]
    Type: sound effect
    Input_east: null
    Input_west: [yes/no skill portion device identifier]

FIG. 91

Skill id: [skill identifier]
Device id: [voice changer skill portion device identifier]
    Type: voice changer
    Input_east: [speech skill portion device identifier]
    Input_west: [start skill portion device identifier]
    Position: [position of dial]
Device id: [speech skill portion device identifier]
    Type: speech
    Input_east: [question skill portion device identifier]
    Input_west: [voice changer skill portion device identifier]
    Speech data id: [stored data identifier]
Device id: [question skill portion device identifier]
    Type: question
    Input_east: [yes/no skill portion device identifier]
    Input_west: [speech skill portion device identifier]
    Question data id: [stored data identifier]
Device id: [yes/no skill portion device identifier]
    Type: yes/no
    Input_north: [sound effect skill portion device identifier]
    Input_west: [question skill portion device identifier]
    Input_south: null
Device id: [sound effect skill portion device identifier]
    Type: sound effect
    Input_east: null
    Input_west: [yes/no skill portion device identifier]
    Position: [position of dial]

FIG. 9J

Skill id: [skill identifier]
Device id: [voice changer skill portion device identifier]
    Type: voice changer
    Input_east: [speech skill portion device identifier]
    Input_west: [start skill portion device identifier]
    Position: [position of dial]
Device id: [speech skill portion device identifier]
    Type: speech
    Input_east: [question skill portion device identifier]
    Input_west: [voice changer skill portion device identifier]
    Speech data id: [stored data identifier]
Device id: [question skill portion device identifier]
    Type: question
    Input_east: [yes/no skill portion device identifier]
    Input_west: [speech skill portion device identifier]
    Question data id: [stored data identifier]
Device id: [yes/no skill portion device identifier]
    Type: yes/no
    Input_north: [sound effect skill portion device identifier]
    Input_west: [question skill portion device identifier]
    Input_south: [emotion skill portion device identifier]
Device id: [sound effect skill portion device identifier]
    Type: sound effect
    Input_east: null
    Input_west: [yes/no skill portion device identifier]
    Position: [position of dial]
Device id: [emotion skill portion device identifier]
    Type: sound effect
    Input_east: null
    Input_west: [yes/no skill portion device identifier]

FIG. 9K

Skill id: [skill identifier]
Device id: [voice changer skill portion device identifier]
    Type: voice changer
    Input_east: [speech skill portion device identifier]
    Input_west: [start skill portion device identifier]
    Position: [position of dial]
Device id: [speech skill portion device identifier]
    Type: speech
    Input_east: [question skill portion device identifier]
    Input_west: [voice changer skill portion device identifier]
    Speech data id: [stored data identifier]
Device id: [question skill portion device identifier]
    Type: question
    Input_east: [yes/no skill portion device identifier]
    Input_west: [speech skill portion device identifier]
    Question data id: [stored data identifier]
Device id: [yes/no skill portion device identifier]
    Type: yes/no
    Input_north: [sound effect skill portion device identifier]
    Input_west: [question skill portion device identifier]
    Input_south: [emotion skill portion device identifier]
Device id: [sound effect skill portion device identifier]
    Type: sound effect
    Input_east: null
    Input_west: [yes/no skill portion device identifier]
    Position: [position of dial]
Device id: [emotion skill portion device identifier]
    Type: sound effect
    Input_east: null
    Input_west: [yes/no skill portion device identifier]
    Position: [position of dial]

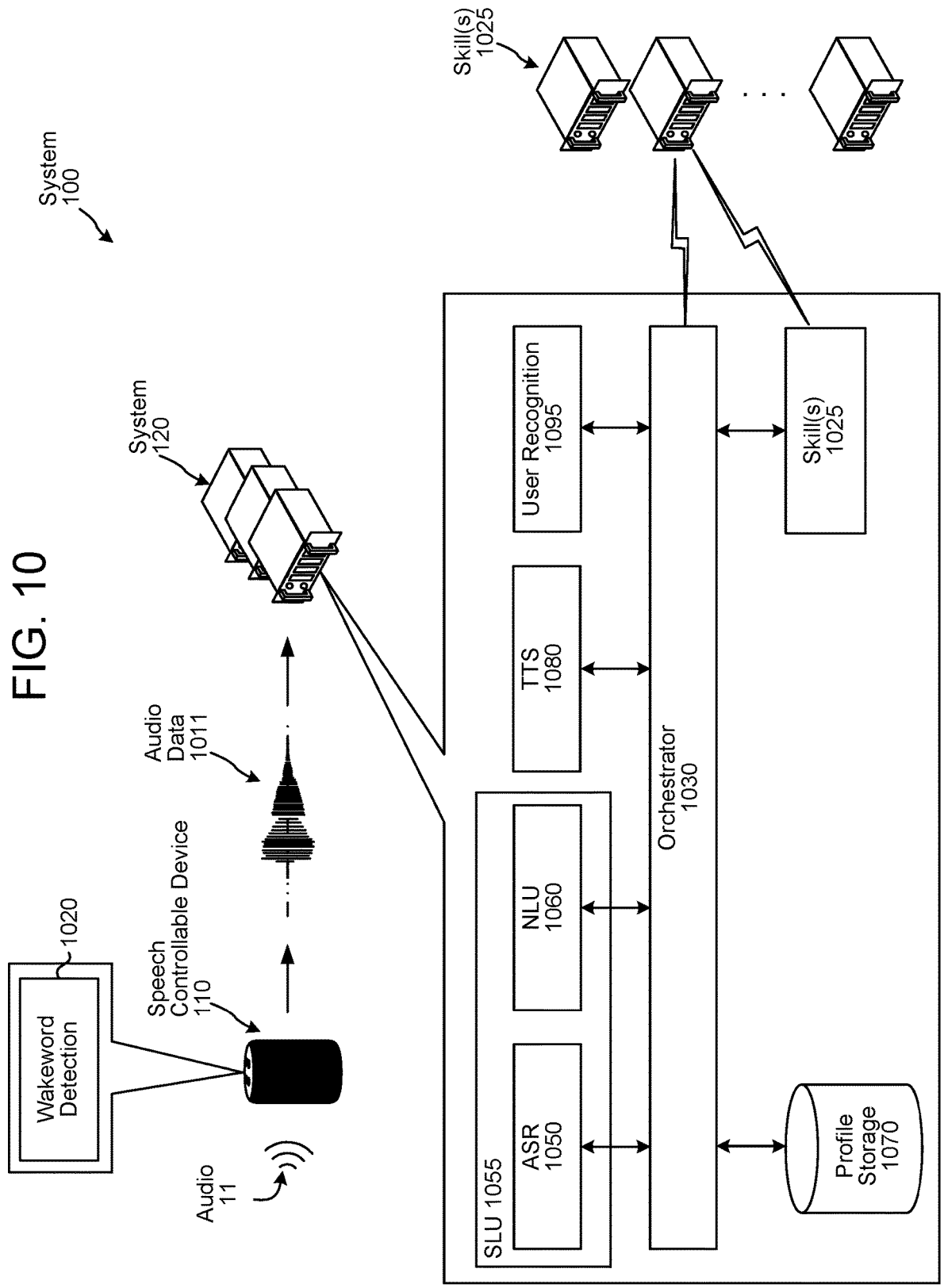

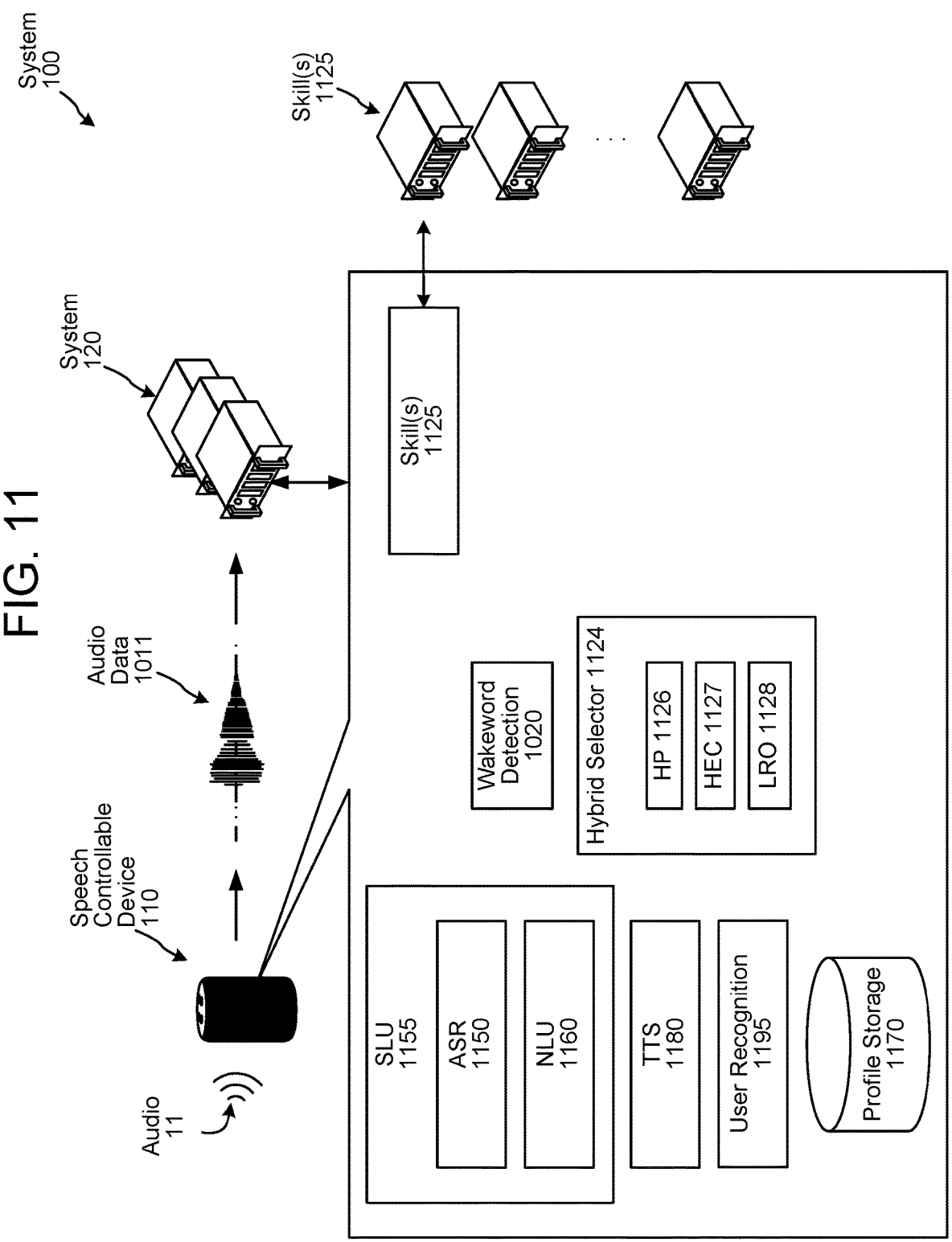

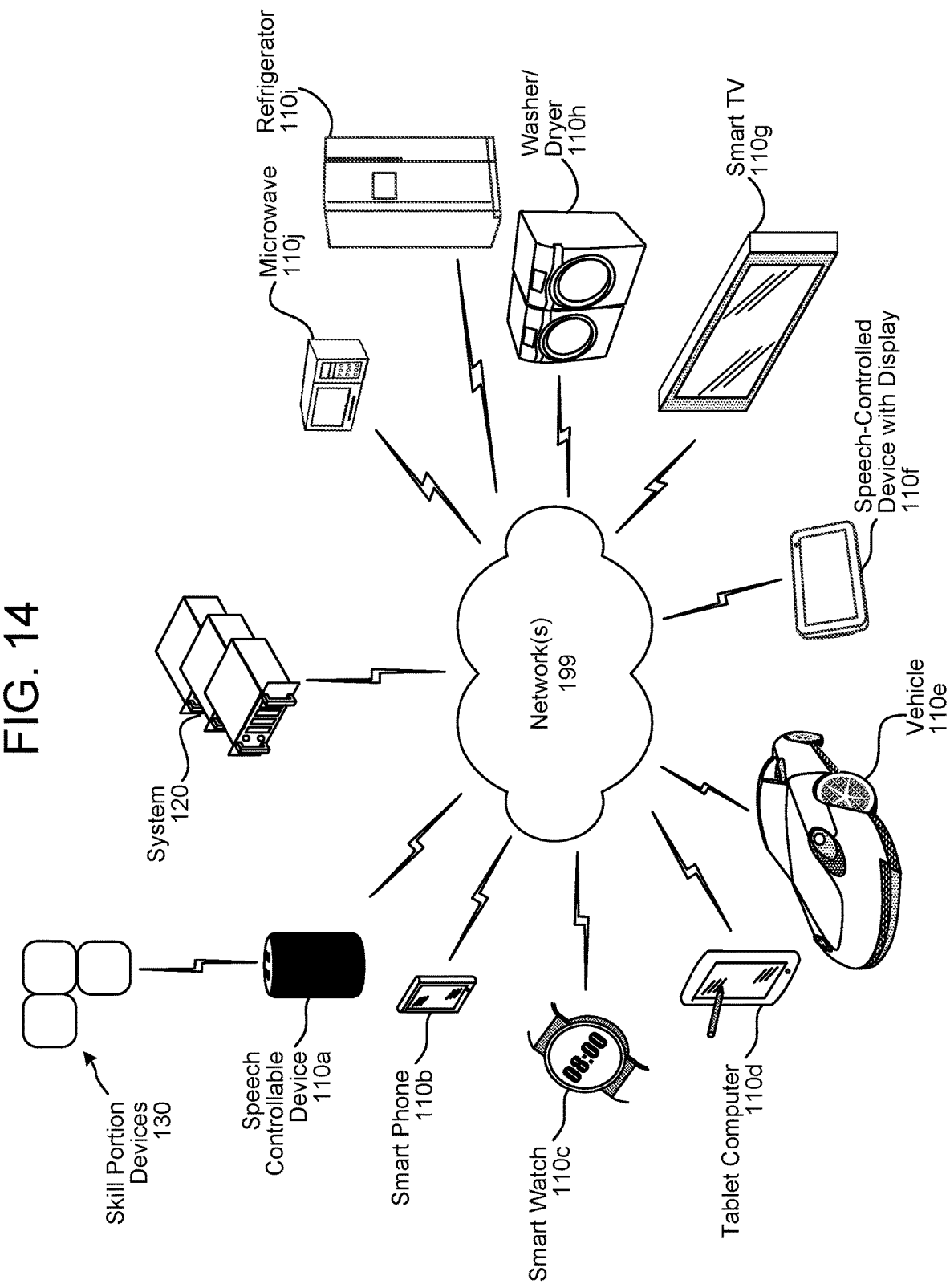

GENERATION OF COMPUTING FUNCTIONALITY USING DEVICES

BACKGROUND

Natural language processing systems have progressed to the point where humans can interact with computing devices using their voices. Such systems employ techniques to identify the words spoken by a human user based on the various qualities of received input data. Speech recognition combined with natural language understanding processing techniques enable speech-based user control of computing devices to perform tasks based on the spoken inputs. Speech recognition and natural language understanding processing techniques may be referred to collectively or separately herein as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1 is a conceptual diagram illustrating a system configured to generate a skill using skill portion devices, according to embodiments of the present disclosure.

FIG. 6 shows perspective and top views of a skill portion device associated with a skill portion for outputting audio, according to embodiments of the present disclosure.

FIGS. 7A-7F are examples of connected skill portion devices, according to embodiments of the present disclosure.

FIGS. 9A-9K conceptually illustrate skill configuration data corresponding to different stages of FIGS. 7A-7F, according to embodiments of the present disclosure.

FIG. 10 is a conceptual diagram of components of a system, according to embodiments of the present disclosure.

FIG. 11 is a conceptual diagram of components of a device, according to embodiments of the present disclosure.

FIG. 14 illustrates an example of a computer network for use with the overall system, according to embodiments of the present disclosure.

DETAILED DESCRIPTION

Figure 2B:
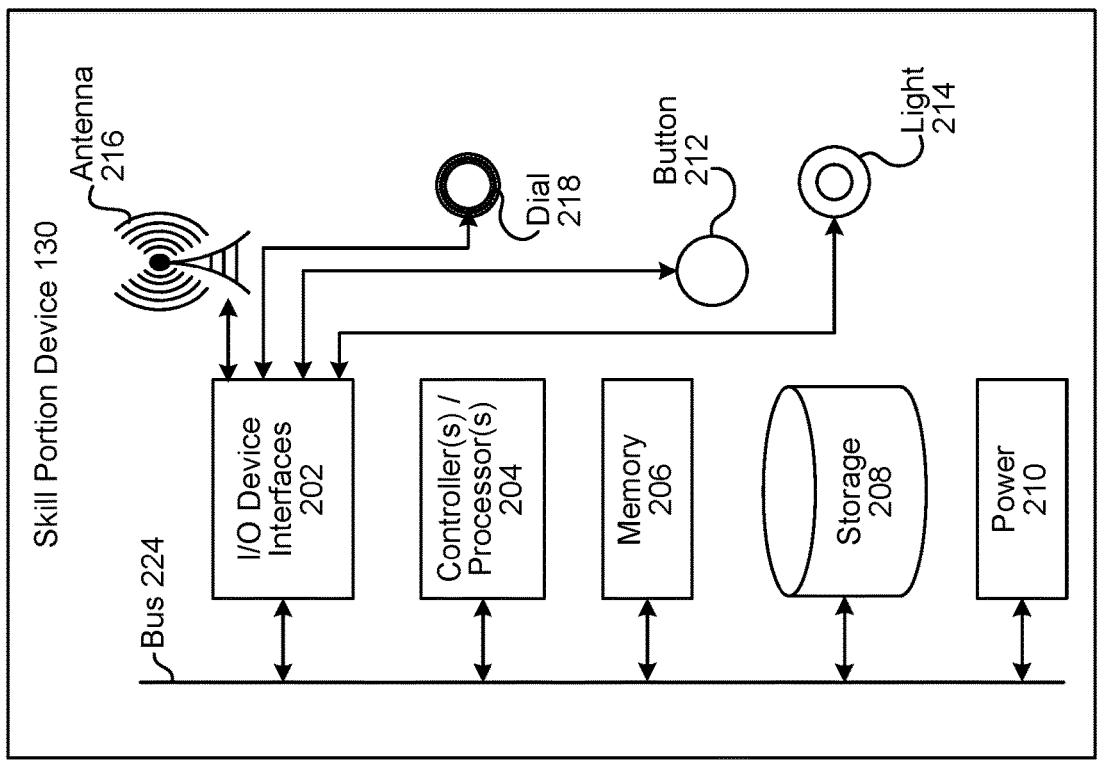
FIGS. 2A and 2B are block diagrams conceptually illustrating example components of skill portion devices, according to embodiments of the present disclosure.

Automatic speech recognition (ASR) is a field of computer science, artificial intelligence, and linguistics concerned with transforming audio data associated with speech into a token or textual representation of that speech. Natural language understanding (NLU) is a field of computer science, artificial intelligence, and linguistics concerned with enabling computers to derive meaning from natural language inputs (such as spoken inputs). ASR and NLU are often referred to collectively as spoken language understanding (SLU). Text-to-speech (TTS) is a field of computer science concerning transforming textual and/or other data into audio data that is synthesized to resemble human speech.

A system may execute one or more skills. As used herein, a "skill" may refer to software, that may be placed on a machine or a virtual machine (e.g., software that may be launched in a virtual instance when called), configured to perform one or more actions in response to user inputs (such as spoken natural language inputs). For example, for the spoken natural language input "play music by <artist>," a skill may output music sung by the indicated artist. For further example, for the spoken natural language input "turn on the lights," a skill may cause one or more "smart" lights to operate in an "on" state. In another example, for the spoken natural language input "what is the weather," a skill may output weather information for a geographic location corresponding to the device that captured the spoken natural language input. What is described herein as a skill may be referred to using different terms, such as an action, bot, application, processing component, or the like.

Aspects of the present disclosure relate to the generation of skills using skill portion devices. In other words, generation of skills using devices corresponding to different skill portions. The skill portion devices work in conjunction with a voice controllable device to provide a tangible, code-free (and in at least some instances display-free) user experience for generating skills. A user may configure and interchange the skill portion devices to create different interactive skill experiences, thus combining voice commands and physical interactions to develop new ways of interacting with a speech processing system.

Each skill portion device may correspond to a specific portion of a skill (e.g., a specific action to be performed as part of a skill interaction). For example, a first skill portion device may correspond to the outputting of synthesized speech including one or more statements, a second skill portion device may correspond to the outputting of synthesized speech corresponding to a question, a third skill portion device may correspond to the outputting of a sound representing an answer to a question was correct, a fourth skill portion device may correspond to the outputting of a sound representing an answer to a question was incorrect, etc. Thus, a user may configure a skill by selectively positioning skill portion devices. As can be appreciated, the examples of different skill portion devices/actions presented herein are for illustration only and the present application is not limited to those specific examples. Many such action/skill portion device combinations may be used.

A user may position the skill portion devices to create skill experiences in conjunction with an existing voice controllable device and a back-end speech processing system.

When a first skill portion device is newly positioned with respect to a second skill portion device, the voice controllable device may be directed, by a distributed system (e.g., the cloud), to output synthesized speech (and optionally display text) representing the function of the first skill portion device and prompting the user on how to proceed (e.g., to speak a statement(s), to speak a question, to turn a dial of the first skill portion device, to position another device with respect to the first device, etc.). At any time, the user may press a button on a "start" device (i.e., a skill portion device that communicates with the voice controllable device), resulting in the distributed system directing the voice controllable device to output synthesized speech corresponding to skill functionality that has already been configured using skill portion devices.

The teachings herein improve the user experience by decreasing the level of education and training needed to generate a skill.

A system according to the present disclosure may be configured to incorporate user permissions and may only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 shows a system 100 configured to generate a skill (an example of computing functionality) using skill portion devices. Although the figures and discussion of the present disclosure illustrate certain steps in a particular order, the steps described may be performed in a different order (as well as certain steps removed or added) without departing from the present disclosure. As shown in FIG. 1, the system 100 may include a speech controllable device 110 (local to a user 5) in communication with a start skill portion device 130a of a plurality of skill portion devices 130 (local to the user 5). Moreover, the speech controllable device 110 may be in communication with a system 120 across a network(s) 199. The network(s) 199 may include a local-area network(s) (LAN(s)), a wireless local-area network(s) (WLAN(s)), a Metropolitan Area Network(s), a Wide Area Network(s), a Campus Area Network(s), a mobile carrier system(s), and/or the like.

The speech controllable device 110 receives a first user input from the user 5. For example, the speech controllable device 110 may receive audio corresponding to a spoken natural language input. In another example, the speech controllable device 110 may receive a text-based (e.g., typed) natural language input. For further example, the speech controllable device 110 may include or be in communication with a camera that captures a sequence of images representing the user 5 performing a gesture (a type of user input). In another example, the speech controllable device 110 may display a virtual button and detect the user 5 interacting with the button (with the button interaction being a type of user input). For further example, the speech controllable device 110 may receive data from the start skill portion device 130a, with the received data indicating the user 5 has actuated (e.g., single pressed, double pressed, pressed and held, etc.) a button on the start skill portion device 130a. The start skill portion device 130a is a skill portion device 130 that is capable of wirelessly sending data to (and receiving data from) the speech controllable device 110. The start skill portion device 130a may be the only type of skill portion device 130 capable of sending data to (and receiving data from) the speech controllable device 110.

The speech controllable device 110 outputs (and the system 120 receives (132)) first input data representing the first user input. For example, the first input data may be audio data when the speech controllable device 110 receives a spoken natural language input. In another example, the first input data may be text data when the speech controllable device 110 receives a text-based (e.g., typed) natural language input. For further example, the first input data may be image data when the speech controllable device 110 receives a sequence of images representing the user 5 performing a gesture. Or the speech controllable device 110 may process the sequence of images to determine the gesture, and may send an indication of the gesture to the system 120. In another example, when the speech controllable device 110 detects the user 5 interacting with the button, the speech controllable device 110 may send first input data (representing the button interaction) to the system 120. For further example, when the speech controllable device 110 receives data from the start skill portion device 130a, the speech controllable device 110 may send the received data to the system 120.

After receiving the first input data, the system 120 processes (134) the first input data to determine the first user input indicates a skill is to be generated using the skill portion devices 130. For example, if the system 120 receives audio data from the speech controllable device 110, the system 120 may perform ASR processing on the audio data to generate ASR output data, and may perform NLU processing on the ASR output data to generate NLU output data corresponding to a semantic representation of the spoken natural language input to generate a skill using the skill portion devices 130. Alternatively, the system 120 may perform SLU processing on the audio data to generate the NLU output data. In another example, if the system 120 receives text data from the speech controllable device 110, the system 120 may perform NLU processing on the text data to generate NLU output data corresponding to a semantic representation of the text-based (e.g., typed) natural language input to generate a skill using the skill portion devices 130. For further example, if the system 120 receives image data from the speech controllable device 110, the system 120 may perform computer vision processing on the image data to determine the user-performed gesture, and may determine the gesture corresponds to a command to generate a skill using the skill portion devices 130. In another example, if the system 120 receives (from the speech controllable device 110) data representing a performed gesture, the system 120 may determine the gesture corresponds to a command to generate a skill using the skill portion devices 130. For further example, if the system 120 receives (from the speech controllable device 110) data representing a button interaction (either interaction of a button of the speech controllable device 110 or a button of the start skill portion device 130a), the system 120 may determine the button interaction corresponds to a command to generate a skill using the skill portion devices 130.

After processing the first input data, the system 120 sends (136), to the speech controllable device, first output data prompting the user 5 to position (with respect to the start skill portion device 130a) a skill portion device corresponding to a first portion of the skill. For example, the first output data may include audio data including synthesized speech prompting the user 5 to position a skill portion device with respect to the start skill portion device 130a. Additionally or alternatively, the first output data may include text data including natural language text prompting the user 5 to position a skill portion device with respect to the start skill portion device 130a. In at least some embodiments, the first output data may prompt the user 5 to connect a skill portion device to the start skill portion device 130a.

After receiving the first output data, the speech controllable device 110 outputs audio and/or displays text prompting the user 5 to position a skill portion device corresponding to a first portion of the skill. The user 5 may thereafter position a first skill portion device (of the skill portion devices 130) with respect to the start skill portion device 130a (e.g., may connect a first skill portion device to the start skill portion device 130a).

The first skill portion device may be physically connected to the start skill portion device 130a via friction fitting, a magnetic connection, physical coupling (such as a puzzle piece or other interlocking connection), or some other physical connection means or functionality known or not yet known. Alternatively, the first skill portion device may be positioned within a threshold proximity of the start skill portion device 130a such that the first skill portion device and the start skill portion device 130a may transmit and receive data between each other using a wireless protocol. In any event, positioning of the first skill portion device with respect to the start skill portion device 130a may render the first skill portion device capable of sending data to (and receiving data from) the start skill portion device 130a.

In response to the first skill portion device being positioned with respect to the start skill portion device 130a, the speech controllable device 110 receives, from the start skill portion device 130a, a device identifier of the first skill portion device. The speech controllable device 110 thereafter outputs the device identifier, which the system 120 receives (138).

The system 120 thereafter determines (140) a device type associated with the device identifier. Different device types may correspond to different skill portions. For example, a first device type may correspond to a skill portion to output synthesized speech including one or more statements (e.g., corresponding to an introduction portion of the skill), a second device type may correspond to a skill portion to output synthesized speech corresponding to a question, a third device type may correspond to a yes/no portion (of the skill) corresponding to correct and incorrect answers to a question, a fourth device type may correspond to a skill portion to output audio, etc.

The system 120 generates (142) second output data prompting the user 5 for a user input corresponding to the skill portion corresponding to the device type. For example, if the system 120 determines the device type corresponds to a skill portion to output synthesized speech including one or more statements, the second output data may prompt the user 5 for a spoken input corresponding the one or more statements. For further example, if the system 120 determines the device type corresponds to a skill portion to output synthesized speech corresponding to a question, the second output data may prompt the user 5 for a spoken input corresponding to a question. In another example, if the system 120 determines the device type corresponds to a skill portion to output audio, the second output data may prompt the user 5 to turn a dial on the first skill portion device to a position corresponding to a desired sound. The second output data may include audio data including synthesized speech prompting the user 5 as described above. Additionally or alternatively, the second output data may include text data including natural language text prompting the user 5 as described above.

The system 120 sends (144) the second output data to the speech controllable device 110. After receiving the second output data, the speech controllable device 110 outputs audio and/or displays text prompting the user 5 according to the second output data.

Thereafter, the speech controllable device 110 may receive a second user input from the user 5. For example, the speech controllable device 110 may receive audio corresponding to a spoken natural language input corresponding to one or more statements, or a question. In another example, the speech controllable device 110 may receive, from the start skill portion device 130a, data representing a dial (of the first skill portion device) is in a particular position. The speech controllable device 110 outputs (and the system 120 receives (146)) second input data representing the second user input.

The system 120 thereafter stores (148) first data associating the second user input with the device identifier (of the first skill portion device) and a skill identifier (corresponding to the generated skill). In at least some embodiments, the second input data may be audio data, but the system 120 may not be configured to store audio data representing user speech. In such embodiments, the system 120 may perform ASR processing on the audio data to generate ASR output data, and may store the first data to associate the ASR output data (corresponding to a token or textual representation of the spoken user input) with the device identifier and the skill identifier. Storing of the first data may result in the skill (corresponding to the skill identifier) being capable of performing runtime functionality corresponding to the first skill portion device.

While the foregoing describes the start skill portion device 130a communicating with the system 120 via the speech controllable device 110, the present disclosure is not limited thereto. For example, in some embodiments, the start skill portion device 130a may communicate with the system 120 via the network(s) 199, without using the speech controllable device 110 as an intermediary. Moreover, in some embodiments, the functionality of the system 120 described herein may be implemented by the speech controllable device 110, which may be a smart phone, tablet, personal computer, laptop, etc.

Figure 2A:
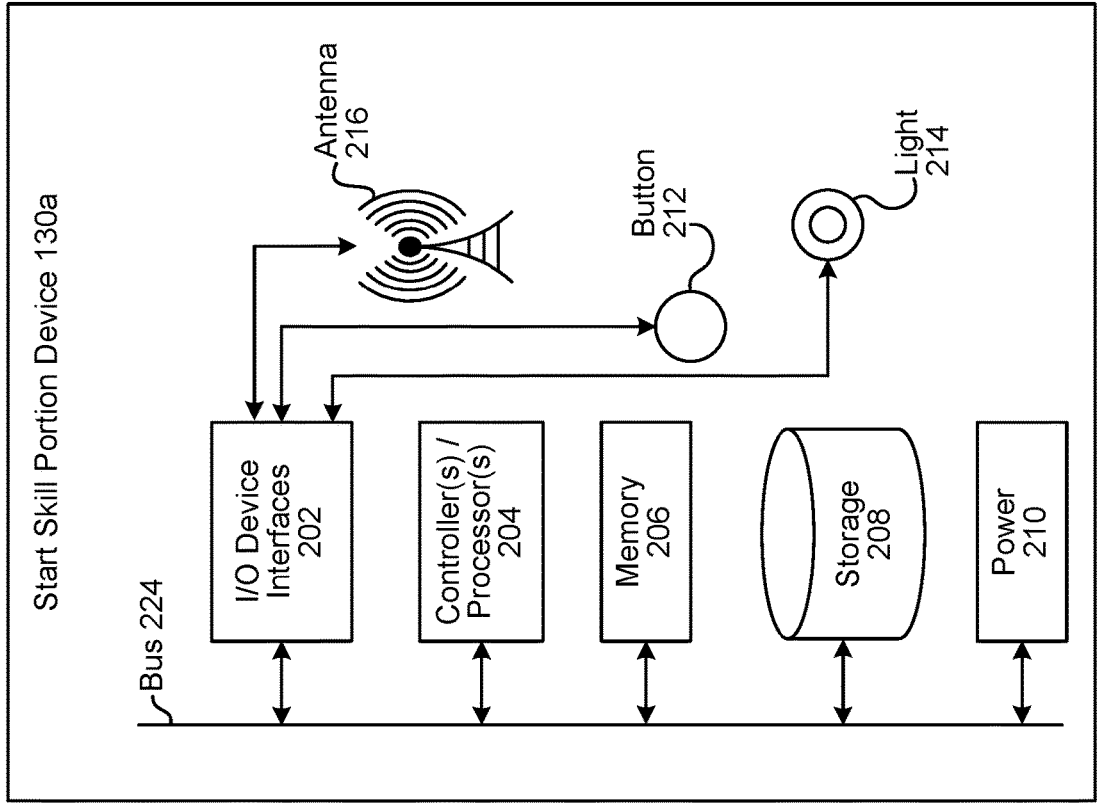

The following describes components of skill portion devices 130 of the present disclosure. In particular, FIG. 2A illustrates components of the start skill portion device 130a, and FIG. 2B illustrates components of a non-start skill portion device 130.

The start skill portion device 130a/skill portion device 130 may include one or more controllers/processors 204, which may each include a central processing unit (CPU) for processing data and computer-readable instructions, and a memory 206 for storing data and instructions of the start skill portion device 130a/skill portion device 130. The memory 206 may include volatile random access memory (RAM), non-volatile read only memory (ROM), non-volatile magnetoresistive memory (MRAM), and/or other types of memory. The start skill portion device 130a/skill portion device 130 may also include a data storage component 208 for storing data and controller/processor-executable instructions. The data storage component 208 may include one or more non-volatile storage types such as magnetic storage, optical storage, solid-state storage, etc.

Computer instructions for operating the start skill portion device 130a/skill portion device 130, and its various components, may be executed by the controller(s)/processor(s) 204 of the start skill portion device 130a/skill portion device 130, using the memory 206 as temporary "working" storage at runtime. The computer instructions, of the start skill portion device 130a/skill portion device 130, may be stored in a non-transitory manner in non-volatile memory 206 or storage 208. Alternatively, some or all of the executable instructions may be embedded in hardware or firmware on the start skill portion device 130a/skill portion device 130 in addition to or instead of software.

The start skill portion device 130a/skill portion device 130 includes input/output (I/O) device interfaces 202. For example, the start skill portion device 130a/skill portion device 130 may include a button(s) 212 and a light 214. The start skill portion device 130a may include a "save" button that, when actuated, causes the system 120 to request a skill name from the user 5 and store the skill identifier and skill name in the user's profile data. Such storage of the skill identifier and skill name allows for the skill to be invoked at any speech controllable device 110. The start skill portion device 130a may also include a "play" button that, when actuated, results in the system 120 and speech controllable device 110 processing to play a present configuration of the skill based on a present configuration of the skill portion devices 130. In at least some embodiments, this may be an immediate, zero latency playback without skill compilation. The start skill portion device 130a may include an antenna 216 that enables the start skill portion device 130a to wirelessly send data to (and receive data from) the speech controllable device 110 and other skill portion devices 130. The skill portion device 130 may include an antenna 216 that enables the skill portion device 130 to wireless send data to (and received data from) the start skill portion device 130a and other skill portion devices 130. The skill portion device 130 may also include a dial 218.

Additionally, the start skill portion device 130a/skill portion device 130 may include an address/data bus 224 for conveying data among components of the start skill portion device 130a/skill portion device 130. At least two components within the start skill portion device 130a/skill portion device 130 may be directly connected to each other in addition to (or instead of) being connected across the bus 224.

The start skill portion device 130a/skill portion device 130 may include a power component 210, such as one or more removable/replaceable batteries or one or more rechargeable batteries. Alternatively, the start skill portion device 130a may not include the power component 210, but may include a female connector configured to receive a power cord that, when connected to an external power source (such as a wall output or external battery pack), powers the start skill portion device.

In at least some embodiments, non-start skill portion devices 130 (such as but not limited to those discussed in detail herein below) may not include the power component 210. Rather, a non-start skill portion device 130 may be "powered on" by virtue of being directly physically connected to the start skill portion device 130a, or by being indirectly physically connected to the start skill portion device 130a via one or more other non-start skill portion devices 130. To make this possible, a non-start skill portion device 130 may be configured with a low power microcontroller (MCU).

When the start skill portion device 130a is powered on, the start skill portion device 130a may wirelessly communicate with (i.e., send data to and receive data from) the speech controllable device 110 and other skill portion devices 130, via Bluetooth Classic, Bluetooth Low Energy (LE), Wi-Fi, or other wireless protocol known or not yet known. Non-start skill portion devices 130 may not directly communicate with the speech controllable device 110. Rather, non-start skill portion devices 130 may communicate with the speech controllable device 110 via the start skill portion device 130a.

In at least some embodiments, the skill portion devices 130 may communicate via a data bus such as an inter-integrated circuit (I2C), which is a synchronous, multi-master, multi-slave, packet switched, single-ended, serial communication bus. For example, in I2C, a data sending device may send a START followed by a 7-bit address of a data recipient device the data sending device wants to communicate with. The 7-bit address is followed by a single bit representing whether the data sending device which to write (0) or read (1) from the data receiving device. If the data receiving device exists on the bus, the data receiving device responds with an acknowledgement (ACK) bit. The data sending device then continues to either transmit or receive mode (according to the read/write bit the data sending device sent), and the data receiving device continues in the complementary mode (receive or transmit, respectively). If the data sending device wants to write to the data receiving device, then the data sending device repeatedly sends a byte with the data receiving device sending an ACK bit. If the data sending device wants to read from the data receiving device, then the data sending device repeatedly receives a byte from the data receiving device, and the data sending device sends an ACK bit after every byte except the last one.

An I2C transaction may consist of multiple messages. The data sending device terminates a message with a STOP condition if this is the end of the transaction, or the data sending device sends another START condition to retain control of the bus for another message (a "combined format" transaction in which a data sending device issues at least two reads or writes to one or more data receiving devices). In a combined transaction, each read or write begins with a START and the data receiving device address. The START conditions after the first are repeated START bits. Repeated START bits are not preceded by STOP conditions, which is how data receiving devices know that the next message is part of the same transaction. Any given data receiving device will only respond to certain messages, as specified in its instructions stored in local memory.

To enable implementation of I2C, a connector, of a skill portion device 130, may contain 5 pins. 4 of the pins may cover power and I2C, and the 5th pin may connect to an I/O pin for each output connection and ground (GND) for input. In at least some embodiments, a connector may be a commercially available magnetic 5-pin male/female connector.

Figure 3:
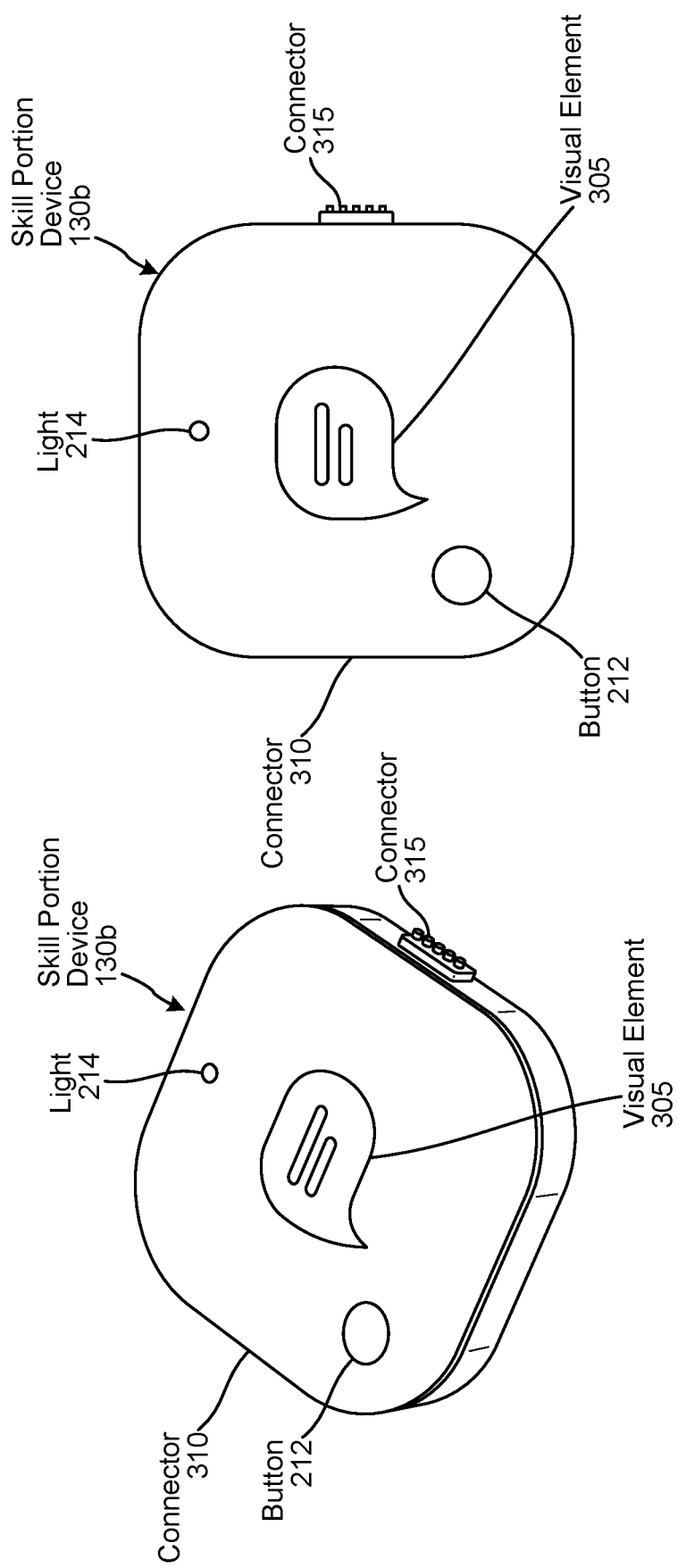
FIG. 3 shows perspective and top views of a skill portion device associated with a skill portion for outputting synthesized speech, according to embodiments of the present disclosure.

The following describes various types of the skill portion devices 130. FIG. 3 shows perspective and top views of a skill portion device 130b associated with a skill portion for outputting synthesized speech. The skill portion device 130b includes a visual element 305 indicating, to the user 5, that the skill portion device 130b is associated with the outputting of synthesized speech. While the visual element 305 is illustrated as a speech bubble, the present disclosure is not limited thereto. The visual element 305 may be any visual element capable of indicating to the user 5 that the skill portion device 130b is associated with the outputting of synthesized speech.

The skill portion device 130b may also include two connectors 310 and 315. As illustrated, the connector 310 is a female connector configured to connect to a male connector of another skill portion device 130, and the connector 315 is a male connector configured to connect to female connector of another skill portion device 130. However, the present disclosure is not limited thereto. For example, the present disclosure envisions the connector 310 being a male connector, and the connector 315 being a female connector. Thus, it will be appreciated that the connectors of the skill portion device 130b may be configurable, provided the input of the skill portion device 130b corresponds to a first type of connector, and the output of the skill portion device 130b corresponds to a second type of connector. For example, the connectors 310 and 315 may be configured to connect to corresponding connectors using friction fitting, magnetic elements, physical coupling (such as a puzzle piece or other interlocking connection), and/or other art-known/industry-known connecting techniques.

When the skill portion device 130b is connected to another skill portion device 130 via the connector 310, the skill portion device 130b becomes capable of sending data to (and receiving data from) the start skill portion device. In at least some embodiments, when the skill portion device 130b is connected to another skill portion device 130 via the connector 310, the skill portion device 130b may become part of a same data bus as the other skill portion device 130. An example of such a bus is I2C.

In operation, once the skill portion device 130b is connected to another physically connected device 130 via the connector 310, the skill portion device 130b may send data (representing the skill portion device 130b has been connected) to the start skill portion device (which may or may not be the skill portion device 130 to which the skill portion device 130b is connected). The start skill portion device may send a device identifier (of the skill portion device 130b) to the speech controllable device 110, which may send the device identifier to the system 120.

In response to receiving the device identifier, the system 120 may send, to the speech controllable device 110, a directive to cause a light 214 (of the skill portion device 130b) to activate in a manner that indicates a portion of the skill (corresponding to the skill portion device 130b) is being configured. The speech controllable device 110 may send the directive to the start skill portion device, which may send the directive to the skill portion device 130b via the data bus. As a result, the skill portion device 130b may activate the light 214 to indicate the portion of the skill is being configured. Such activation of the light 214 may correspond to the light 214 exhibiting a particular color and/or flashing in a particular manner.

The system 120 may also generate audio data including synthesized speech prompting the user 5 to speak one or more sentences. The system 120 may send the audio data to the speech controllable device 110, causing the speech controllable device 110 to output audio corresponding to the synthesized speech. The skill portion device 130b may activate the light 214 (to indicate the portion of the skill is being configured) while the speech controllable device 110 outputs the synthesized speech (prompting the user 5 to speak one or more sentences).

The skill portion device 130b may not include a microphone and, as such, the speech controllable device 110 may be used to capture speech (of the user 5) corresponding to the skill portion device 130b portion of the skill. After the speech controllable device 110 receives the audio corresponding to the user speech (i.e., corresponding to a spoken statement(s)), the speech controllable device 110 may generate audio data (representing a digitized version of the audio) and send same to the system 120. In at least some embodiments, the system 120 may associate the audio data with the device identifier (of the skill portion device 130b) and the skill's identifier in storage. Such may enable later recall of the audio data, and runtime playback of the user's speech. In at least some other embodiments, the system 120 may not be configured to store audio data representing user speech. In such embodiments, upon receiving the audio data, the system 120 may perform ASR processing on the audio data to generate ASR output data, and may associate the ASR output data with the device identifier and the skill identifier in storage.

In at least some embodiments, prior to storing the ASR output data, the system 120 may check with the user to ensure the ASR output data accurately represents the user's speech (i.e., accurately represents the spoken statement(s)). In such embodiments, after generating the ASR output data, the system 120 may perform TTS processing on the ASR output data to generate audio data including synthesized speech representing the ASR output data. The system 120 may send, to the speech controllable device 110, the foregoing audio data as well as prompt audio data including synthesized speech prompting the user 5 to confirm the synthesized speech (representing the ASR output data) accurately represents the user's speech. In response, the speech controllable device 110 may output audio corresponding to the prompt synthesized speech and the synthesized speech representing the ASR output data.

Thereafter, the speech controllable device 110 may receive a user input. For example, the speech controllable device 110 may receive audio corresponding to a spoken user input, text corresponding to a typed user input, selection of a displayed button, a sequence of images of a user performing a gesture, etc.

The speech controllable device 110 may send data representing the user input to the system 120. For example, when the speech controllable device 110 receives audio corresponding to a spoken user input, the speech controllable device 110 may send audio data to the system 120. For further example, when the speech controllable device 110 receives text corresponding to a typed user input, the speech controllable device 110 may send text data to the system 120. In another example, when the speech controllable device 110 detects selection of a displayed button, the speech controllable device 110 may send data (representing the button selected and/or how the button was interacted with (e.g., pressed, double pressed, pressed for at least a threshold duration of time, etc.)) to the system 120. For further example, when the speech controllable device 110 captures a sequence of images of a user performing a gesture, the speech controllable device 110 may send image data to the system 120. Or the speech controllable device 110 may perform computer vision processing on the image data to determine the performed gesture, and may send an indication of the gesture to the system 120.

In response, the system 120 may process the received data to determine the user's input confirms the synthesized speech accurately represents the user's speech corresponding to the skill portion device 130b (i.e., accurately represents the spoken statement(s)). For example, when the system 120 receives audio data from the speech controllable device 110, the system 120 may perform ASR processing on the audio data to generate ASR output data, and may perform NLU processing on the ASR output data to generate NLU output data corresponding to a semantic representation of the spoken input confirming the synthesized speech accurately represents the spoken statement. Alternatively, the system 120 may perform SLU processing on the audio data to generate the NLU output data. For further example, when the system 120 receives text data from the speech controllable device 110, the system 120 may perform NLU processing on the text data to generate the NLU output data. In another example, when the system 120 receives data representing selection of the button, the system 120 may determine the selected button (and/or how the button was selected (e.g., pressed, double pressed, pressed for at least a threshold duration, etc.)) corresponds to a user input confirming the synthesized speech accurately represents the spoken statement(s). For further example, when the system 120 receives image data from the speech controllable device 110, the system 120 may perform computer vision processing on the image data to determine a performed gesture, and may determine the gesture (e.g., the nodding of the user's head, the user 5 giving a thumbs up, etc.) corresponds to a user input confirming the synthesized speech accurately represents the spoken statement(s). In another example, when the system 120 receives an indication of a performed gesture from the speech controllable device 110, the system 120 may determine the gesture corresponds to a user input confirming the synthesized speech accurately represents the spoken statement(s). Upon determining the user confirmed the synthesized speech accurately represents the spoken statement(s), the system 120 may associate the ASR output data (representing the spoken statement(s)) with the device identifier (of the skill portion device 130*b*) and the skill's identifier.

Upon associating the foregoing data in storage, the system 120 may send, to the speech controllable device 110, a directive to stop the light 214 from indicating the skill portion (corresponding to the skill portion device 130*b*) is being configured. In other words, the directive may instruct that the light 214 indicate the skill portion is no longer being configured. In response to receiving the directive, the speech controllable device 110 may send the directive to the start skill portion device, which may send the directive to the skill portion device 130*b* via the data bus. As a result, the skill portion device 130*b* may operate the light 214 to indicate the portion of the skill is no longer being configured. Such operation of the light 214 may include activating the light 214 to exhibit a specific color and/or flash in a particular manner, or may include causing the light 214 to no longer be activated (e.g., exhibit an "off" state).

As illustrated in FIG. 3, the skill portion device 130*b* may not include any indicia of the speech spoken by the user 5 to correspond to the skill portion device 130*b*. The skill portion device 130*b* may include a button 212 that, when actuated by the user 5, results in the speech controllable device 110 outputting synthesized speech corresponding to the spoken statement(s) associated with the skill portion device 130*b*. When the button 212 is actuated by the user 5 (e.g., when the user 5 presses the button, double presses the button, presses and holds the button for at least a threshold duration of time, etc.), the skill portion device 130*b* may send data (representing the actuation of the button 212) to the start skill portion device (which may or may not be the skill portion device 130 to which the skill portion device 130*b* is directly connected). The start skill portion device may send the data (representing the actuation of the button 212) and a device identifier (corresponding to the skill portion device 130*b*) to the speech controllable device 110. The speech controllable device 110 may, in turn, send the data and the device identifier to the system 120. The system 120 may thereafter determine ASR output data associated with the device identifier (i.e., ASR output data representing the spoken statement(s) associated with the skill portion device 130*b*), and generate audio data including synthesized speech corresponding to the ASR output data. The system 120 may send the audio data to the speech controllable device 110, causing the speech controllable device 110 to output audio corresponding to the synthesized speech. The system 120 may also generate audio data including synthesized speech asking the user 5 whether the user 5 wants to reconfigure the speech associated with the skill portion device 130*b*. The system 120 may send such audio data to the speech controllable device 110, and the speech controllable device 110 may output audio corresponding thereto.

Figure 4:
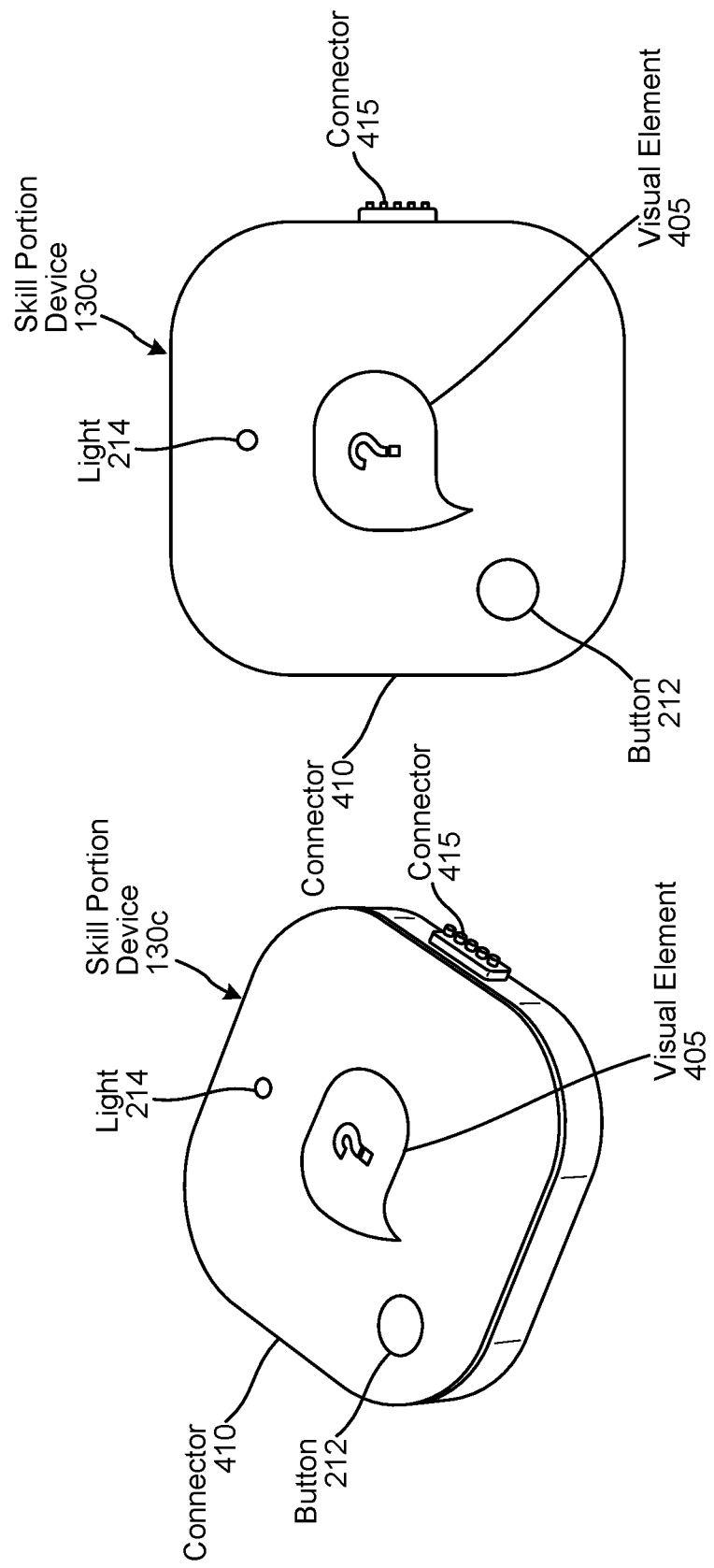
FIG. 4 shows perspective and top views of a skill portion device associated with a skill portion for outputting synthesized speech, according to embodiments of the present disclosure.

FIG. 4 shows perspective and top views of another skill portion device 130*c* associated with a skill portion for outputting synthesized speech. The skill portion device 130*c* includes a visual element 405 indicating, to the user 5, that the skill portion device 130*c* is associated with the outputting of synthesized speech. While the visual element 405 is illustrated as a question bubble, the present disclosure is not limited thereto. The visual element 405 may be any visual element capable of indicating to the user 5 that the skill portion device 130*c* is associated with the outputting of synthesized speech.

The skill portion device 130*b* may also include two connectors 410 and 415. As illustrated, the connector 410 is a female connector configured to connect to a male connector of another skill portion device 130, and the connector 415 is a male connector configured to connect to female connector of another skill portion device 130. However, the present disclosure is not limited thereto. For example, the present disclosure envisions the connector 410 being a male connector, and the connector 415 being a female connector. Thus, it will be appreciated that the connectors the skill portion device 130*c* may be configurable, provided the input of the skill portion device 130*c* corresponds to a first type of connector, and the output of the skill portion device 130*c* corresponds to a second type of connector. For example, the connectors 410 and 415 may be configured to connect to corresponding connectors using friction fitting, magnetic elements, physical coupling (such as a puzzle piece or other interlocking connection), and/or other art-known/industry-known connecting techniques.

When the skill portion device 130*c* is connected to another skill portion device 130 via the connector 410, the skill portion device 130*c* becomes capable of sending data to (and receiving data from) the start skill portion device. In at least some embodiments, when the skill portion device 130*c* is connected to another skill portion device 130 via the connector 410, the skill portion device 130*c* may become part of the same data bus as the other skill portion device 130. An example of such a bus is an I2C.

In operation, once the skill portion device 130*c* is connected to another physically connected device 130 via the connector 410, the skill portion device 130*c* may send data (representing the skill portion device 130*c* has been connected) to the start skill portion device (which may or may not be the skill portion device 130 to which the skill portion device 130*c* is connected). The start skill portion device may send a device identifier (of the skill portion device 130*c*) to the speech controllable device 110, which may send the device identifier to the system 120.

In response to receiving the device identifier, the system 120 may send, to the speech controllable device 110, a directive to cause a light 214 (of the skill portion device 130*c*) to activate in a manner that indicates a portion of the skill (corresponding to the skill portion device 130*c*) is being configured. The speech controllable device 110 may send the directive to the start skill portion device, which may send the directive to the skill portion device 130*c* via the data bus. As a result, the skill portion device 130*c* may activate the light

214 to indicate the portion of the skill is being configured. Such activation of the light 214 may correspond to the light 214 exhibiting a particular color and/or flashing in a particular manner.

The system 120 may also generate audio data including synthesized speech prompting the user 5 to speak a question. The system 120 may send the audio data to the speech controllable device 110, causing the speech controllable device 110 to output audio corresponding to the synthesized speech. The skill portion device 130*c* may activate the light 214 (to indicate the portion of the skill is being configured) while the speech controllable device 110 outputs the synthesized speech (prompting the user 5 to speak a question).

The skill portion device 130*c* may not include a microphone and, as such, the speech controllable device 110 may be used to capture speech (of the user 5) corresponding to the skill portion device 130*c* portion of the skill. After the speech controllable device 110 receives the audio corresponding to the user speech (i.e., corresponding to a spoken question), the speech controllable device 110 may generate audio data (representing a digitized version of the audio) and send same to the system 120. In at least some embodiments, the system 120 may associate the audio data with the device identifier (of the skill portion device 130*c*) and the skill's identifier in storage. Such may enable later recall of the audio data, and runtime playback of the user's speech. In at least some other embodiments, the system 120 may not be configured to store audio data representing user speech. In such embodiments, upon receiving the audio data, the system 120 may perform ASR processing on the audio data to generate ASR output data, and may associate the ASR output data with the device identifier and the skill identifier in storage.

In at least some embodiments, prior to storing the ASR output data, the system 120 may check with the user to ensure the ASR output data accurately represents the user's speech (i.e., accurately represents the spoken question). In such embodiments, after generating the ASR output data, the system 120 may perform TTS processing on the ASR output data to generate audio data including synthesized speech representing the ASR output data. The system 120 may send, to the speech controllable device 110, the foregoing audio data as well as prompt audio data including synthesized speech prompting the user 5 to confirm the synthesized speech (representing the ASR output data) accurately represents the user's speech. In response, the speech controllable device 110 may output audio corresponding to the prompt synthesized speech and the synthesized speech representing the ASR output data.

Thereafter, the speech controllable device 110 may receive a user input. For example, the speech controllable device 110 may receive audio corresponding to a spoken user input, text corresponding to a typed user input, selection of a displayed button, a sequence of images of a user performing a gesture, etc.

The speech controllable device 110 may send data representing the user input to the system 120. For example, when the speech controllable device 110 receives audio corresponding to a spoken user input, the speech controllable device 110 may send audio data to the system 120. For further example, when the speech controllable device 110 receives text corresponding to a typed user input, the speech controllable device 110 may send text data to the system 120. In another example, when the speech controllable device 110 detects selection of a displayed button, the speech controllable device 110 may send data (representing the button selected and/or how the button was interacted with (e.g., pressed, double pressed, pressed for at least a threshold duration of time etc.)) to the system 120. For further example, when the speech controllable device 110 captures a sequence of images of a user performing a gesture, the speech controllable device 110 may send image data to the system 120. Or the speech controllable device 110 may perform computer vision processing on the image data to determine the performed gesture, and may send an indication of the gesture to the system 120.

In response, the system 120 may process the received data to determine the user's input confirms the synthesized speech accurately represents the user's speech corresponding to the skill portion device 130*c* (i.e., accurately represents the spoken question). For example, when the system 120 receives audio data from the speech controllable device 110, the system 120 may perform ASR processing on the audio data to generate ASR output data, and may perform NLU processing on the ASR output data to generate NLU output data corresponding to a semantic representation of the spoken input confirming the synthesized speech accurately represents the spoken question. Alternatively, the system 120 may perform SLU processing on the audio data to generate the NLU output data. For further example, when the system 120 receives text data from the speech controllable device 110, the system 120 may perform NLU processing on the text data to generate the NLU output data. In another example, when the system 120 receives data representing selection of the button, the system 120 may determine the selected button (and/or how the button was selected (e.g., pressed, double pressed, pressed for at least a threshold duration, etc.)) corresponds to a user input confirming the synthesized speech accurately represents the spoken question. For further example, when the system 120 receives image data from the speech controllable device 110, the system 120 may perform computer vision processing on the image data to determine a performed gesture, and may determine the gesture (e.g., the nodding of the user's head, the user 5 giving a thumbs up, etc.) corresponds to a user input confirming the synthesized speech accurately represents the spoken question. In another example, when the system 120 receives an indication of a performed gesture from the speech controllable device 110, the system 120 may determine the gesture corresponds to a user input confirming the synthesized speech accurately represents the spoken question. Upon determining the user confirmed the synthesized speech accurately represents the spoken question, the system 120 may associate the ASR output data (representing the spoken question) with the device identifier (of the skill portion device 130*c*) and the skill's identifier.

Upon associating the foregoing data in storage, the system 120 may send, to the speech controllable device 110, a directive to stop the light 214 from indicating the skill portion (corresponding to the skill portion device 130*c*) is being configured. In other words, the directive may instruct that the light 214 indicate the skill portion is no longer being configured. In response to receiving the directive, the speech controllable device 110 may send the directive to the start skill portion device, which may send the directive to the skill portion device 130*c* via the data bus. As a result, the skill portion device 130*c* may operate the light 214 to indicate the portion of the skill is no longer being configured. Such operation of the light 214 may include activating the light 214 to exhibit a specific color and/or flash in a particular manner, or may include causing the light 214 to no longer be activated (i.e., exhibit an "off" state).

As illustrated in FIG. 4, the skill portion device 130*c* may not include any indicia of the speech spoken by the user 5 to correspond to the skill portion device 130c. The skill portion device 130c may include a button 212 that, when actuated by the user 5, results in the speech controllable device 110 outputting synthesized speech corresponding to the spoken question associated with the skill portion device 130c. When the button 212 is actuated by the user 5 (e.g., when the user 5 presses the button, double presses the button, presses and holds the button for at least a threshold duration of time, etc.), the skill portion device 130c may send data (representing the actuation of the button 212) to the start skill portion device (which may or may not be the skill portion device 130 to which the skill portion device 130b is directly connected). The start skill portion device may send the data (representing the actuation of the button 212) and a device identifier (corresponding to the skill portion device 130c) to the speech controllable device 110. The speech controllable device 110 may, in turn, send the data and the device identifier to the system 120. The system 120 may thereafter determine ASR output data associated with the device identifier (i.e., ASR output data representing the spoken question associated with the skill portion device 130c), and generate audio data including synthesized speech corresponding to the ASR output data. The system 120 may send the audio data to the speech controllable device 110, causing the speech controllable device 110 to output audio corresponding to the synthesized speech. The system 120 may also generate audio data including synthesized speech asking the user 5 whether the user 5 wants to reconfigure the speech associated with the skill portion device 130c. The system 120 may send such audio data to the speech controllable device 110, and the speech controllable device 110 may output audio corresponding thereto.

As described above, the skill portion devices 130b and 130c may not display indicia of the speech associated with the respective device. In at least some embodiments, one or both of the skill portion devices 130b and 130c may include a digital display configured to display text representing the speech associated with the respective device. Such may minimize (if not negate) the need to include the button 212/212 and corresponding functionality described herein above.

Figure 5:
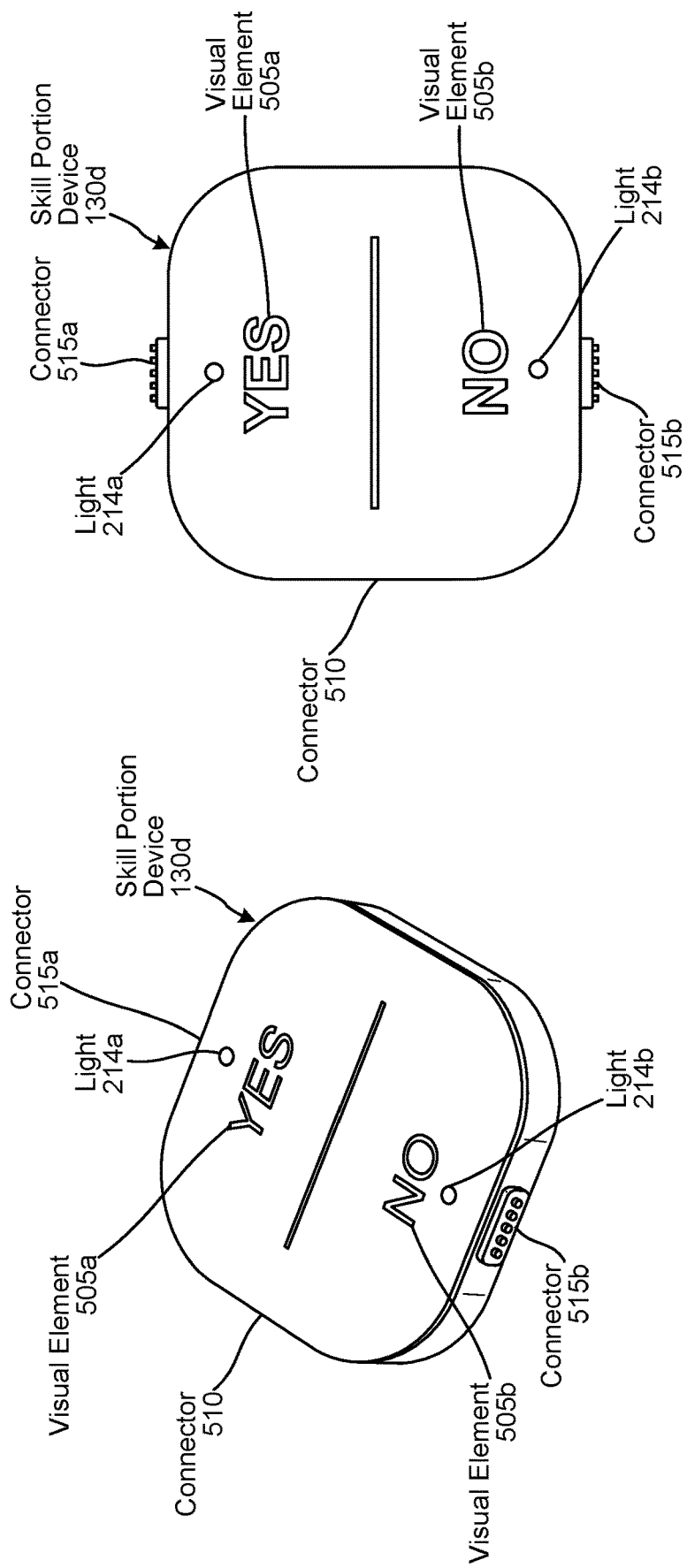
FIG. 5 shows perspective and top views of a skill portion device associated with a skill portion corresponding to a decision point, according to embodiments of the present disclosure.

In at least some embodiments, a skill portion device 130 may be configured as a decision device having one or more female connectors and at least two male connectors. FIG. 5 shows perspective and top views of another skill portion device 130d associated with a skill portion corresponding to a decision point. The skill portion device 130d includes two visual elements 505a and 505b, each corresponding to a different output of the decision point of the skill portion. As illustrated in FIG. 5, the visual element 505a may correspond to a correct (or "YES") output of the decision point, and the visual element 505b may correspond to an incorrect (or "NO") output of the decision point. While the visual elements 505a and 505b are illustrated as words, the present disclosure is not limited thereto. The visual elements 505a and 505B may be any visual elements capable of indicating the outputs of the decision point to the user 5. For example, the visual element 505a could be replaced with a thumbs up, and the visual element 505b could be replaced with a thumbs down.

The skill portion device 130d may also include three connectors 510, 515a, and 515b, as the illustrative skill portion device 130d corresponds to a decision point having one input and two outputs. As illustrated, the connector 510 is a female connector configured to connect to a male connector of another skill portion device 130, and the connectors 515a and 515b are male connectors configured to connect to female connectors of other skill portion devices 130. However, the present disclosure is not limited thereto. For example, the present disclosure envisions the connector 510 being a male connector, and the connectors 515a and 515b being female connectors. Thus, it will be appreciated that the connectors of a decision point skill portion device 130 of the present disclosure may be configurable, provided the input(s) of the decision point corresponds to a first type of connector, and the outputs of the decision point correspond to a second type of connector.

The connectors 510, 515a, and 515B may be configured to connect to corresponding connectors (of different skill portion devices) using various means. For example, the connectors 510, 515a, and 515B may be configured to connect to corresponding connectors using friction fitting, magnetic elements, physical coupling (such as a puzzle piece or other interlocking connection), and/or other art-known/industry-known connecting techniques. When the skill portion device 130d is connected to another skill portion device 130 via the connector 510, the skill portion device 130d becomes capable of sending data to (and receiving data from) the start skill portion device. In at least some embodiments, when the skill portion device 130d is connected to another skill portion device 130 via the connector 510, the skill portion device 130c may become part of the same data bus as the other skill portion device 130. An example of such a bus is an I2C.

In operation, once the skill portion device 130d is connected to another physically connected device 130 via the connector 510, the skill portion device 130d may send data (representing the skill portion device 130d has been connected) to the start skill portion device (which may or may not be the skill portion device 130 to which the skill portion device 130d is connected). The start skill portion device may send a device identifier (of the skill portion device 130d) to the speech controllable device 110, which may send the device identifier to the system 120. In response to receiving the device identifier, the system 120 may send, to the speech controllable device 110, a directive to cause a light 214a (corresponding to a first output of the decision point of the skill portion device 130d) to activate in a manner that indicates a portion of the skill (corresponding to the first decision point output) is being configured. The speech controllable device 110 may send the directive to the start skill portion device, which may send the directive to the skill portion device 130d via the data bus. As a result, the skill portion device 130d may activate the light 214a to indicate the first decision point output is being configured. Such activation of the light 214a may correspond to the light 214a exhibiting a particular color and/or flashing in a particular manner.

The system 120 may also generate audio data including synthesized speech prompting the user 5 to speak an answer corresponding to the first decision point output (e.g., corresponding to the connector 515a). The system 120 may send the audio data to the speech controllable device 110, causing the speech controllable device 110 to output audio corresponding to the synthesized speech. The speech controllable device 110 may output the audio while the light 214a is being operated to indicate the first decision point output is being configured.

The skill portion device 130d may not include a microphone and, as such, the speech controllable device 110 may be used to capture speech (of the user 5) corresponding to the answer corresponding to the first decision point output. After the speech controllable device 110 receives the audio corresponding to the user speech, the speech controllable device 110 may generate audio data (representing a digitized version of the audio) and send same to the system 120. In at least some embodiments, the system 120 may associate the audio data with the device identifier (of the skill portion device 130d), the connector 515a (corresponding to the first decision point output to which the user's speech corresponds), and the skill's identifier in storage. In at least some other embodiments, the system 120 may not be configured to store audio data representing user speech. In such embodiments, upon receiving the audio data, the system 120 may perform ASR processing on the audio data to generate ASR output data, and may associate the ASR output data with the device identifier, the connector 515a, and the skill identifier in storage.

In at least some embodiments, prior to storing the ASR output data, the system 120 may check with the user to ensure the ASR output data accurately represents the user's speech (i.e., accurately represents the speech corresponding to the first decision point output). In such embodiments, after generating the ASR output data, the system 120 may perform TTS processing on the ASR output data to generate audio data including synthesized speech representing the ASR output data. The system 120 may send, to the speech controllable device 110, the foregoing audio data as well as prompt audio data including synthesized speech prompting the user 5 to confirm the synthesized speech (representing the ASR output data) accurately represents the user's speech. In response, the speech controllable device 110 may output audio corresponding to the prompt synthesized speech and the synthesized speech representing the ASR output data.

Thereafter, the speech controllable device 110 may receive a user input. For example, the speech controllable device 110 may receive audio corresponding to a spoken user input, text corresponding to a typed user input, selection of a displayed button, a sequence of images of a user performing a gesture, etc.

The speech controllable device 110 may send data representing the user input to the system 120. For example, when the speech controllable device 110 receives audio corresponding to a spoken user input, the speech controllable device 110 may send audio data to the system 120. For further example, when the speech controllable device 110 receives text corresponding to a typed user input, the speech controllable device 110 may send text data to the system 120. In another example, when the speech controllable device 110 detects selection of a displayed button, the speech controllable device 110 may send data (representing the button selected and/or how the button was interacted with (e.g., pressed, double pressed, pressed for at least a threshold duration of time etc.)) to the system 120. For further example, when the speech controllable device 110 captures a sequence of images of a user performing a gesture, the speech controllable device 110 may send image data to the system 120. Or the speech controllable device 110 may perform computer vision processing on the image data to determine the performed gesture, and may send an indication of the gesture to the system 120.

In response, the system 120 may process the received data to determine the user's input confirms the synthesized speech accurately represents the user's speech corresponding to the first decision point output. For example, when the system 120 receives audio data from the speech controllable device 110, the system 120 may perform ASR processing on the audio data to generate ASR output data, and may perform NLU processing on the ASR output data to generate NLU output data corresponding to a semantic representation of the spoken input confirming the synthesized speech accurately represents the speech corresponding to the first decision point output. Alternatively, the system 120 may perform SLU processing on the audio data to generate the NLU output data. For further example, when the system 120 receives text data from the speech controllable device 110, the system 120 may perform NLU processing on the text data to generate the NLU output data. In another example, when the system 120 receives data representing selection of the button, the system 120 may determine the selected button (and/or how the button was selected (e.g., pressed, double pressed, pressed for at least a threshold duration, etc.)) corresponds to a user input confirming the synthesized speech accurately represents the speech corresponding to the first decision point output. For further example, when the system 120 receives image data from the speech controllable device 110, the system 120 may perform computer vision processing on the image data to determine a performed gesture, and may determine the gesture (e.g., the nodding of the user's head, the user 5 giving a thumbs up, etc.) corresponds to a user input confirming the synthesized speech accurately represents the speech corresponding to the first decision point output. In another example, when the system 120 receives an indication of a performed gesture from the speech controllable device 110, the system 120 may determine the gesture corresponds to a user input confirming the synthesized speech accurately represents the speech corresponding to the first decision point output. Upon determining the user confirmed the synthesized speech accurately represents the speech corresponding to the first decision point output, the system 120 may associate the ASR output data (representing the speech) with the device identifier (of the skill portion device 130d), the connector 515a, and the skill's identifier.

Upon associating the foregoing data in storage, the system 120 may send, to the speech controllable device 110, a directive to stop the light 214a from indicating the skill portion (corresponding to the first decision point output) is being configured. In other words, the directive may instruct that the light 214a indicate the first decision point output is no longer being configured. In response to receiving the directive, the speech controllable device 110 may send the directive to the start skill portion device, which may send the directive to the skill portion device 130d via the data bus. As a result, the skill portion device 130d may operate the light 214a to indicate the portion of the skill is no longer being configured. Such operation of the light 214a may include activating the light 214a to exhibit a specific color and/or flash in a particular manner, or may include causing the light 214a to no longer be activated (i.e., exhibit an "off" state).

Moreover, upon associating the foregoing data in storage and sending the foregoing directive (with respect to the first decision point output), the system 120 may send, to the speech controllable device 110, a directive to cause a light 214b (corresponding to a second output of the decision point of the skill portion device 130d) to activate in a manner that indicates a portion of the skill (corresponding to the second decision point output) is being configured. The speech controllable device 110 may send the directive to the start skill portion device, which may send the directive to the skill portion device 130d via the data bus. As a result, the skill portion device 130d may activate the light 214b to indicate the second decision point output is being configured. Such activation of the light 214b may correspond to the light 214b exhibiting a particular color and/or flashing in a particular manner.

The system 120 may also generate audio data including synthesized speech prompting the user 5 to speak an answer corresponding to the second decision point output (e.g., corresponding to the connector 515*b*). The system 120 may send the audio data to the speech controllable device 110, causing the speech controllable device 110 to output audio corresponding to the synthesized speech. The speech controllable device 110 may output the audio while the light 214*b* is being operated to indicate the second decision point output is being configured.

The speech controllable device 110 may capture speech (of the user 5) corresponding to the answer corresponding to the second decision point output. After the speech controllable device 110 receives the audio corresponding to the user speech, the speech controllable device 110 may generate audio data (representing a digitized version of the audio) and send same to the system 120. In at least some embodiments, the system 120 may associate the audio data with the device identifier (of the skill portion device 130*d*), the connector 515*b* (corresponding to the second decision point output to which the user's speech corresponds), and the skill's identifier in storage. In at least some other embodiments, the system 120 may not be configured to store audio data representing user speech. In such embodiments, upon receiving the audio data, the system 120 may perform ASR processing on the audio data to generate ASR output data, and may associate the ASR output data with the device identifier, the connector 515*b*, and the skill identifier in storage.

In at least some embodiments, prior to storing the ASR output data, the system 120 may check with the user to ensure the ASR output data accurately represents the user's speech (i.e., accurately represents the speech corresponding to the second decision point output). In such embodiments, after generating the ASR output data, the system 120 may perform TTS processing on the ASR output data to generate audio data including synthesized speech representing the ASR output data. The system 120 may send, to the speech controllable device 110, the foregoing audio data as well as prompt audio data including synthesized speech prompting the user 5 to confirm the synthesized speech (representing the ASR output data) accurately represents the user's speech. In response, the speech controllable device 110 may output audio corresponding to the prompt synthesized speech and the synthesized speech representing the ASR output data.

Thereafter, the speech controllable device 110 may receive a user input. For example, the speech controllable device 110 may receive audio corresponding to a spoken user input, text corresponding to a typed user input, selection of a displayed button, a sequence of images of a user performing a gesture, etc.

The speech controllable device 110 may send data representing the user input to the system 120. For example, when the speech controllable device 110 receives audio corresponding to a spoken user input, the speech controllable device 110 may send audio data to the system 120. For further example, when the speech controllable device 110 receives text corresponding to a typed user input, the speech controllable device 110 may send text data to the system 120. In another example, when the speech controllable device 110 detects selection of a displayed button, the speech controllable device 110 may send data (representing the button selected and/or how the button was interacted with (e.g., pressed, double pressed, pressed for at least a threshold duration of time etc.)) to the system 120. For further example, when the speech controllable device 110 captures a sequence of images of a user performing a gesture, the speech controllable device 110 may send image data to the system 120. Or the speech controllable device 110 may perform computer vision processing on the image data to determine the performed gesture, and may send an indication of the gesture to the system 120.

In response, the system 120 may process the received data to determine the user's input confirms the synthesized speech accurately represents the user's speech corresponding to the second decision point output. For example, when the system 120 receives audio data from the speech controllable device 110, the system 120 may perform ASR processing on the audio data to generate ASR output data, and may perform NLU processing on the ASR output data to generate NLU output data corresponding to a semantic representation of the spoken input confirming the synthesized speech accurately represents the speech corresponding to the second decision point output. Alternatively, the system 120 may perform SLU processing on the audio data to generate the NLU output data. For further example, when the system 120 receives text data from the speech controllable device 110, the system 120 may perform NLU processing on the text data to generate the NLU output data. In another example, when the system 120 receives data representing selection of the button, the system 120 may determine the selected button (and/or how the button was selected (e.g., pressed, double pressed, pressed for at least a threshold duration, etc.)) corresponds to a user input confirming the synthesized speech accurately represents the speech corresponding to the second decision point output. For further example, when the system 120 receives image data from the speech controllable device 110, the system 120 may perform computer vision processing on the image data to determine a performed gesture, and may determine the gesture (e.g., the nodding of the user's head, the user 5 giving a thumbs up, etc.) corresponds to a user input confirming the synthesized speech accurately represents the speech corresponding to the second decision point output. In another example, when the system 120 receives an indication of a performed gesture from the speech controllable device 110, the system 120 may determine the gesture corresponds to a user input confirming the synthesized speech accurately represents the speech corresponding to the second decision point output. Upon determining the user confirmed the synthesized speech accurately represents the speech corresponding to the second decision point output, the system 120 may associate the ASR output data (representing the speech) with the device identifier (of the skill portion device 130*d*), the connector 515*b*, and the skill's identifier.

Upon associating the foregoing data in storage, the system 120 may send, to the speech controllable device 110, a directive to stop the light 214*b* from indicating the skill portion (corresponding to the second decision point output) is being configured. In other words, the directive may instruct that the light 214*b* indicate the second decision point output is no longer being configured. In response to receiving the directive, the speech controllable device 110 may send the directive to the start skill portion device, which may send the directive to the skill portion device 130*d* via the data bus. As a result, the skill portion device 130*d* may operate the light 214*b* to indicate the portion of the skill is no longer being configured. Such operation of the light 214*b* may include activating the light 214*b* to exhibit a specific color and/or flash in a particular manner, or may include causing the light 214*b* to no longer be activated (i.e., exhibit an "off" state).

The foregoing describes a skill portion device 130*d* corresponding to a skill portion decision point including one input and two outputs. It will be appreciated that the present disclosure is not limited thereto, and that a skill portion device 130 of the present disclosure may correspond to a skill portion decision point having one or more inputs and two or more outputs. For example, a skill portion device 130 may correspond to a multiple choice decision point having two or more outputs. In such cases, the foregoing processing (described with respect to FIG. 5) may be performed with respect to each decision point output of the skill portion device 130, until all decision point outputs have been configured.

FIG. 6 shows perspective and top views of a skill portion device 130e associated with a skill portion for outputting audio (e.g., animal sounds, music, synthesized speech not derived from speech of the user 5, synthesized speech in a specific voice, etc.). The skill portion device 130e includes a dial 218 from transitioning between different audio outputs associated with the skill portion device 130e. The dial 218 may be connected to a visual element structure located within the skill portion device 130e. The visual element structure may include different visual elements, with each visual element corresponding to a different position of the dial 218. A front/top surface, of the skill portion device 130e may include a hole 605 that enables a user to view a visual element corresponding to a current position of the dial 218. For example, as illustrated in FIG. 6, the hole 605 may enable the user 5 to view a visual element of a cheetah face, representing the skill will output the sound of a cheetah if the dial 218 is left in the position of FIG. 6.

While FIG. 6 illustrates the skill portion device 130e including the hole 605 through which the user 5 may view a visual element corresponding to a current position of the dial 218, the present disclosure envisions various techniques for indicating (to the user 5) the current position of the dial 218. For example, the visual elements (corresponding to different positions of the dial 218) may be located on the top/front surface of the skill portion device 130e, and the dial 218 may include a pointer portion configured to point to a visual element corresponding to a current position of the dial 218. In another example, the front/top surface of the skill portion device 130e may include an electronic display configured to change in appearance to display a visual element corresponding to a current position of the dial 218.

The skill portion device 130e may also include two connectors 610 and 615. As illustrated, the connector 610 is a female connector configured to connect to a male connector of another skill portion device 130, and the connector 615 is a male connector configured to connect to female connector of another skill portion device 130. However, the present disclosure is not limited thereto. For example, the present disclosure envisions the connector 610 being a male connector, and the connector 615 being a female connector. Thus, it will be appreciated that the connectors the skill portion device 130e may be configurable, provided the input of the skill portion device 130e corresponds to a first type of connector, and the output of the skill portion device 130e corresponds to a second type of connector. For example, the connectors 610 and 615 may be configured to connect to corresponding connectors using friction fitting, magnetic elements, physical coupling (such as a puzzle piece or other interlocking connection), and/or other art-known/industry-known connecting techniques.

When the skill portion device 130e is connected to another skill portion device 130 via the connector 610, the skill portion device 130e becomes capable of sending data to (and receiving data from) the start skill portion device. In at least some embodiments, when the skill portion device 130e is connected to another skill portion device 130 via the connector 610, the skill portion device 130e may become part of the same data bus as the other skill portion device 130. An example of such a bus is I2C.

In operation, once the skill portion device 130e is connected to another physically connected device 130 via the connector 610, the skill portion device 130e may send data (representing the skill portion device 130e has been connected, and a present position of the dial 218) to the start skill portion device (which may or may not be the skill portion device 130 to which the skill portion device 130e is connected). In at least some embodiments, the data (representing the present position of the dial 218) may include an integer value (e.g., 1, 2, 3, 4, etc.) corresponding to the present position of the dial 218. The start skill portion device may send a device identifier (of the skill portion device 130e), and data representing the present position of the dial 218, to the speech controllable device 110. The speech controllable device 110 may in turn send, to the system 120, the device identifier and the data representing the present position of the dial 218.

In response to receiving the device identifier and data representing the present position of the dial 218, the system 120 may send, to the speech controllable device 110, a directive to cause a light 214 (of the skill portion device 130e) to activate in a manner that indicates a portion of the skill (corresponding to the skill portion device 130e) is being configured. The speech controllable device 110 may send the directive to the start skill portion device, which may send the directive to the skill portion device 130e via the data bus. As a result, the skill portion device 130e may activate the light 214 to indicate the portion of the skill is being configured. Such activation of the light 214 may correspond to the light 214 exhibiting a particular color and/or flashing in a particular manner.

In addition, in response to receiving the device identifier and the data representing the present position of the dial 218, the system 120 may determine audio data corresponding to the present position of the dial 218. For example, the system 120 may use the device identifier as an index into a lookup table to determine audio data associated with the device identifier and the present position of the dial 218. For example, the audio data may correspond to a particular animal sound (e.g., the chirping of a bird, the roaring of a lion, the braying of a horse, etc.), a music clip (e.g., 5 to 10 seconds long), a weather (such as rain, thunder, etc.) or non-weather sound effect, particular synthesized speech (such as "yippee," "good job," "bummer," "drats," "abracadabra," "bazinga," etc.), or a particular voice (e.g., a first computerized voice, a second computerized voice, a voice of a movie character, a voice of an actor or actress, a voice of a musical performer, etc.). The system 120 may send the audio data to the speech controllable device 110, causing the speech controllable device 110 to output audio corresponding to the audio data. The skill portion device 130e may activate the light 214 (to indicate the portion of the skill is being configured) while the speech controllable device 110 outputs the audio.

In addition, the system 120 may generate audio data including synthesized speech prompting the user 5 to turn the dial 218 if the user 5 wants the skill portion (corresponding to the skill portion device 130e) to output different audio (e.g., a different animal sound, a different music clip, a different weather or non-weather sound effect sound, different synthesized speech not derived from speech of the user 5, a different voice, etc.). If the user 5 turns the dial 218, the foregoing processing may be performed to output audio (of audio data corresponding to the new present position of the dial 218) and synthesized speech (prompting the user 5 to continue to turn the dial 218 if different output is desired).

The light 214 may continue to indicate the skill portion is being configured until the user 5 connects a new skill portion device 130 to the skill portion device 130e (or until the user 5 indicates the skill is to be saved without connecting a new skill portion device 130 to the skill portion device 130e). In response to either of the foregoing events occurring, the system 120 may send, to the speech controllable device 110, a directive to stop the light 214 from indicating the skill portion (corresponding to the skill portion device 130e) is being configured. In other words, the directive may instruct that the light 214 indicate the skill portion is no longer being configured. In response to receiving the directive, the speech controllable device 110 may send the directive to the start skill portion device, which may send the directive to the skill portion device 130e via the data bus. As a result, the skill portion device 130e may operate the light 214 to indicate the portion of the skill is no longer being configured. Such operation of the light 214 may include activating the light 214 to exhibit a specific color and/or flash in a particular manner, or may include causing the light 214 to no longer be activated (e.g., exhibit an "off" state).

While FIGS. 3-6 illustrate specific illustrative skill portion devices, it will be appreciated that other types of skill portion devices (corresponding to other skill portions) are within the spirit and scope of the present disclosure. For example, while not illustrated, a skill portion device 130 may include a dial for configuring a time delay in a skill (e.g., a time between when the skill outputs audio and when the user is expected to reply with a user input (e.g., speech). For example, the dial may have a first position corresponding to a 5 second delay, a second position corresponding to a 10 second delay, a third position corresponding to a 15 second delay, a fourth position corresponding to a 30 second delay, a fifth position corresponding to a 45 second delay, and a sixth position corresponding to a 60 second delay.

Moreover, while not illustrated, a skill portion device 130 (corresponding to a portion of a skill being configured) may correspond to functionality provided by a skill already implemented by (or in communication with) the system 120/speech controllable device 110. For example, the skill portion device 130 may correspond to a purchase skill configured to perform e-commerce transactions, may correspond to a weather skill configured to output weather information, may correspond to a trivia skill configured to conduct games of trivia, etc.

In addition, while FIGS. 3-6 illustrate the connectors being on sides of the skill portion devices 130, the present disclosure is not limited thereto. For example, a connector may be located on a face of a skill portion device 130 to enable 3D connection/stacking of skill portion devices 130.

Moreover, while FIGS. 3-6 illustrate a skill portion device 130 as being square in cross-section, the present disclosure is not limited thereto. A skill portion device 130 may have an octagon, hexagonal, triangular, or other cross-section without departing from the present disclosure. Moreover, a skill portion device 130 may have a different 3D shape from that illustrated, such as a pyramidal shape, a rectangular prism shape, etc.

The following describes example skill generation user experiences using the skill portion devices 130 of the present disclosure. In particular, FIGS. 7A-9K relate to generating a skill in a guided manner. More particularly, FIGS. 7A-9K relate the specific example of how an animal trivia skill may be generated using the skill portion devices 130. It will be appreciated that FIGS. 7A-9K are merely illustrative, and that the teachings of FIGS. 7A-9K may be adapted for generating various types of skills in a guided manner. Generating a skill, in a guided manner, may be based on a template representing various functionalities of a template skill, and types of skill portion devices corresponding to the various functionalities. In at least some embodiments, the system 120 may determine which (from a plurality of skill templates) should be used based on one or more types of skill portion devices associated with (or represented in) profile data associated with the speech controllable device 110 and/or the user 5. For example, a first set of skill portion devices may correspond to a trivia skill, a second set of skill portion devices may correspond to a skill configured to tell a joke, etc.

Figure 8F:
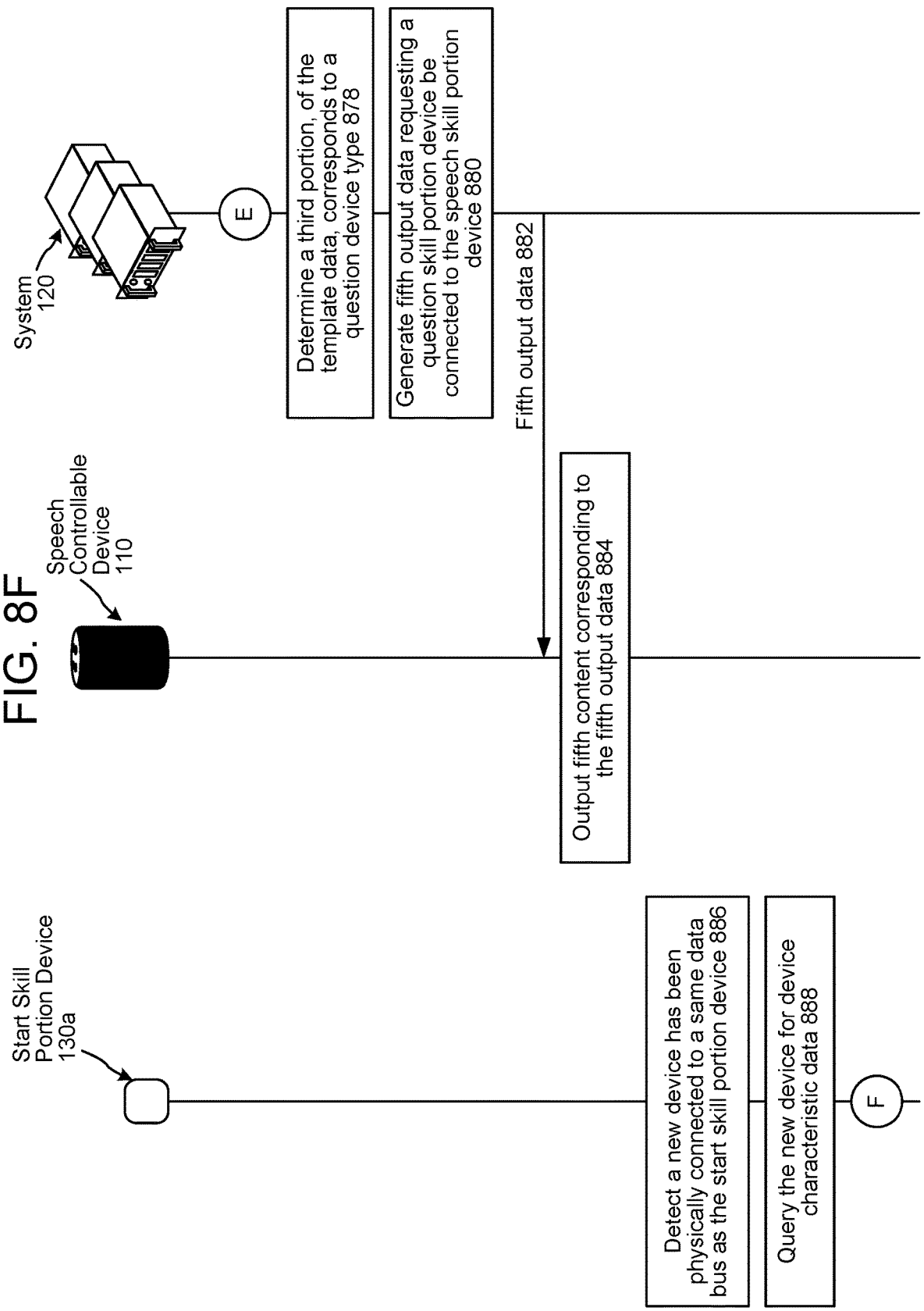
FIGS. 8A-8N are a signal flow diagram illustrating processing that may be performed to build a skill in a guided manner, according to embodiments of the present disclosure.
Figure 8I:
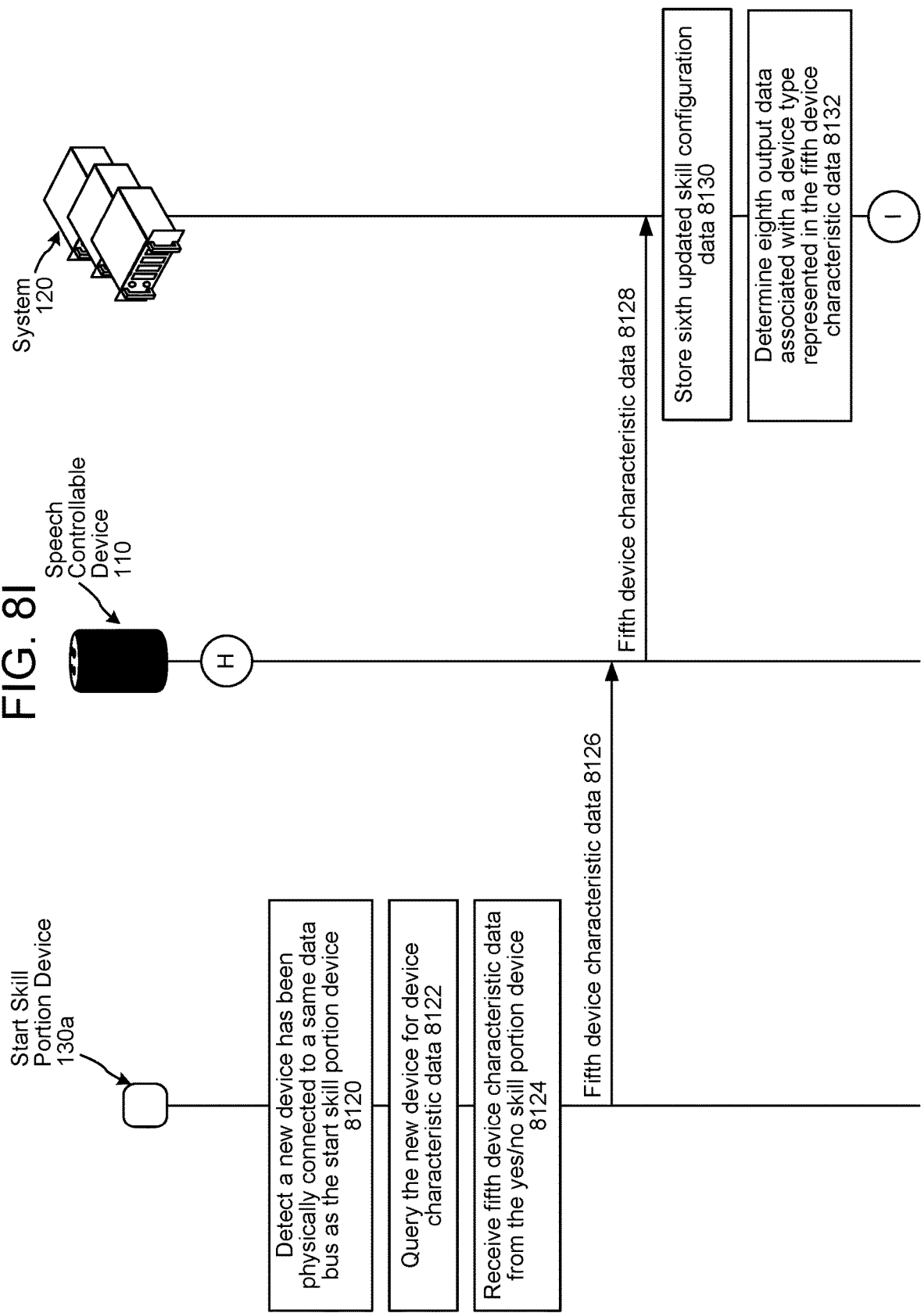
Figure 8K:
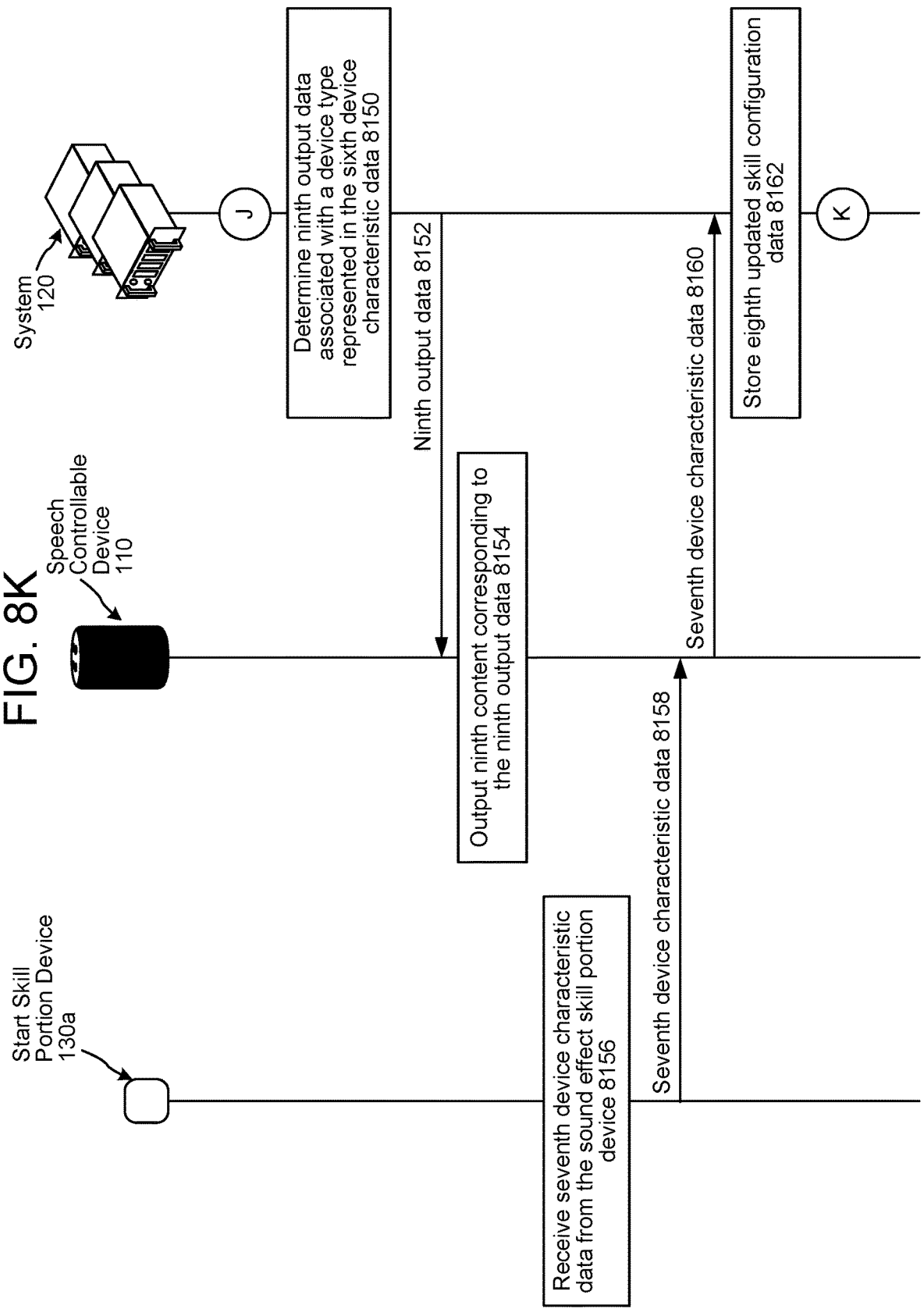
Figure 8L:
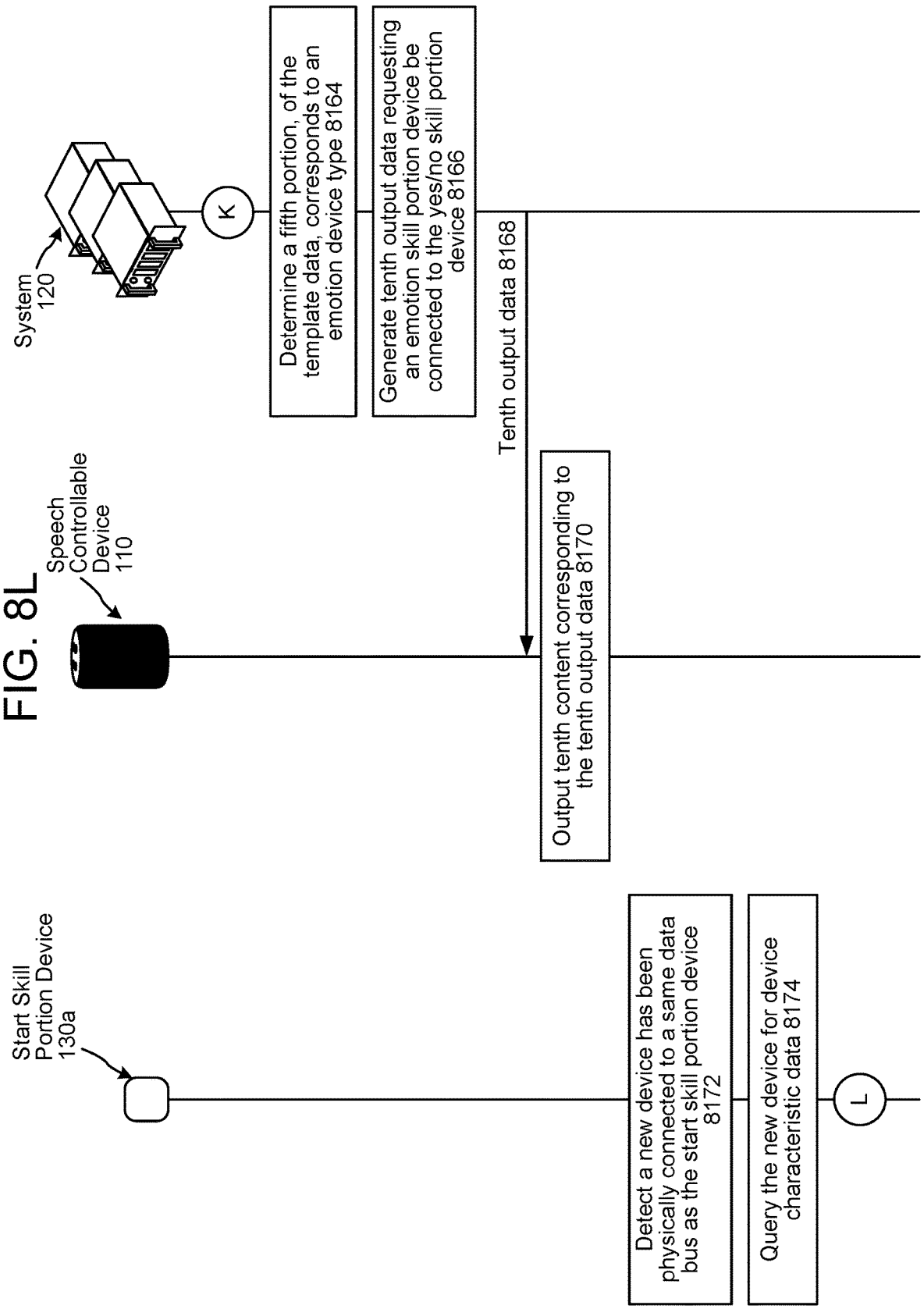
Figure 8M:
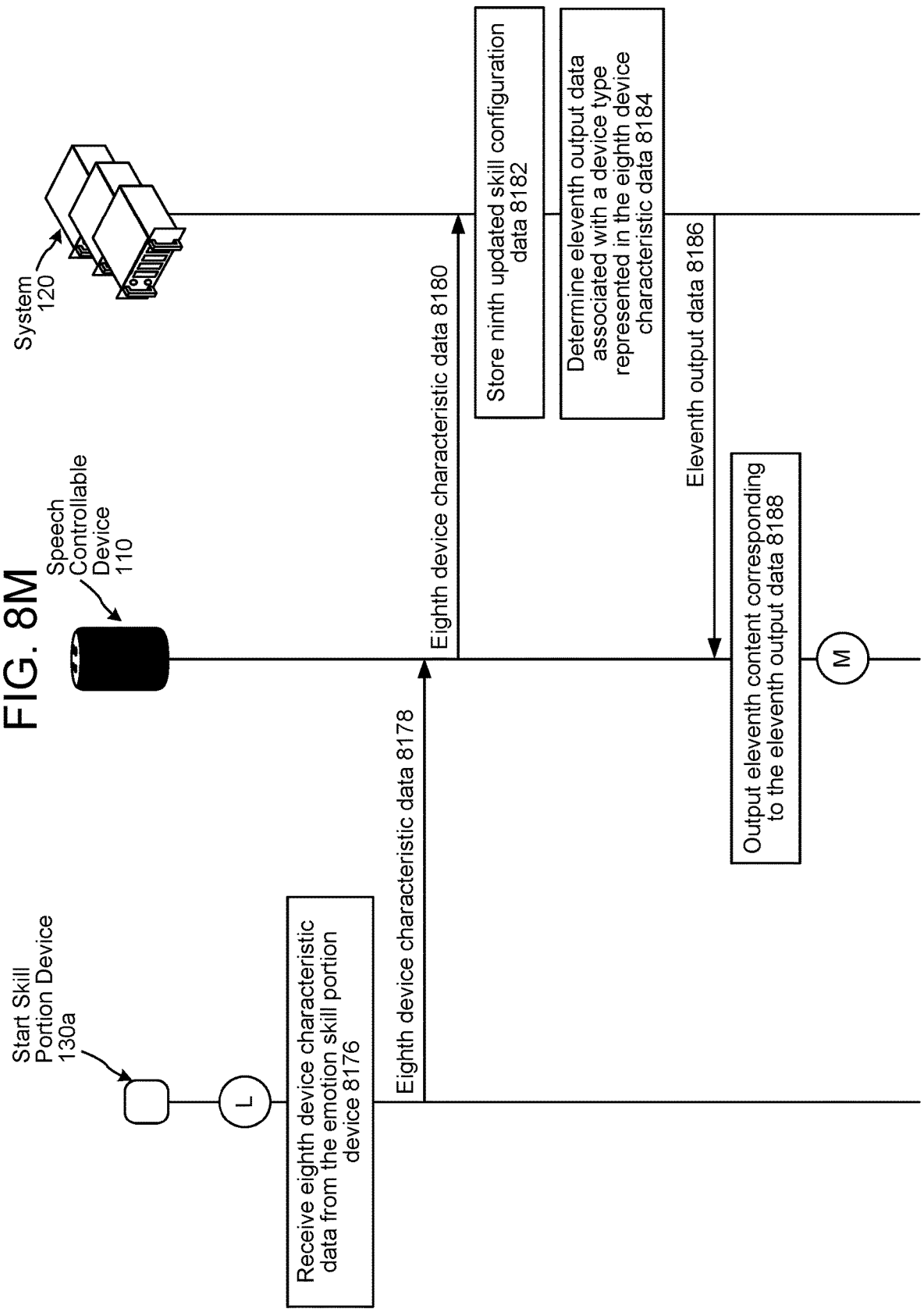

As illustrated in FIG. 8A, the speech controllable device 110 receives (802) a first user input from the user 5. For example, the speech controllable device 110 may receive audio corresponding to a spoken natural language input. In another example, the speech controllable device 110 may receive a text-based (e.g., typed) natural language input. For further example, the speech controllable device 110 may include or be in communication with a camera that captures a sequence of images representing the user 5 performing a gesture (a type of user input). In another example, the speech controllable device 110 may display a virtual button and detect the user 5 interacting with the button (with the button interaction being a type of user input). For further example, the speech controllable device 110 may receive data from a start skill portion device 130a, with the received data indicating the user 5 has actuated (e.g., single pressed, double pressed, pressed and held, etc.) a button on the start skill portion device 130a.

The speech controllable device 110 sends (804), to the system 120 receives, first input data representing the first user input. For example, the first input data may be audio data when the speech controllable device 110 receives a spoken natural language input. In another example, the first input data may be text data when the speech controllable device 110 receives a text-based (e.g., typed) natural language input. For further example, the first input data may be image data when the speech controllable device 110 receives a sequence of images representing the user 5 performing a gesture. Or the speech controllable device 110 may process the sequence of images to determine the gesture, and may send an indication of the gesture to the system 120. In another example, when the speech controllable device 110 detects the user 5 interacting with the button, the speech controllable device 110 may send first input data (representing the button interaction) to the system 120. For further example, when the speech controllable device 110 receives data from the start skill portion device 130a, the speech controllable device 110 may send the received data to the system 120.

After receiving the first input data, the system 120 processes (806) the first input data to determine the first user input indicates a skill is to be generated using the skill portion devices 130. For example, if the system 120 receives audio data from the speech controllable device 110, the system 120 may perform ASR processing on the audio data to generate ASR output data, and may perform NLU processing on the ASR output data to generate NLU output data corresponding to a semantic representation of the spoken natural language input to generate a skill using the skill portion devices 130. Alternatively, the system 120 may perform SLU processing on the audio data to generate the NLU output data. In another example, if the system 120 receives text data from the speech controllable device 110, the system 120 may perform NLU processing on the text data to generate NLU output data corresponding to a semantic representation of the text-based (e.g., typed) natural language input to generate a skill using the skill portion devices 130. For further example, if the system 120 receives image data from the speech controllable device 110, the system 120 may perform computer vision processing on the image data to determine the user-performed gesture, and may determine the gesture corresponds to a command to generate a skill using the skill portion devices 130. In another example, if the system 120 receives (from the speech controllable device 110) data representing a performed gesture, the system 120 may determine the gesture corresponds to a command to generate a skill using the skill portion devices 130. For further example, if the system 120 receives (from the speech controllable device 110) data representing a button interaction (either interaction of a button of the speech controllable device 110 or a button of the start skill portion device 130*a*), the system 120 may determine the button interaction corresponds to a command to generate a skill using the skill portion devices 130.

In response to determining the first user input indicates a skill is to be generated using the skill portion devices 130, the system 120 may determine (808) a template data corresponding to first skill. The template data may include different portions corresponding to different functionalities of the first skill. Each portion may be associated with a specific type of skill portion device 130. The system 120 may determine (810) a first portion, of the template data, corresponds to a voice changer device type. Based on this, the system 120 may generate (812) first output data requesting a voice changer skill portion device be connected to the start skill portion device. For example, the first output data may correspond to "Let's build an animal trivia skill. My voice normally sounds like this, but you can change my voice. Let's try that. Find a voice changer device and connect it to the start device."

The system 120 may send (814) the first output data to the speech controllable device 110, and the speech controllable device 110 may output (816) first content corresponding to the first output data. In at least some embodiments, the first output data may include natural language text data, and the speech controllable device 110 may display natural language text corresponding to the natural language text data. In at least some embodiments, the first output data may include audio data including synthesized speech, and the speech controllable device 110 may output audio corresponding to the synthesized speech. In at least some embodiments, the first output data may include natural language text data and audio data including synthesized speech. In such embodiments, the speech controllable device 110 may display natural language text corresponding to the natural language text data, and output audio corresponding to the synthesized speech.

In at least some embodiments, prior to sending the first output data to the speech controllable device 110, the system 120 may query the speech controllable device 110 for device identifiers corresponding to devices the speech controllable device 110 is detecting via Bluetooth Classic, Bluetooth LE, or some other wireless communication protocol. In response, the speech controllable device 110 may send a device identifier (of the start skill portion device 130*a*) to the system 120, the system 120 may determine the received device identifier corresponds to a start skill portion device associated with (or represented in) profile data associated with the speech controllable device 110 and/or the user 5, and may thereafter send the first output data to the speech controllable device 110.

In at least some embodiments, in response to receiving the query from the system 120, the speech controllable device 110 may not detect the start skill portion device 130*a* (e.g., due to the start skill portion device 130*a* not being powered on). In response, the speech controllable device 110 may send an indicator to the system 120 that the speech controllable device 110 is not detecting any devices. The system 120 may thereafter generate output data (including natural language text data and/or audio data including synthesized speech) prompting the user 5 to power on the start skill portion device 130*a*. The system 120 may send such output data to the speech controllable device 110 along with a directive to send the device identifier (of the start skill portion device 130*a*) to the system 120 once the speech controllable device 110 detects the start skill portion device 130*a*. The speech controllable device 110 may output content corresponding to the natural language text data and/or synthesized speech to power on the start skill portion device 130*a*. Upon detecting the start skill portion device 130*a*, the speech controllable device 110 may send the device identifier (of the start skill portion device 130*a*) to the system 120. In response, the system 120 may send the first output data to the speech controllable device 110.

Figure 7A:
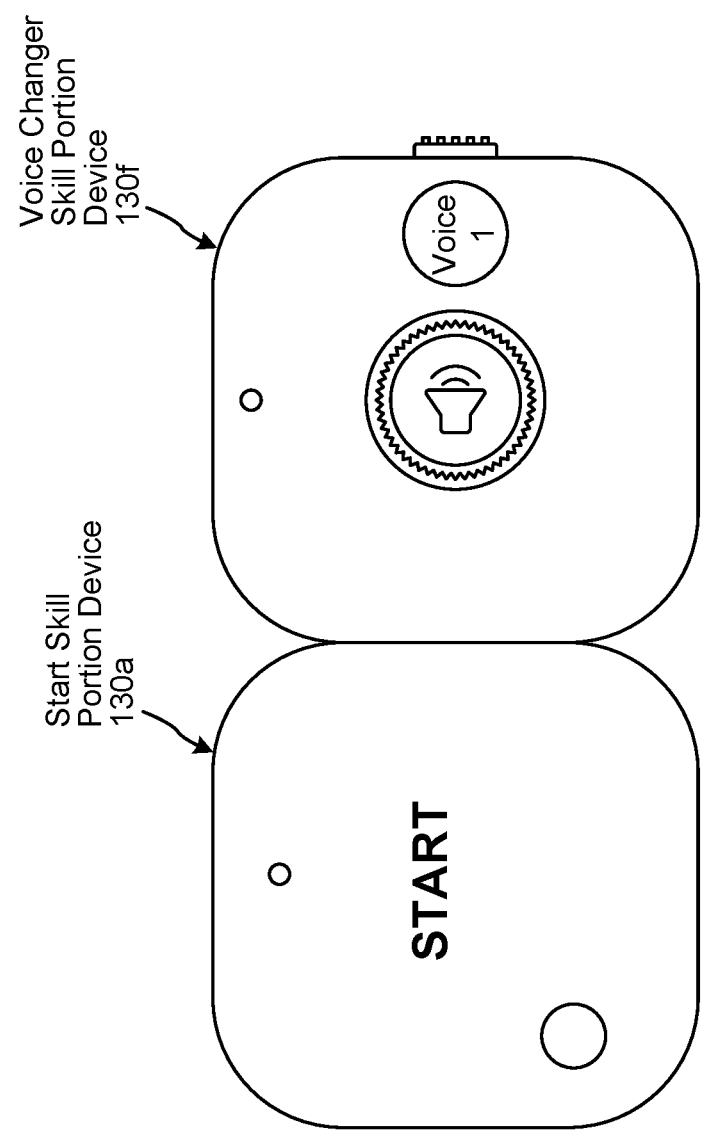

After the speech controllable device 110 outputs the first content, the user 5 may connect the voice changer skill portion device 130*f* to the start skill portion device 130*a*. An example of the resulting connected skill portion devices is illustrated in FIG. 7A.

Upon the voice changer skill portion device 130*f* being connected to the start skill portion device 130*a*, the start skill portion device 130*a* may detect (818) a new device has been physically connected to a same data bus as the start skill portion device 130*a*, but the start skill portion device 130*a* may not know any specifics of the device that was newly connected. Thus, when the start skill portion device 130*a* detects the new device, the start skill portion device 130*a* may query (820) (e.g., using an I2C probe when the bus is an I2C) the new device (i.e., the voice changer skill portion device 130*f*) for device characteristic data. Such device characteristic data may include, for example, a device identifier of the new device, a device type of the new device, a device identifier of a device to which the new device has newly been connected to (a "parent device"), and a direction in which the parent device is located with respect to the new device.

Thereafter, the start skill portion device 130*a* may receive (822) first device characteristic data from the voice changer skill portion device 130*f*. In at least some embodiments, the first device characteristic data may be represented in JavaScript Object Notation (JSON). In the example device connection configuration of FIG. 7A, a JSON representation of the first device characteristic data may include a payload including an "id" field having a value corresponding to a device identifier of the voice changer skill portion device 130*f*, a "type" field having a value of "voice changer," a "parent" field having a value corresponding to a device identifier of the start skill portion device 130*a*, and a "direction" field having a value of "left" or "west." The JSON may also include a "null" value for each other direction field corresponding to a connector of the voice changer skill portion device 130*f* that is not connected to another skill portion device 130.

The start skill portion device 130*a* sends (824) the first device characteristic data to the speech controllable device 110. For example, the start skill portion device 130a may send the first device characteristic data (to the speech controllable device 110) using Bluetooth Classic, Bluetooth LE, or some other wireless communication protocol. In turn, the speech controllable device 110 may send (826) the first device characteristic data to the system 120.

After receiving the first device characteristic data, the system 120 may store (828) skill configuration data representing a current configuration of the skill being generated. For example, the system 120 may store skill configuration data as illustrated in FIG. 9A.

In at least some embodiments, after the system 120 receives the first device characteristic data or after the system 120 stores the skill configuration data, the system 120 may determine audio data (e.g., corresponding to a sound) indicating the voice changer skill portion device 130f has been connected to the start skill portion device 130a. The system 120 may send the audio data to the speech controllable device 110, and the speech controllable device 110 may output audio (e.g., the sound) corresponding to the audio data.

In at least some embodiments, the system 120 may cause the speech controllable device 110 to output audio (e.g., a sound) representing the system 120 is waiting to receive the first device characteristic data. The system 120 may cause the speech controllable device 110 to output such audio from when the speech controllable device 110 has finished outputting the first content, until the system 120 has received the first device characteristic data (or has stored the skill configuration data). For example, the system 120 may send, to the speech controllable device 110, audio data (e.g., corresponding to the sound representing the system 120 is waiting to receive the first device characteristic data) and a directive to start outputting audio (corresponding to the audio data) once the speech controllable device 110 has finished outputting the first content. Thereafter, when the system 120 either receives the first device characteristic data or stores the skill configuration data, the system 120 may send, to the speech controllable device 110, another directive to cease outputting the audio.

The system 120 may store output data on a device type level, with the output data (of a device type) representing skill functionality provided by the device type. With respect to FIG. 8B, after storing the skill configuration data, the system 120 may determine (830) second output data associated with the device type represented in the first device characteristic data. For example, since the first device characteristic data includes a device type of "voice changer," the system 120 may determine second output data corresponding to the natural language "A voice changer device. This device changes the voice for the skill. Try moving the device's dial to a new voice."

The system 120 may send (832) the second output data to the speech controllable device 110, and the speech controllable device 110 may output (834) second content corresponding to the second output data. In at least some embodiments, the second output data may include natural language text data, and the speech controllable device 110 may display natural language text corresponding to the natural language text data. In at least some embodiments, the second output data may include audio data including synthesized speech, and the speech controllable device 110 may output audio corresponding to the synthesized speech. In at least some embodiments, the second output data may include natural language text data and audio data including synthesized speech. In such embodiments, the speech controllable device 110 may display natural language text corresponding to the natural language text data, and output audio corresponding to the synthesized speech.

After the speech controllable device 110 outputs the second content, the user 5 may turn a dial (of the voice changer skill portion device 130f) to a specific position corresponding to a specific voice (e.g., a specific synthesized voice, actor voice, actress voice, etc.). In response, the voice changer skill portion device 130f may output via the bus (and the start skill portion device 130a may receive (836), via the bus) second device characteristic data. In at least some embodiments, the second device characteristic data may be represented in JSON. A JSON representation of the second device characteristic data may include a payload including an "id" field having a value corresponding to a device identifier of the voice changer skill portion device 130f, a "type" field having a value of "voice changer," a "parent" field having a value corresponding to a device identifier of the start skill portion device 130a, a "direction" field having a value of "left" or "west," and a "position field" having a value corresponding to the new position of the dial. In at least some embodiments, the position field value may be an integer.

The start skill portion device 130a sends (838) the second device characteristic data to the speech controllable device 110. For example, the start skill portion device 130a may send the second device characteristic data (to the speech controllable device 110) using Bluetooth Classic, Bluetooth LE, or some other wireless communication protocol. In turn, the speech controllable device 110 may send (840) the second device characteristic data to the system 120.

After receiving the second device characteristic data, the system 120 may store (842) first updated skill configuration data representing a current configuration of the skill being generated. For example, the system 120 may store first updated skill configuration data including the skill configuration data updated with the position of the dial of the voice changer skill portion device 130f, as illustrated in FIG. 9B.

After storing the first updated skill configuration data, the system 120 may determine (844) a second portion, of the template data, corresponds to a speech device type. Based on this, the system 120 may generate (846) third output data requesting a speech skill portion device be connected to the voice changer skill portion device 130f. For example, the third output data may correspond to "Great, let's configure the skill to say something. Find and connect the speech device to the voice changer device."

The system 120 may send (848) the third output data to the speech controllable device 110, and the speech controllable device 110 may output (850) third content corresponding to the third output data. In at least some embodiments, the third output data may include natural language text data, and the speech controllable device 110 may display natural language text corresponding to the natural language text data. In at least some embodiments, the third output data may include audio data including synthesized speech, and the speech controllable device 110 may output audio corresponding to the synthesized speech. In at least some embodiments, the third output data may include natural language text data and audio data including synthesized speech. In such embodiments, the speech controllable device 110 may display natural language text corresponding to the natural language text data, and output audio corresponding to the synthesized speech.

Figure 7B:
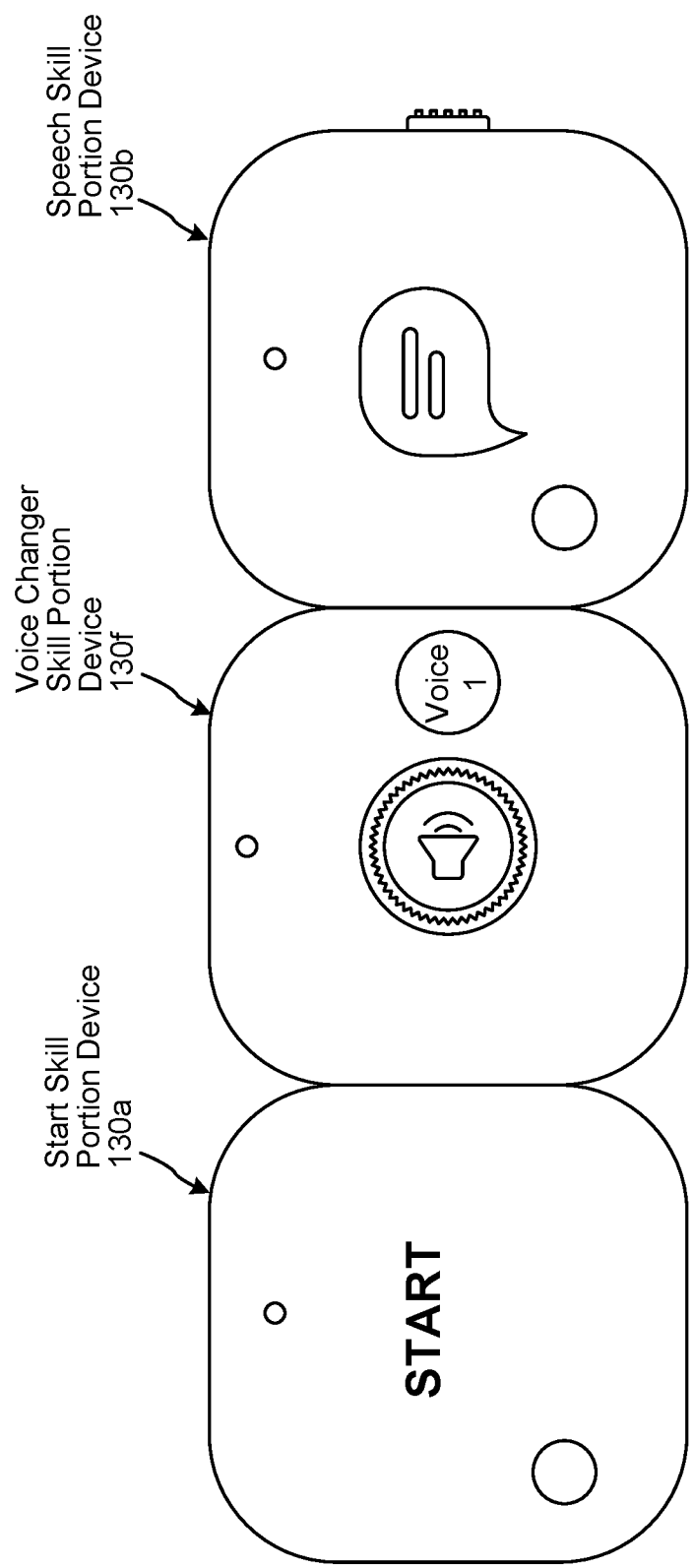

After the speech controllable device 110 outputs the third content, the user 5 may connect the speech skill portion device 130*b* to the voice changer skill portion device 130*f*. An example of the resulting connected skill portion devices is illustrated in FIG. 7B.

Upon the speech skill portion device 130*b* being connected to the voice changer skill portion device 130*f*, the start skill portion device 130*a* may detect (852) a new device has been physically connected to a same data bus as the start skill portion device 130*a*, but the start skill portion device 130*a* may not know any specifics of the device that was newly connected. Thus, when the start skill portion device 130*a* detects the new device, the start skill portion device 130*a* may query (854) (e.g., using an I2C probe when the bus is an I2C) the new device (i.e., the speech skill portion device 130*b*) for device characteristic data.

Thereafter, the start skill portion device 130*a* may receive (856) third device characteristic data from the speech skill portion device 130*b*. In at least some embodiments, the third device characteristic data may be represented in JSON. In the example device connection configuration of FIG. 7B, a JSON representation of the third device characteristic data may include a payload including an "id" field having a value corresponding to a device identifier of the speech skill portion device 130*b*, a "type" field having a value of "speech," a "parent" field having a value corresponding to a device identifier of the voice changer skill portion device 130*f*, and a "direction" field having a value of "left" or "west." The JSON may also include a "null" value for each other direction field corresponding to a connector of the speech skill portion device 130*b* that is not connected to another skill portion device 130.

The start skill portion device 130*a* sends (858) the third device characteristic data to the speech controllable device 110. For example, the start skill portion device 130*a* may send the third device characteristic data (to the speech controllable device 110) using Bluetooth Classic, Bluetooth LE, or some other wireless communication protocol. In turn, the speech controllable device 110 may send (860) the third device characteristic data to the system 120.

After receiving the third device characteristic data, the system 120 may store (862) second updated skill configuration data representing a current configuration of the skill being generated. For example, the system 120 may store second updated skill configuration data including the first updated skill configuration data updated with the third device characteristic data, as illustrated in FIG. 9C.

In at least some embodiments, after the system 120 receives the third device characteristic data or after the system 120 stores the second updated skill configuration data, the system 120 may determine audio data (e.g., corresponding to a sound) indicating the speech skill portion device 130*b* has been connected to the voice changer skill portion device 130*f*. The system 120 may send the audio data to the speech controllable device 110, and the speech controllable device 110 may output audio (e.g., the sound) corresponding to the audio data.

In at least some embodiments, the system 120 may cause the speech controllable device 110 to output audio (e.g., a sound) representing the system 120 is waiting to receive the third device characteristic data. The system 120 may cause the speech controllable device 110 to output such audio from when the speech controllable device 110 has finished outputting the third content, until the system 120 has received the third device characteristic data (or has stored the second updated skill configuration data). For example, the system 120 may send, to the speech controllable device 110, audio data (e.g., corresponding to the sound representing the system 120 is waiting to receive the third device characteristic data) and a directive to start outputting audio (corresponding to the audio data) once the speech controllable device 110 has finished outputting the third content. Thereafter, when the system 120 either receives the third device characteristic data or stores the second updated skill configuration data, the system 120 may send, to the speech controllable device 110, another directive to cease outputting the audio.

After storing the second updated skill configuration data, the system 120 may determine (864) fourth output data associated with the device type represented in the third device characteristic data. For example, since the third device characteristic data includes a device type of "speech," the system 120 may determine fourth output data corresponding to the natural language "Right, a speech device. You can use the speech device to have the skill output speech of whatever you would like. Let's welcome the user to the animal trivia skill we are building. Say whatever you would like. Maybe say something like welcome to animal trivia."

The system 120 may send (866) the fourth output data to the speech controllable device 110, and the speech controllable device 110 may output (868) fourth content corresponding to the fourth output data. In at least some embodiments, the fourth output data may include natural language text data, and the speech controllable device 110 may display natural language text corresponding to the natural language text data. In at least some embodiments, the fourth output data may include audio data including synthesized speech, and the speech controllable device 110 may output audio corresponding to the synthesized speech. In at least some embodiments, the fourth output data may include natural language text data and audio data including synthesized speech. In such embodiments, the speech controllable device 110 may display natural language text corresponding to the natural language text data, and output audio corresponding to the synthesized speech.

The fourth output data may also include (or the system 120 may separately send to the speech controllable device 110) a directive to cause the speech controllable device 110 to (after the speech controllable device 110 has finished outputting the fourth content) present an indication that the speech controllable device 110 is ready to receive a spoken input. Such directive may cause the speech controllable device 110 to activate a light (of the speech controllable device 110) in a particular manner, display natural language text, and/or output audio corresponding to a particular sound.

After the speech controllable device 110 outputs the fourth content (and optionally while the speech controllable device 110 is presenting the foregoing indication), the speech controllable device 110 may receive (870) a first spoken user input from the user 5, may generate (872) first audio data including the first spoken user input, and may send (874) the first audio data to the system 120.

After receiving the first audio data, the system 120 may store (876) third updated skill configuration data representing a current configuration of the skill being generated. For example, the system 120 may store third updated skill configuration data including the second updated skill configuration data updated with a speech data identifier, for example as illustrated in FIG. 9D.

In at least some embodiments, the system 120 may (with the user's permission) store the first audio data and include an identifier (of the stored first audio data) in the third updated skill configuration data. In at least some other embodiments, the system 120 may not be configured to store audio data representing user speech. In such embodiments, upon receiving the first audio data, the system 120 may perform ASR processing on the first audio data to generate ASR output data, store the ASR output data, and include an identifier (of the stored ASR output data) in the third updated skill configuration data.

In at least some embodiments, prior to storing the ASR output data, the system 120 may check with the user to ensure the ASR output data accurately represents the first spoken user input. In such embodiments, after generating the ASR output data, the system 120 may perform TTS processing on the ASR output data to generate audio data including synthesized speech representing the ASR output data. The system 120 may send, to the speech controllable device 110, the foregoing audio data as well as prompt audio data including synthesized speech prompting the user 5 to confirm the synthesized speech (representing the ASR output data) accurately represents the first spoken user input. In response, the speech controllable device 110 may output audio corresponding to the prompt synthesized speech and the synthesized speech representing the ASR output data.

Thereafter, the speech controllable device 110 may receive a user input. For example, the speech controllable device 110 may receive audio corresponding to a spoken user input, text corresponding to a typed user input, selection of a displayed button, a sequence of images of a user performing a gesture, etc.

The speech controllable device 110 may send data representing the user input to the system 120. For example, when the speech controllable device 110 receives audio corresponding to a spoken user input, the speech controllable device 110 may send audio data to the system 120. For further example, when the speech controllable device 110 receives text corresponding to a typed user input, the speech controllable device 110 may send text data to the system 120. In another example, when the speech controllable device 110 detects selection of a displayed button, the speech controllable device 110 may send data (representing the button selected and/or how the button was interacted with (e.g., pressed, double pressed, pressed for at least a threshold duration of time, etc.)) to the system 120. For further example, when the speech controllable device 110 captures a sequence of images of a user performing a gesture, the speech controllable device 110 may send image data to the system 120. Or the speech controllable device 110 may perform computer vision processing on the image data to determine the performed gesture, and may send an indication of the gesture to the system 120.

In response, the system 120 may process the received data to determine the user's input confirms the synthesized speech accurately represents the first spoken user input. For example, when the system 120 receives audio data from the speech controllable device 110, the system 120 may perform ASR processing on the audio data to generate ASR output data, and may perform NLU processing on the ASR output data to generate NLU output data corresponding to a semantic representation of the spoken input confirming the synthesized speech accurately represents the first spoken user input. Alternatively, the system 120 may perform SLU processing on the audio data to generate the NLU output data. For further example, when the system 120 receives text data from the speech controllable device 110, the system 120 may perform NLU processing on the text data to generate the NLU output data. In another example, when the system 120 receives data representing selection of the button, the system 120 may determine the selected button (and/or how the button was selected (e.g., pressed, double pressed, pressed for at least a threshold duration, etc.)) corresponds to a user input confirming the synthesized speech accurately represents the first spoken user input. For further example, when the system 120 receives image data from the speech controllable device 110, the system 120 may perform computer vision processing on the image data to determine a performed gesture, and may determine the gesture (e.g., the nodding of the user's head, the user 5 giving a thumbs up, etc.) corresponds to a user input confirming the synthesized speech accurately represents the first spoken user input. In another example, when the system 120 receives an indication of a performed gesture from the speech controllable device 110, the system 120 may determine the gesture corresponds to a user input confirming the synthesized speech accurately represents the first spoken user input. Upon determining the user confirmed the synthesized speech accurately represents the first spoken user input, the system 120 may include the identifier (of the stored ASR output data) in the third updated skill configuration data.

After storing the third updated skill configuration data, the system 120 may determine (878) a third portion, of the template data, corresponds to a question device type. Based on this, the system 120 may generate (880) fifth output data requesting a question skill portion device be connected to the speech skill portion device 130*b*. For example, the fifth output data may correspond to "Alright, now let's cause the skill to ask the user a question. To do this, connect a question device to the speech device."

The system 120 may send (882) the fifth output data to the speech controllable device 110, and the speech controllable device 110 may output (884) fifth content corresponding to the fifth output data. In at least some embodiments, the fifth output data may include natural language text data, and the speech controllable device 110 may display natural language text corresponding to the natural language text data. In at least some embodiments, the fifth output data may include audio data including synthesized speech, and the speech controllable device 110 may output audio corresponding to the synthesized speech. In at least some embodiments, the fifth output data may include natural language text data and audio data including synthesized speech. In such embodiments, the speech controllable device 110 may display natural language text corresponding to the natural language text data, and output audio corresponding to the synthesized speech.

After the speech controllable device 110 outputs the fifth content, the user 5 may connect the question skill portion device 130*c* to the speech skill portion device 130*b*. An example of the resulting connected skill portion devices is illustrated in FIG. 7C.

Upon the question skill portion device 130*c* being connected to the voice changer skill portion device 130*b*, the start skill portion device 130*a* may detect (886) a new device has been physically connected to a same data bus as the start skill portion device 130*a*, but the start skill portion device 130*a* may not know any specifics of the device that was newly connected. Thus, when the start skill portion device 130*a* detects the new device, the start skill portion device 130*a* may query (888) (e.g., using an I2C probe when the bus is an I2C) the new device (i.e., the question skill portion device 130*c*) for device characteristic data.

Thereafter, the start skill portion device 130*a* may receive (890) fourth device characteristic data from the question skill portion device 130*c*. In at least some embodiments, the fourth device characteristic data may be represented in JSON. In the example device connection configuration of FIG. 7C, a JSON representation of the fourth device characteristic data may include a payload including an "id" field having a value corresponding to a device identifier of the question skill portion device 130*c*, a "type" field having a value of "question," a "parent" field having a value corresponding to a device identifier of the speech skill portion device 130*b*, and a "direction" field having a value of "left" or "west." The JSON may also include a "null" value for each other direction field corresponding to a connector of the question skill portion device 130*c* that is not connected to another skill portion device 130.

The start skill portion device 130*a* sends (892) the fourth device characteristic data to the speech controllable device 110. For example, the start skill portion device 130*a* may send the fourth device characteristic data (to the speech controllable device 110) using Bluetooth Classic, Bluetooth LE, or some other wireless communication protocol. In turn, the speech controllable device 110 may send (894) the fourth device characteristic data to the system 120.

After receiving the fourth device characteristic data, the system 120 may store (896) fourth updated skill configuration data representing a current configuration of the skill being generated. For example, the system 120 may store fourth updated skill configuration data including the third updated skill configuration data updated with the fourth device characteristic data, for example as illustrated in FIG. 9E.

In at least some embodiments, after the system 120 receives the fourth device characteristic data or after the system 120 stores the fourth updated skill configuration data, the system 120 may determine audio data (e.g., corresponding to a sound) indicating the question skill portion device 130*c* has been connected to the speech skill portion device 130*b*. The system 120 may send the audio data to the speech controllable device 110, and the speech controllable device 110 may output audio (e.g., the sound) corresponding to the audio data.

In at least some embodiments, the system 120 may cause the speech controllable device 110 to output audio (e.g., a sound) representing the system 120 is waiting to receive the fourth device characteristic data. The system 120 may cause the speech controllable device 110 to output such audio from when the speech controllable device 110 has finished outputting the fifth content, until the system 120 has received the fourth device characteristic data (or has stored the fourth updated skill configuration data). For example, the system 120 may send, to the speech controllable device 110, audio data (e.g., corresponding to the sound representing the system 120 is waiting to receive the fourth device characteristic data) and a directive to start outputting audio (corresponding to the audio data) once the speech controllable device 110 has finished outputting the fifth content. Thereafter, when the system 120 either receives the fourth device characteristic data or stores the fourth updated skill configuration data, the system 120 may send, to the speech controllable device 110, another directive to cease outputting the audio.

After storing the fourth updated skill configuration data, the system 120 may determine (898) sixth output data associated with the device type represented in the fourth device characteristic data. For example, since the fourth device characteristic data includes a device type of "question," the system 120 may determine sixth output data corresponding to the natural language "This is a question device. Use this device to ask the user any question you would like. Let's ask a yes or no question. For example, say do cows have a tail."

The system 120 may send (8100) the sixth output data to the speech controllable device 110, and the speech controllable device 110 may output (8102) sixth content corresponding to the sixth output data. In at least some embodiments, the sixth output data may include natural language text data, and the speech controllable device 110 may display natural language text corresponding to the natural language text data. In at least some embodiments, the sixth output data may include audio data including synthesized speech, and the speech controllable device 110 may output audio corresponding to the synthesized speech. In at least some embodiments, the sixth output data may include natural language text data and audio data including synthesized speech. In such embodiments, the speech controllable device 110 may display natural language text corresponding to the natural language text data, and output audio corresponding to the synthesized speech.

The sixth output data may also include (or the system 120 may separately send to the speech controllable device 110) a directive to cause the speech controllable device 110 to (after the speech controllable device 110 has finished outputting the sixth content) present an indication that the speech controllable device 110 is ready to receive a spoken input. Such directive may cause the speech controllable device 110 to activate a light (of the speech controllable device 110) in a particular manner, display natural language text, and/or output audio corresponding to a particular sound.

After the speech controllable device 110 outputs the sixth content (and optionally while the speech controllable device 110 is presenting the foregoing indication), the speech controllable device 110 may receive (8104) a second spoken user input from the user 5, may generate (8106) second audio data including the second spoken user input, and may send (8108) the second audio data to the system 120.

After receiving the second audio data, the system 120 may store (8110) fifth updated skill configuration data representing a current configuration of the skill being generated. For example, the system 120 may store fifth updated skill configuration data including the fourth updated skill configuration data updated with the question data identifier, for example as illustrated in FIG. 9F.

In at least some embodiments, the system 120 may (with the user's permission) store the second audio data and include an identifier (of the stored second audio data) in the fifth updated skill configuration data. In at least some other embodiments, the system 120 may not be configured to store audio data representing user speech. In such embodiments, upon receiving the second audio data, the system 120 may perform ASR processing on the second audio data to generate ASR output data, store the ASR output data, and include an identifier (of the stored ASR output data) in the fifth updated skill configuration data.

In at least some embodiments, prior to storing the ASR output data, the system 120 may check with the user to ensure the ASR output data accurately represents the second spoken user input. In such embodiments, after generating the ASR output data, the system 120 may perform TTS processing on the ASR output data to generate audio data including synthesized speech representing the ASR output data. The system 120 may send, to the speech controllable device 110, the foregoing audio data as well as prompt audio data including synthesized speech prompting the user 5 to confirm the synthesized speech (representing the ASR output data) accurately represents the second spoken user input. In response, the speech controllable device 110 may output audio corresponding to the prompt synthesized speech and the synthesized speech representing the ASR output data.

Thereafter, the speech controllable device 110 may receive a user input. For example, the speech controllable device 110 may receive audio corresponding to a spoken user input, text corresponding to a typed user input, selection of a displayed button, a sequence of images of a user performing a gesture, etc.

The speech controllable device 110 may send data representing the user input to the system 120. For example, when the speech controllable device 110 receives audio corresponding to a spoken user input, the speech controllable device 110 may send audio data to the system 120. For further example, when the speech controllable device 110 receives text corresponding to a typed user input, the speech controllable device 110 may send text data to the system 120. In another example, when the speech controllable device 110 detects selection of a displayed button, the speech controllable device 110 may send data (representing the button selected and/or how the button was interacted with (e.g., pressed, double pressed, pressed for at least a threshold duration of time, etc.)) to the system 120. For further example, when the speech controllable device 110 captures a sequence of images of a user performing a gesture, the speech controllable device 110 may send image data to the system 120. Or the speech controllable device 110 may perform computer vision processing on the image data to determine the performed gesture, and may send an indication of the gesture to the system 120.

In response, the system 120 may process the received data to determine the user's input confirms the synthesized speech accurately represents the second spoken user input. For example, when the system 120 receives audio data from the speech controllable device 110, the system 120 may perform ASR processing on the audio data to generate ASR output data, and may perform NLU processing on the ASR output data to generate NLU output data corresponding to a semantic representation of the spoken input confirming the synthesized speech accurately represents the second spoken user input. Alternatively, the system 120 may perform SLU processing on the audio data to generate the NLU output data. For further example, when the system 120 receives text data from the speech controllable device 110, the system 120 may perform NLU processing on the text data to generate the NLU output data. In another example, when the system 120 receives data representing selection of the button, the system 120 may determine the selected button (and/or how the button was selected (e.g., pressed, double pressed, pressed for at least a threshold duration, etc.)) corresponds to a user input confirming the synthesized speech accurately represents the second spoken user input. For further example, when the system 120 receives image data from the speech controllable device 110, the system 120 may perform computer vision processing on the image data to determine a performed gesture, and may determine the gesture (e.g., the nodding of the user's head, the user 5 giving a thumbs up, etc.) corresponds to a user input confirming the synthesized speech accurately represents the second spoken user input. In another example, when the system 120 receives an indication of a performed gesture from the speech controllable device 110, the system 120 may determine the gesture corresponds to a user input confirming the synthesized speech accurately represents the second spoken user input. Upon determining the user confirmed the synthesized speech accurately represents the second spoken user input, the system 120 may include the identifier (of the stored ASR output data) in the fifth updated skill configuration data.

After storing the fifth updated skill configuration data, the system 120 may determine (8112) a fourth portion, of the template data, corresponds to a yes/no device type. Based on this, the system 120 may generate (8114) seventh output data requesting a yes/no skill portion device be connected to the question skill portion device 130c. For example, the seventh output data may correspond to "Ok, now that we have our question, we need to get the user's answer. Since we want a yes or no answer, connect a yes/no device to the question device."

The system 120 may send (8116) the seventh output data to the speech controllable device 110, and the speech controllable device 110 may output (8118) seventh content corresponding to the seventh output data. In at least some embodiments, the seventh output data may include natural language text data, and the speech controllable device 110 may display natural language text corresponding to the natural language text data. In at least some embodiments, the seventh output data may include audio data including synthesized speech, and the speech controllable device 110 may output audio corresponding to the synthesized speech. In at least some embodiments, the seventh output data may include natural language text data and audio data including synthesized speech. In such embodiments, the speech controllable device 110 may display natural language text corresponding to the natural language text data, and output audio corresponding to the synthesized speech.

Figure 7D:
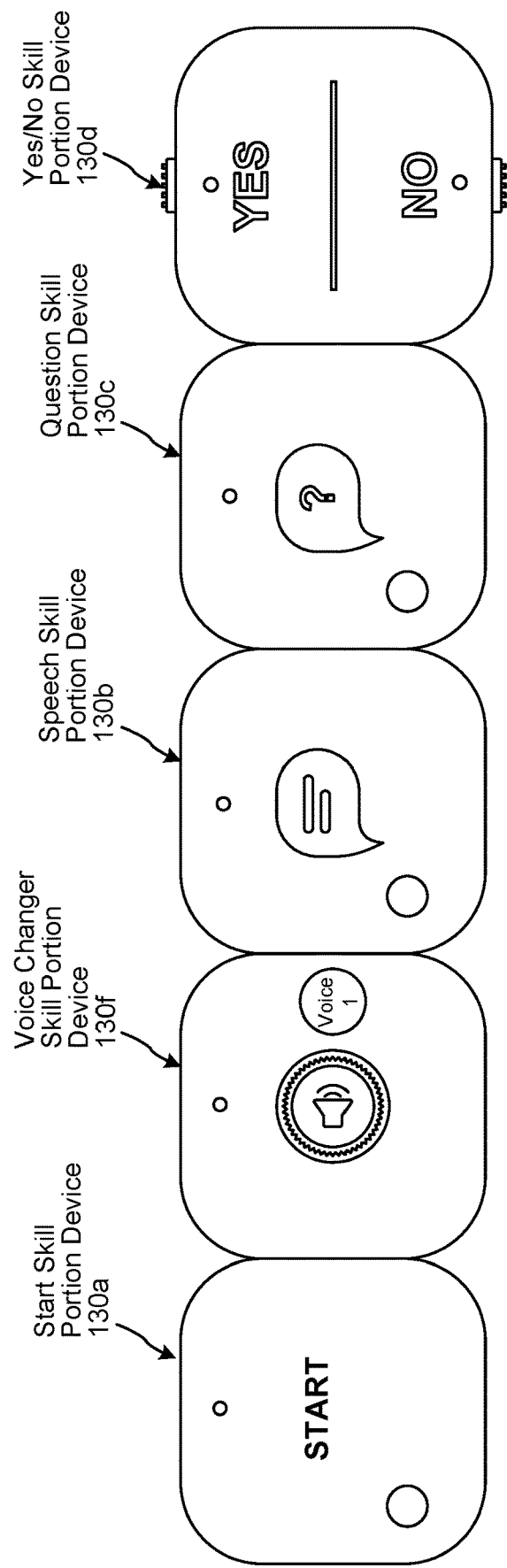

After the speech controllable device 110 outputs the seventh content, the user 5 may connect the yes/no skill portion device 130d to the question skill portion device 130c. An example of the resulting connected skill portion devices is illustrated in FIG. 7D.

Upon the yes/no skill portion device 130d being connected to the question changer skill portion device 130c, the start skill portion device 130a may detect (8120) a new device has been physically connected to a same data bus as the start skill portion device 130a, but the start skill portion device 130a may not know any specifics of the device that was newly connected. Thus, when the start skill portion device 130a detects the new device, the start skill portion device 130a may query (8122) (e.g., using an I2C probe when the bus is an I2C) the new device (i.e., the yes/no skill portion device 130d) for device characteristic data.

Thereafter, the start skill portion device 130a may receive (8124) fifth device characteristic data from the yes/no skill portion device 130d. In at least some embodiments, the fifth device characteristic data may be represented in JSON. In the example device connection configuration of FIG. 7D, a JSON representation of the fifth device characteristic data may include a payload including an "id" field having a value corresponding to a device identifier of the yes/no skill portion device 130d, a "type" field having a value of "yes/no," a "parent" field having a value corresponding to a device identifier of the question skill portion device 130c, and a "direction" field having a value of "left" or "west." The JSON may also include a "null" value for each other direction field corresponding to a connector of the yes/no skill portion device 130d that is not connected to another skill portion device 130.

The start skill portion device 130a sends (8126) the fifth device characteristic data to the speech controllable device 110. For example, the start skill portion device 130a may send the fourth device characteristic data (to the speech controllable device 110) using Bluetooth Classic, Bluetooth LE, or some other wireless communication protocol. In turn, the speech controllable device 110 may send (8128) the fifth device characteristic data to the system 120.

After receiving the fifth device characteristic data, the system 120 may store (8130) sixth updated skill configuration data representing a current configuration of the skill being generated. For example, the system 120 may store sixth updated skill configuration data including the fifth updated skill configuration data updated with the fifth device characteristic data, for example as illustrated in FIG. 9G.

In at least some embodiments, after the system 120 receives the fifth device characteristic data or after the system 120 stores the sixth updated skill configuration data, the system 120 may determine audio data (e.g., corresponding to a sound) indicating the yes/no skill portion device 130d has been connected to the question skill portion device 130c. The system 120 may send the audio data to the speech controllable device 110, and the speech controllable device 110 may output audio (e.g., the sound) corresponding to the audio data.

In at least some embodiments, the system 120 may cause the speech controllable device 110 to output audio (e.g., a sound) representing the system 120 is waiting to receive the fifth device characteristic data. The system 120 may cause the speech controllable device 110 to output such audio from when the speech controllable device 110 has finished outputting the sixth content, until the system 120 has received the fifth device characteristic data (or has stored the sixth updated skill configuration data). For example, the system 120 may send, to the speech controllable device 110, audio data (e.g., corresponding to the sound representing the system 120 is waiting to receive the fifth device characteristic data) and a directive to start outputting audio (corresponding to the audio data) once the speech controllable device 110 has finished outputting the sixth content. Thereafter, when the system 120 either receives the fifth device characteristic data or stores the sixth updated skill configuration data, the system 120 may send, to the speech controllable device 110, another directive to cease outputting the audio.

After storing the sixth updated skill configuration data, the system 120 may determine (8132) eighth output data associated with the device type represented in the fifth device characteristic data. For example, since the fifth device characteristic data includes a device type of "yes/no," the system 120 may determine eighth output data corresponding to the natural language "A yes/no device. This device gets the answer, then goes up if the user provides a correct answer, or goes down if the user provides an incorrect answer. You get to decide what happens next by connecting devices up or down. Last I checked, cows do have tails. So let's congratulate a correct answer with a cow moo. Find the sound effect device and attach it to the yes side of the yes/no device."

The system 120 may send (8134) the eighth output data to the speech controllable device 110, and the speech controllable device 110 may output (8136) eighth content corresponding to the eighth output data. In at least some embodiments, the eighth output data may include natural language text data, and the speech controllable device 110 may display natural language text corresponding to the natural language text data. In at least some embodiments, the eighth output data may include audio data including synthesized speech, and the speech controllable device 110 may output audio corresponding to the synthesized speech. In at least some embodiments, the eighth output data may include natural language text data and audio data including synthesized speech. In such embodiments, the speech controllable device 110 may display natural language text corresponding to the natural language text data, and output audio corresponding to the synthesized speech.

Figure 7E:
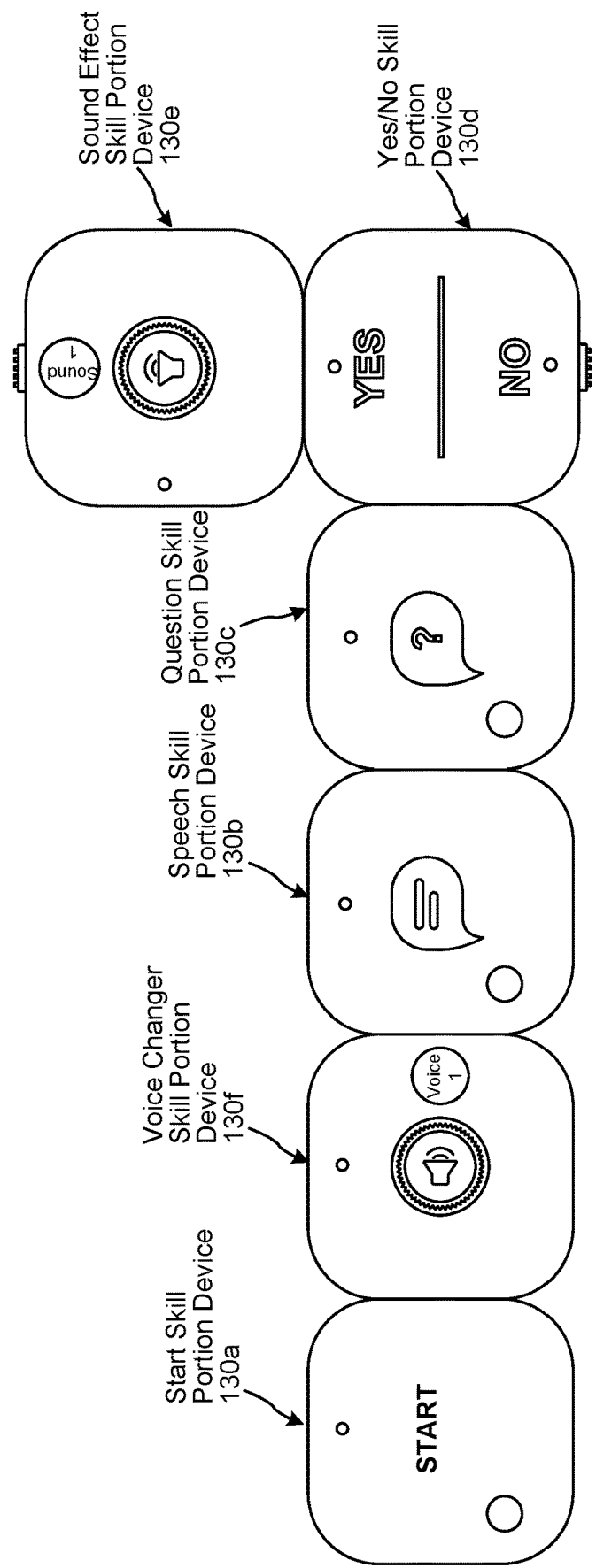

After the speech controllable device 110 outputs the eighth content, the user 5 may connect the sound effect skill portion device 130e to the "yes" connector of the yes/no skill portion device 130d. An example of the resulting connected skill portion devices is illustrated in FIG. 7E.

Upon the sound effect skill portion device 130e being connected to the yes/no skill portion device 130d, the start skill portion device 130a may detect (8138) a new device has been physically connected to a same data bus as the start skill portion device 130a, but the start skill portion device 130a may not know any specifics of the device that was newly connected. Thus, when the start skill portion device 130a detects the new device, the start skill portion device 130a may query (8140) (e.g., using an I2C probe when the bus is an I2C) the new device (i.e., the sound effect skill portion device 130e) for device characteristic data.

Thereafter, the start skill portion device 130a may receive (8142) sixth device characteristic data from the sound effect skill portion device 130e. In at least some embodiments, the sixth device characteristic data may be represented in JSON. In the example device connection configuration of FIG. 7E, a JSON representation of the sixth device characteristic data may include a payload including an "id" field having a value corresponding to a device identifier of the sound effect skill portion device 130e, a "type" field having a value of "sound effect," a "parent" field having a value corresponding to a device identifier of the yes/no skill portion device 130d, and a "direction" field having a value of "left" or "west." The JSON may also include a "null" value for each other direction field corresponding to a connector of the sound effect skill portion device 130e that is not connected to another skill portion device 130.

The start skill portion device 130a sends (844) the sixth device characteristic data to the speech controllable device 110. For example, the start skill portion device 130a may send the sixth device characteristic data (to the speech controllable device 110) using Bluetooth Classic, Bluetooth LE, or some other wireless communication protocol. In turn, the speech controllable device 110 may send (846) the sixth device characteristic data to the system 120.

After receiving the sixth device characteristic data, the system 120 may store (8148) seventh updated skill configuration data representing a current configuration of the skill being generated. For example, the system 120 may store seventh updated skill configuration data including the sixth updated skill configuration data updated with the sixth device characteristic data, for example as illustrated in FIG. 9H.

In at least some embodiments, after the system 120 receives the sixth device characteristic data or after the system 120 stores the seventh updated skill configuration data, the system 120 may determine audio data (e.g., corresponding to a sound) indicating the sound effect skill portion device 130e has been connected to the yes/no skill portion device 130d. The system 120 may send the audio data to the speech controllable device 110, and the speech controllable device 110 may output audio (e.g., the sound) corresponding to the audio data.

In at least some embodiments, the system 120 may cause the speech controllable device 110 to output audio (e.g., a sound) representing the system 120 is waiting to receive the sixth device characteristic data. The system 120 may cause the speech controllable device 110 to output such audio from when the speech controllable device 110 has finished outputting the eighth content, until the system 120 has received the sixth device characteristic data (or has stored the seventh updated skill configuration data). For example, the system 120 may send, to the speech controllable device 110, audio data (e.g., corresponding to the sound representing the system 120 is waiting to receive the sixth device characteristic data) and a directive to start outputting audio (corresponding to the audio data) once the speech controllable device 110 has finished outputting the eighth content. Thereafter, when the system 120 either receives the sixth device characteristic data or stores the seventh updated skill configuration data, the system 120 may send, to the speech controllable device 110, another directive to cease outputting the audio.

After storing the seventh updated skill configuration data, the system 120 may determine (8150) ninth output data associated with the device type represented in the sixth device characteristic data. For example, since the sixth device characteristic data includes a device type of "sound effect," the system 120 may determine ninth output data corresponding to the natural language "You have connected a sound effect device. Use the dial to find the cow moo."

The system 120 may send (8152) the ninth output data to the speech controllable device 110, and the speech controllable device 110 may output (8154) ninth content corresponding to the ninth output data. In at least some embodiments, the ninth output data may include natural language text data, and the speech controllable device 110 may display natural language text corresponding to the natural language text data. In at least some embodiments, the ninth output data may include audio data including synthesized speech, and the speech controllable device 110 may output audio corresponding to the synthesized speech. In at least some embodiments, the ninth output data may include natural language text data and audio data including synthesized speech. In such embodiments, the speech controllable device 110 may display natural language text corresponding to the natural language text data, and output audio corresponding to the synthesized speech.

After the speech controllable device 110 outputs the ninth content, the user 5 may turn a dial (of the sound effect skill portion device 130e) to a specific position corresponding to a cow moo. In response, the sound effect skill portion device 130e may output via the bus (and the start skill portion device 130a may receive (8156), via the bus) seventh device characteristic data. In at least some embodiments, the seventh device characteristic data may be represented in JSON. A JSON representation of the seventh device characteristic data may include a payload including an "id" field having a value corresponding to a device identifier of the sound effect skill portion device 130e, a "type" field having a value of "sound effect," a "parent" field having a value corresponding to a device identifier of the yes/no skill portion device 130d, a "direction" field having a value of "left" or "west," and a "position field" having a value corresponding to the new position of the dial. In at least some embodiments, the position field value may be an integer.

The start skill portion device 130a sends (8158) the seventh device characteristic data to the speech controllable device 110. For example, the start skill portion device 130a may send the seventh device characteristic data (to the speech controllable device 110) using Bluetooth Classic, Bluetooth LE, or some other wireless communication protocol. In turn, the speech controllable device 110 may send (8160) the seventh device characteristic data to the system 120.

After receiving the seventh device characteristic data, the system 120 may store (842) eighth updated skill configuration data representing a current configuration of the skill being generated. For example, the system 120 may store eighth updated skill configuration data including the seventh updated skill configuration data updated with the position of the dial of the sound effect skill portion device 130e, for example as illustrated in FIG. 9I.

After storing the eighth updated skill configuration data, the system 120 may determine (864) a fifth portion, of the template data, corresponds to an emotion device type. Based on this, the system 120 may generate (8166) tenth output data requesting an emotion skill portion device be connected to the "no" connector of the yes/no skill portion device 130d. For example, the tenth output data may correspond to "Great, now let's find the answer for the no side of the yes/no device. Find an emotion device and connect it to the no side of the yes/no device."

The system 120 may send (8168) the tenth output data to the speech controllable device 110, and the speech controllable device 110 may output (8170) tenth content corresponding to the tenth output data. In at least some embodiments, the tenth output data may include natural language text data, and the speech controllable device 110 may display natural language text corresponding to the natural language text data. In at least some embodiments, the tenth output data may include audio data including synthesized speech, and the speech controllable device 110 may output audio corresponding to the synthesized speech. In at least some embodiments, the tenth output data may include natural language text data and audio data including synthesized speech. In such embodiments, the speech controllable device 110 may display natural language text corresponding to the natural language text data, and output audio corresponding to the synthesized speech.

Figure 7F:
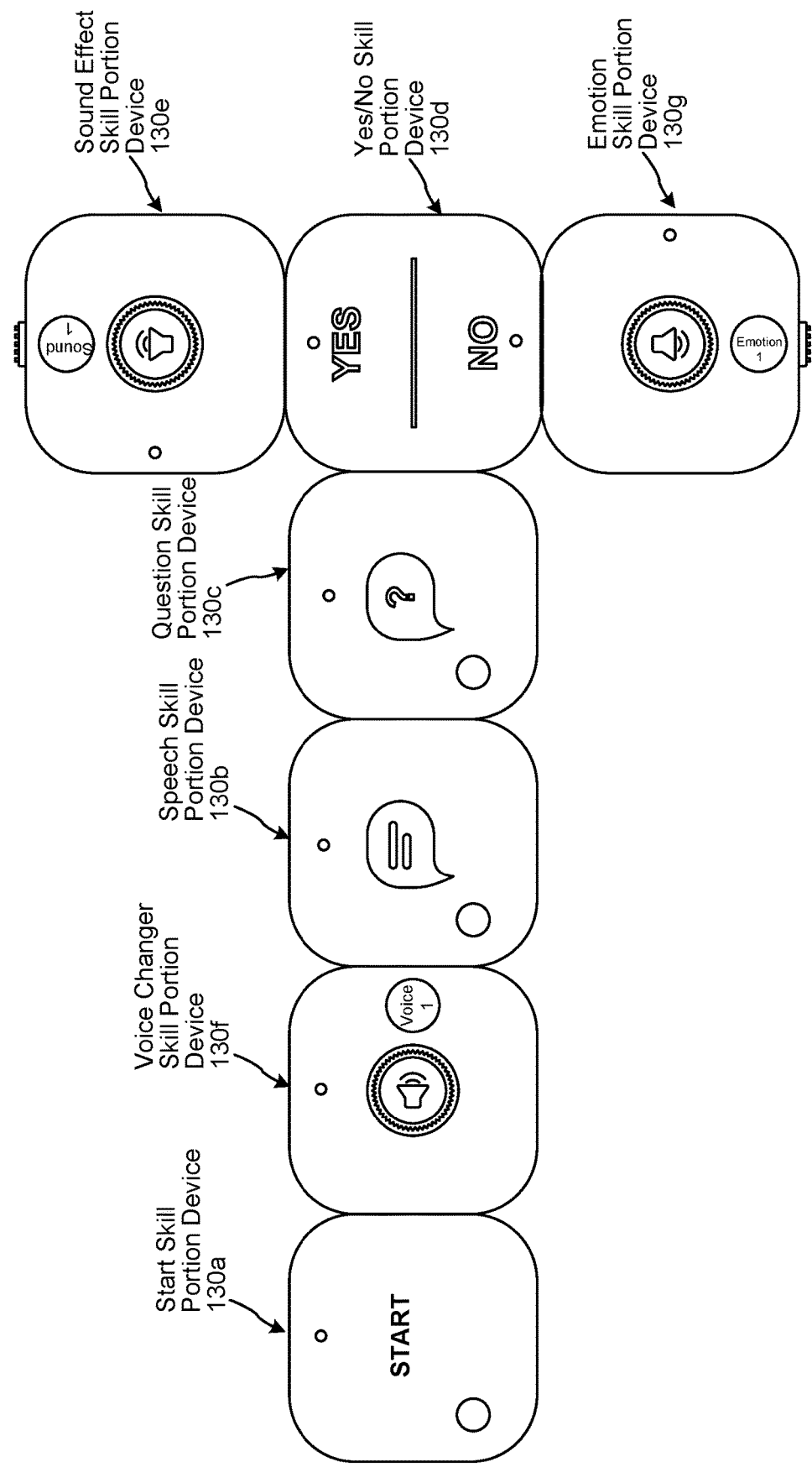

After the speech controllable device 110 outputs the tenth content, the user 5 may connect the emotion skill portion device 130g to the "no" connector of the yes/no skill portion device 130d. An example of the resulting connected skill portion devices is illustrated in FIG. 7F.

Upon the emotion skill portion device 130g being connected to the yes/no skill portion device 130d, the start skill portion device 130a may detect (8172) a new device has been physically connected to a same data bus as the start skill portion device 130a, but the start skill portion device 130a may not know any specifics of the device that was newly connected. Thus, when the start skill portion device 130a detects the new device, the start skill portion device 130a may query (8174) (e.g., using an I2C probe when the bus is an I2C) the new device (i.e., the emotion skill portion device 130g) for device characteristic data.

Thereafter, the start skill portion device 130a may receive (8176) eighth device characteristic data from the emotion skill portion device 130g. In at least some embodiments, the eighth device characteristic data may be represented in JSON. In the example device connection configuration of FIG. 7F, a JSON representation of the eighth device characteristic data may include a payload including an "id" field having a value corresponding to a device identifier of the emotion skill portion device 130g, a "type" field having a value of "emotion," a "parent" field having a value corresponding to a device identifier of the yes/no skill portion device 130d, and a "direction" field having a value of "left" or "west." The JSON may also include a "null" value for each other direction field corresponding to a connector of the emotion skill portion device 130g that is not connected to another skill portion device 130.

The start skill portion device 130a sends (8178) the eighth device characteristic data to the speech controllable device 110. For example, the start skill portion device 130a may send the eighth device characteristic data (to the speech controllable device 110) using Bluetooth Classic, Bluetooth LE, or some other wireless communication protocol. In turn, the speech controllable device 110 may send (8180) the eighth device characteristic data to the system 120.

After receiving the eighth device characteristic data, the system 120 may store (8182) ninth updated skill configuration data representing a current configuration of the skill being generated. For example, the system 120 may store ninth updated skill configuration data including the eighth updated skill configuration data updated with the eighth device characteristic data, for example as illustrated in FIG. 9J.

In at least some embodiments, after the system 120 receives the eighth device characteristic data or after the system 120 stores the ninth updated skill configuration data, the system 120 may determine audio data (e.g., corresponding to a sound) indicating the emotion skill portion device 130g has been connected to the yes/no skill portion device 130d. The system 120 may send the audio data to the speech controllable device 110, and the speech controllable device 110 may output audio (e.g., the sound) corresponding to the audio data.

In at least some embodiments, the system 120 may cause the speech controllable device 110 to output audio (e.g., a sound) representing the system 120 is waiting to receive the eighth device characteristic data. The system 120 may cause the speech controllable device 110 to output such audio from when the speech controllable device 110 has finished outputting the tenth content, until the system 120 has received the eighth device characteristic data (or has stored the ninth updated skill configuration data). For example, the system 120 may send, to the speech controllable device 110, audio data (e.g., corresponding to the sound representing the system 120 is waiting to receive the eighth device characteristic data) and a directive to start outputting audio (corresponding to the audio data) once the speech controllable device 110 has finished outputting the tenth content. Thereafter, when the system 120 either receives the eighth device characteristic data or stores the ninth updated skill configuration data, the system 120 may send, to the speech controllable device 110, another directive to cease outputting the audio.

After storing the ninth updated skill configuration data, the system 120 may determine (8184) eleventh output data associated with the device type represented in the eighth device characteristic data. For example, since the eighth device characteristic data includes a device type of "emotion," the system 120 may determine eleventh output data corresponding to the natural language "This is an emotion device. Turn the dial to select between the different choices."

The system 120 may send (8186) the eleventh output data to the speech controllable device 110, and the speech controllable device 110 may output (8188) eleventh content corresponding to the eleventh output data. In at least some embodiments, the eleventh output data may include natural language text data, and the speech controllable device 110 may display natural language text corresponding to the natural language text data. In at least some embodiments, the eleventh output data may include audio data including synthesized speech, and the speech controllable device 110 may output audio corresponding to the synthesized speech. In at least some embodiments, the eleventh output data may include natural language text data and audio data including synthesized speech. In such embodiments, the speech controllable device 110 may display natural language text corresponding to the natural language text data, and output audio corresponding to the synthesized speech.

After the speech controllable device 110 outputs the eleventh content, the user 5 may turn a dial (of the emotion skill portion device 130g) to a specific position corresponding to a specific emotion (e.g., "achoo," "ack," "yahoo," or the like). In response, the emotion skill portion device 130g may output via the bus (and the start skill portion device 130a may receive (8190), via the bus) ninth device characteristic data. In at least some embodiments, the ninth device characteristic data may be represented in JSON. A JSON representation of the ninth device characteristic data may include a payload including an "id" field having a value corresponding to a device identifier of the emotion skill portion device 130g, a "type" field having a value of "sound effect," a "parent" field having a value corresponding to a device identifier of the yes/no skill portion device 130d, a "direction" field having a value of "left" or "west," and a "position field" having a value corresponding to the new position of the dial. In at least some embodiments, the position field value may be an integer.

The start skill portion device 130a sends (8192) the ninth device characteristic data to the speech controllable device 110. For example, the start skill portion device 130a may send the ninth device characteristic data (to the speech controllable device 110) using Bluetooth Classic, Bluetooth LE, or some other wireless communication protocol. In turn, the speech controllable device 110 may send (8194) the ninth device characteristic data to the system 120.

After receiving the ninth device characteristic data, the system 120 may store (8196) tenth updated skill configuration data representing a current configuration of the skill being generated. For example, the system 120 may store tenth updated skill configuration data including the ninth updated skill configuration data updated with the position of the dial of the emotion skill portion device 130g, for example as illustrated in FIG. 9K.

After storing the tenth updated skill configuration data, the system 120 may determine (8198) the skill has been configured according to the template data. As a result, the system 120 may associate (8200) the skill's identifier with profile data corresponding to the user 5 and/or the speech controllable device 110. Such association may enable the skill to be invoked at runtime. Moreover, in response to the determining the skill has been configured, the system 120 may cause the speech controllable device 110 to output synthesized speech, and/or display natural language text, corresponding to "Good job. We have finished building the animal trivia skill. I'll save this as animal trivia in your profile."

In at least some embodiments, the system 120 may cause the speech controllable device 110 to output content (e.g., synthesized speech and/or natural language text) asking the user 5 to provide a name for a completed skill. The user 5 may provide the name by speaking the name or typing the name. In response, the speech controllable device 110 may send audio data (representing the spoken name) or text data (representing the typed name) to the system 120. The system 120 may thereafter associate data (corresponding to the spoken or typed name) with the skill identifier (e.g., in the profile data). Such enables the skill to be invoked at runtime using the spoken or typed name.

In at least some instances, the user 5 may connect a wrong skill portion device. For example, the user 5 may have been prompted to connect a speech skill portion device by the user 5 may have connected a yes/no skill portion device. The system 120 may be configured to confirm the device type (represented in received device configuration data) corresponds to a device type represented in a portion of the template data with respect to which the skill is presently being configured. If the device types do not match, the system 120 may output data (and the speech controllable device 110 may output content) corresponding to "That was the wrong device, you are looking for [description of face of intended skill portion device]."

In at least some embodiments, the functionality, described as being provided by the system 120 herein, may be provided by a skill.

The foregoing describes an example use case in which a skill may be configured in a guided manner. The present disclosure also envisions situations in which a skill may be configured in an unguided manner. In such embodiments, the user 5 may choose (without direction from the system 120) which skill portion device to connect to the start skill portion device 130a (or some other already connected skill portion device). In such embodiments, the start skill portion device 130a, the speech controllable device 110, and the system 120 may process as described herein above with respect to FIGS. 8A-8N, except the system 120 and the speech controllable device 110 may not output data/content suggesting to the user 5 which skill portion device to connect next.

In situations in which the user 5 is configuring a skill in an unguided manner, the user 5 may indicate the skill is done being configured in a variety of manners. For example, the user 5 may actuate a button on the start skill portion device 130a, with such actuation indicating the skill is done being configured. In such example, the start skill portion device 130a may send data (representing the actuation) to the speech controllable device 110, the speech controllable device 110 may send the data to the system 120, and the system 120 may (in response to receiving the data) associate the skill identifier with profile data corresponding to the user 5 and/or the speech controllable device 110. For further example, the user 5 may speak a natural language input indicating the skill is done being configured. In such example, the speech controllable device 110 may send audio data (corresponding to the spoken natural language input) to the system 120, the system 120 may perform ASR processing and NLU processing (or SLU processing) to generate NLU output data representing the skill is finished being configured, and thereafter the system 120 may associate the skill identifier with profile data corresponding to the user 5 and/or the speech controllable device 110. In another example, the user 5 may connect a "stop" skill portion device to the already connected skill portion devices. In such example, the start skill portion device 130a may send device characteristic data (representing the stop skill portion device) to the speech controllable device 110, the speech controllable device 110 may send the device characteristic data to the system 120, the system 120 may determine the device identifier (in the device characteristic data) corresponds to a "stop" device type, and based thereon the system 120 may associate the skill identifier with profile data corresponding to the user 5 and/or the speech controllable device 110.

As described above, the system 120 may store updated skill configuration data as the user 5 connects new skill portion devices 130. In at least some instances, the user 5 may remove one or more already connected skill portion devices 130 while the user 5 is configuring a skill. In such instances, the start skill portion device 130a may determine the device identifier(s) of the skill portion device(s) that was disconnected from the data bus, and may send the device identifier(s) to the speech controllable device 110. The speech controllable device 110 may send the device identifier(s) to the system 120. The system 120 may generate updated skill configuration data to no longer include portions corresponding to the device identifiers. Moreover, the system 120 may send a directive to the speech controllable device 110, in response to which the speech controllable device 110 may output audio of a sound representing one or more skill portion devices have been disconnected from the data bus.

In at least some embodiments, skills (configured according to the teachings herein) may be implemented (at runtime) using a single skill. In at least some other embodiments, each skill (configured according to the teachings herein) may be implemented as a separate skill.

In at least some embodiments, user experiences of the present disclosure may occur with the use of a computer screen. In at least some other embodiments, a computer screen may be used to augment the user's experience. For example, an application on a smart phone, tablet, or the like may be used to provide an augmented reality experience. For example, a display (of the device implementing the application) may display how skill portion devices 130 should be connected to configure a particular skill. A camera of (or associated with) the device may be used to capture a video stream of physically connected devices. The display of the device may be altered as skill portion devices are connected. For example, the display may illustrate a green overlay over correctly connected skill portion devices, and a red overlay over an incorrectly connected skill portion device.

The above describes illustrative skill portion device configurations and corresponding processing to generate a skill. As described above, the skill portion devices may be physically connected to each other. However, the present disclosure is not limited thereto. For example, the skill portion devices may be positioned proximate to one another such that the skill portion devices may detect one another using beacons or other technology. The skill portion devices may include components (e.g., chips) that enable the skill portion devices to perform directional Bluetooth LE or other wireless data transmissions. For the example of FIGS. 7A-7F, the start skill portion device 130a may wirelessly detect the voice changer skill portion device 130f; the voice changer skill portion device 130f may wirelessly detect the start skill portion device 130a and the speech skill portion device 130b; the speech skill portion device 130b may wirelessly detect the voice changer skill portion device 130f and the question skill portion device 130c; the question skill portion device 130c may wirelessly detect the speech skill portion device 130d and the yes/no skill portion device 130d, the yes/no skill portion device 130d may wirelessly detect the question skill portion device 130c, the sound effect skill portion device 130e, and the emotion skill portion device 130g; the sound effect skill portion device 130e may wirelessly detect the yes/no skill portion device 130d; and the emotion skill portion device 130g may wirelessly detect the yes/no skill portion device 130d. While the skill portion devices may not be physically connected, the processing described with respect to FIGS. 8A-8N may still be performed. However, the way in which the start skill portion device 130a detects a newly added skill portion device and requests device characteristics data may be altered to work in the wireless communication context.

The system 100 may operate using various components as illustrated in FIG. 10. The various components may be located on a same or different physical devices. Communication between various components may occur directly or across a network(s) 199.

A microphone or array of microphones (of or otherwise associated with the speech controllable device 110) may capture audio 11. The speech controllable device 110 processes audio data, representing the audio 11, to determine whether speech is detected. The speech controllable device 110 may use various techniques to determine whether audio data includes speech. In some examples, the speech controllable device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the speech controllable device 110 may implement a classifier configured to distinguish speech from background noise. The classifier may be implemented by techniques such as linear classifiers, support vector machines, and decision trees. In still other examples, the speech controllable device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the speech controllable device 110 may determine if the speech is directed at the speech controllable device 110/system 120. In at least some embodiments, such determination may be made using a wakeword detection component 1020. The wakeword detection component 1020 may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 1020 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 1020 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component 1020 detects a wakeword, the speech controllable device 110 may "wake" and begin transmitting audio data 1011, representing the audio 11, to the system 120. The audio data 1011 may include data corresponding to the detected wakeword, or the speech controllable device 110 may remove the portion of the audio corresponding to the detected wakeword prior to sending the audio data 1011 to the system 120.

The system 120 may include an orchestrator component 1030 configured to, among other things, coordinate data transmissions between components of the system 120. The orchestrator component 1030 may receive the audio data 1011 from the speech controllable device 110, and send the audio data 1011 to an ASR component 1050.

The ASR component 1050 transcribes the audio data 1011 into ASR output data including one or more ASR hypotheses. An ASR hypothesis may be configured as a textual interpretation of the speech, or may be configured in another manner, such as one or more tokens. Each ASR hypothesis may represent a different likely interpretation of the speech in the audio data 1011. Each ASR hypothesis may be associated with a score representing a confidence of ASR processing performed to determine the ASR hypothesis with which the score is associated.

The ASR component 1050 interprets the speech in the audio data 1011 based on a similarity between the audio data 1011 and pre-established language models. For example, the ASR component 1050 may compare the audio data 1011 with models for sounds (e.g., subword units, such as phonemes, etc.) and sequences of sounds to identify words that match the sequence of sounds of the speech represented in the audio data 1011.

In at least some instances, instead of the speech controllable device 110 receiving audio 11, the speech controllable device 110 may receive a text-based (e.g., typed) natural language input. The speech controllable device 110 may determine text data 913 representing the typed natural language input, and may send the text data 913 to the system 120, wherein the text data 913 is received by the orchestrator component 1030. The orchestrator component 1030 may send the text data 913 or ASR output data output, depending on the type of natural language input received, to a NLU component 1060.

The NLU component 1060 processes the ASR output data or text data to determine one or more NLU hypotheses embodied in NLU output data. The NLU component 1060 may perform intent classification (IC) processing on the ASR output data or text data to determine an intent of the natural language user input. An intent corresponds to an action to be performed that is responsive to the natural language user input. To perform IC processing, the NLU component 1060 may communicate with a database of words linked to intents. For example, a music intent database may link words and phrases such as "quiet," "volume off," and "mute" to a <Mute> intent. The NLU component 1060 identifies potential intents by comparing words and phrases in ASR output data or text data to the words and phrases in an intents database. In at least some embodiments, the NLU component 1060 may communicate with multiple intents databases, with each intents database corresponding to one or more intents associated with a particular skill.

For example, IC processing of the natural language user input "play my workout playlist" may determine an intent of <PlayMusic>. For further example, IC processing of the natural language user input "call mom" may determine an intent of <Call>. In another example, IC processing of the natural language user input "call mom using video" may determine an intent of <VideoCall>. In yet another example, IC processing of the natural language user input "what is today's weather" may determine an intent of <OutputWeather>.

The NLU component 1060 may also perform named entity recognition (NER) processing on the ASR output data or text data to determine one or more portions (which may be referred to as one or more slots) of the natural language user input that may be needed for post-NLU processing (e.g., processing performed by a skill). For example, NER processing of the natural language user input "play [song name]" may determine a slot corresponding to "SongName: [song name]." For further example, NER processing of the natural language user input "call mom" may determine a slot corresponding to "Recipient: Mom." In another example, NER processing of the natural language user input "what is today's weather" may determine a slot corresponding to "Date: Today."

In at least some embodiments, the intents identifiable by the NLU component 1060 may be linked to one or more grammar frameworks with "slots" to be filled. Each slot of a grammar framework corresponds to a portion of ASR output data or text data that the NLU component 1060 believes corresponds to an entity. For example, a grammar framework corresponding to a <PlayMusic> intent may correspond to sentence structures such as "Play {Artist Name}," "Play {Album Name}," "Play {Song name}," "Play {Song name} by {Artist Name}," etc.

For example, the NLU component 1060 may perform NER processing to identify words in ASR output data or text data as subject, object, verb, preposition, etc. based on grammar rules and/or models. Then, the NLU component 1060 may perform IC processing that involves using the identified verb to identify an intent. Thereafter, the NLU component 1060 may again perform NER processing to determine a grammar model associated with the identified intent. For example, a grammar model for a <PlayMusic> intent may specify a list of slots applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data or text data using heuristic grammar rules, or a model may be constructed using techniques such as hidden Markov models, maximum entropy models, log linear models, conditional random fields (CRF), and the like. For example, NER processing with respect to a music skill may include parsing and tagging ASR output data or text data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill, which IC processing determines corresponds to a <PlayMusic> intent.

The NLU component 1060 may generate NLU output data including one or more NLU hypotheses, with each NLU hypothesis including the intent and slot(s) determined from IC processing and NER processing of the ASR output data or text data. In at least some embodiments, the NLU component 1060 may perform IC processing and NLU processing with respect to different skills. One skill may support the same or different intents than another skill. Thus, the NLU output data may include multiple NLU hypotheses, with each NLU hypothesis corresponding to IC processing and NER processing performed on the ASR output or text data with respect to a different skill.

As described above, the system 120 may perform speech processing using two different components (e.g., the ASR component 1050 and the NLU component 1060). In at least some embodiments, the system 120 may implement a spoken language understanding (SLU) component 1055 configured to process audio data 1011 to determine NLU output data.

The SLU component 1055 may be equivalent to a combination of the ASR component 1050 and the NLU component 1060. Yet, the SLU component 1055 may process audio data 1011 and directly determine the NLU output data, without an intermediate step of generating ASR output data. As such, the SLU component 1055 may take audio data 1011 representing speech and attempt to make a semantic interpretation of the speech. That is, the SLU component 1055 may determine a meaning associated with the speech and then implement that meaning. For example, the SLU component 1055 may interpret audio data 1011 representing speech from the user 5 in order to derive a desired action. The SLU component 1055 may output a most likely NLU hypothesis, or multiple NLU hypotheses associated with respective confidence or other scores (such as probability scores, etc.).

The NLU component 1060 (or the SLU component 1055 depending on configuration of the system 120) may send the NLU output data to the orchestrator component 1030. The orchestrator component 1030 may send the NLU output data to a skill.

The system 120 may include or otherwise communicate with one or more skill components 1025. A skill component 1025 may be configured to execute with respect to NLU output data. For example, for an NLU hypothesis including a <GetWeather> intent, the system 120 (and more particularly the orchestrator component 1030) may invoke a weather skill component to determine and output weather information for a geographic location represented in a user profile or corresponding to a location of the speech controllable device 110 that captured the corresponding natural language input. For further example, for an NLU hypothesis including a <BookRide> intent, the system 120 (and more particularly the orchestrator component 1030) may invoke a taxi skill component to book a requested ride. In another example, for an NLU hypothesis including a <BuyPizza> intent, the system 120 (and more particularly the orchestrator component 1030) may invoke a restaurant skill component to place an order for a pizza. A skill component 1025 may operate in conjunction between the system 120 and other devices, such as the speech controllable device 110, restaurant electronic ordering systems, taxi electronic booking systems, etc. in order to complete certain functions. Inputs to a skill component 1025 may come from speech processing interactions or through other interactions or input sources.

A skill component 1025 may be associated with a domain, a non-limiting list of which includes a smart home domain, a music domain, a video domain, a weather domain, a communications domain, a flash briefing domain, a shopping domain, and a custom domain.

The system 120 may include a TTS component 1080 that determine audio data (e.g., synthesized speech) from text data using one or more different methods. Text data input to the TTS component 1080 may come from a skill, the orchestrator component 1030, or another component of the system 120.

In one method of synthesis called unit selection, the TTS component 1080 matches text data against a database of recorded speech. The TTS component 1080 selects matching units of recorded speech and concatenates the units together to form audio data. In another method of synthesis called parametric synthesis, the TTS component 1080 varies parameters such as frequency, volume, and noise to determine audio data including an artificial speech waveform. Parametric synthesis uses a computerized voice generator, sometimes called a vocoder.

The system 120 may include a user recognition component 1095. The user recognition component 1095 may recognize one or more users using various data. The user recognition component 1095 may take as input the audio data 1011. The user recognition component 1095 may perform user recognition by comparing speech characteristics, in the audio data 1011, to stored speech characteristics of users (e.g., stored speech characteristics associated with user profile identifiers associated with the speech controllable device 110 that determined the audio data 1011). The user recognition component 1095 may additionally or alternatively perform user recognition by comparing biometric data (e.g., fingerprint data, iris data, retina data, etc.), received by the system 120 in correlation with a natural language input, to stored biometric data of users (e.g., stored biometric data associated with user profile identifiers associated with the speech controllable device 110 that determined the audio data 1011 or otherwise captured a user input). The user recognition component 1095 may additionally or alternatively perform user recognition by comparing image data (e.g., including a representation of at least a feature of a user), received by the system 120 in correlation with a natural language input, with stored image data including representations of features of different users (e.g., stored image data associated with user profile identifiers associated with the speech controllable device 110 that determined the audio data 1011 or otherwise captured a user input). The user recognition component 1095 may perform other or additional user recognition processes, including those known in the art. For a particular user input, the user recognition component 1095 may perform processing with respect to stored data of users associated with the speech controllable device 110 that captured the user input.

The user recognition component 1095 determines whether a user input originated from a particular user. For example, the user recognition component 1095 may determine a first value representing a likelihood that a user input originated from a first user, a second value representing a likelihood that user input originated from a second user, etc. The user recognition component 1095 may also determine an overall confidence regarding the accuracy of user recognition processing.

The user recognition component 1095 may output a single user profile identifier corresponding to the most likely user that originated the user input. Alternatively, the user recognition component 1095 may output multiple user profile identifiers (e.g., in the form of an N-best list) with respective values representing likelihoods of respective users originating the user input. The output of the user recognition component 1095 may be used to inform NLU processing, processing performed by a skill, as well as processing performed by other components of the system 120 and/or other systems.

The system 120 may include profile storage 1070. The profile storage 1070 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; as well as other data.

The profile storage 1070 may include one or more user profiles. Each user profile may be associated with a different user profile identifier. Each user profile may include various user identifying data. Each user profile may also include preferences of the user. Each user profile may include one or more device identifiers, representing one or more devices registered to the user. Each user profile may include identifiers of skills that the user has enabled. When a user enables a skill, the user is providing the system 120 with permission to allow the skill to execute with respect to the user's natural language inputs. If a user does not enable a skill, the system 120 may not invoke the skill to execute with respect to the user's natural language inputs.

The profile storage 1070 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 1070 may include one or more device profiles. Each device profile may be associated with a different device identifier/device profile identifier. A device profile may include various device identifying data, input/output characteristics, networking characteristics, etc. A device profile may also include one or more user profile identifiers, corresponding to one or more user profiles associated with the device profile. For example, a household device's profile may include the user profile identifiers of users of the household.

The foregoing describes illustrative components and processing of the system 120. The following describes illustrative components and processing of the speech controllable device 110. As illustrated in FIG. 11, in at least some embodiments, the system 120 may receive the audio data 1011 from the speech controllable device 110, to recognize speech corresponding to a spoken input in the received audio data 1011, and to perform functions in response to the recognized speech. In at least some embodiments, these functions involve sending directives (e.g., commands), from the system 120 to the speech controllable device 110 (and/or other devices 110) to cause the speech controllable device 110 to perform an action, such as output an audible response to the spoken input via a loudspeaker(s), and/or control secondary devices in the environment by sending a control command to the secondary devices.

Thus, when the speech controllable device 110 is able to communicate with the system 120 over the network(s) 199, some or all of the functions capable of being performed by the system 120 may be performed by sending one or more directives over the network(s) 199 to the speech controllable device 110, which, in turn, may process the directive(s) and perform one or more corresponding actions. For example, the system 120, using a remote directive that is included in response data (e.g., a remote response), may instruct the speech controllable device 110 to output an audible response (e.g., using TTS processing performed by an on-device TTS component 1180) to a user's question via a loudspeaker(s) of (or otherwise associated with) the speech controllable device 110, to output content (e.g., music) via the loudspeaker(s) of (or otherwise associated with) the speech controllable device 110, to display content on a display of (or otherwise associated with) the speech controllable device 110, and/or to send a directive to a secondary device (e.g., a directive to turn on a smart light). It is to be appreciated that the system 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

As noted with respect to FIG. 10, the speech controllable device 110 may include a wakeword detection component 1020 configured to compare the audio data 1011 to stored models used to detect a wakeword (e.g., "Alexa") that indicates to the speech controllable device 110 that the audio data 1011 is to be processed for determining NLU output data (e.g., slot data that corresponds to a named entity, label data, and/or intent data, etc.). In at least some embodiments, a hybrid selector 1124, of the speech controllable device 110, may send the audio data 1011 to the wakeword detection component 1020. If the wakeword detection component 1020 detects a wakeword in the audio data 1011, the wakeword detection component 1020 may send an indication of such detection to the hybrid selector 1124. In response to receiving the indication, the hybrid selector 1124 may send the audio data 1011 to the system 120 and/or an on-device ASR component 1150. The wakeword detection component 1020 may also send an indication, to the hybrid selector 1124, representing a wakeword was not detected. In response to receiving such an indication, the hybrid selector 1124 may refrain from sending the audio data 1011 to the system 120, and may prevent the ASR component 1150 from further processing the audio data 1011. In this situation, the audio data 1011 can be discarded.

The speech controllable device 110 may conduct its own speech processing using on-device language processing components, such as an SLU component 1155 (the ASR component 1150 and an NLU 1160), similar to the manner discussed above with respect to the SLU component 1055 (or ASR component 1050 and the NLU component 1060) of the system 120. The speech controllable device 110 may also internally include, or otherwise have access to, other components such as one or more skill components 1125 capable of executing commands based on NLU output data or other results determined by the speech controllable device 110/system 120, a user recognition component 1195 (configured to process in a similar manner to that discussed above with respect to the user recognition component 1095 of the system 120), profile storage 1170 (configured to store similar profile data to that discussed above with respect to the profile storage 1070 of the system 120), and other components. In at least some embodiments, the profile storage 1170 may only store profile data for a user or group of users specifically associated with the speech controllable device 110.

In at least some embodiments, the on-device language processing components may not have the same capabilities as the language processing components of the system 120. For example, the on-device language processing components may be configured to handle only a subset of the natural language inputs that may be handled by the system 120. For example, such subset of natural language inputs may correspond to local-type natural language inputs, such as those controlling devices or components associated with a user's home. In such circumstances the on-device language processing components may be able to more quickly interpret and respond to a local-type natural language input, for example, than processing that involves the system 120. If the speech controllable device 110 attempts to process a natural language input for which the on-device language processing components are not necessarily best suited, the language processing results determined by the speech controllable device 110 may indicate a low confidence or other metric indicating that the processing by the speech controllable device 110 may not be as accurate as the processing done by the system 120.

The hybrid selector 1124, of the speech controllable device 110, may include a hybrid proxy (HP) 1126 configured to proxy traffic to/from the system 120. For example, the HP 1126 may be configured to send messages to/from a hybrid execution controller (HEC) 1127 of the hybrid selector 1124. For example, command/directive data received from the system 120 can be sent to the HEC 1127 using the HP 1126. The HP 1126 may also be configured to allow the audio data 1011 to pass to the system 120 while also receiving (e.g., intercepting) this audio data 1011 and sending the audio data 1011 to the HEC 1127.

In at least some embodiments, the hybrid selector 1124 may further include a local request orchestrator (LRO) 1128 configured to notify the ASR component 1150 about the availability of new audio data 1011 that represents user speech, and to otherwise initiate the operations of on-device language processing when new audio data 1011 becomes available. In general, the hybrid selector 1124 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the speech controllable device 110 receives directive data from the system 120 and chooses to use that remotely-determined directive data.

Thus, when the audio data 1011 is received, the HP 1126 may allow the audio data 1011 to pass through to the system 120 and the HP 1126 may also input the audio data 1011 to the on-device ASR component 1150 by routing the audio data 1011 through the HEC 1127 of the hybrid selector 1124, whereby the LRO 1128 notifies the ASR component 1150 of the audio data 1011. At this point, the hybrid selector 1124 may wait for response data from either or both of the system 120 or the on-device language processing components. However, the disclosure is not limited thereto, and in some examples the hybrid selector 1124 may send the audio data 1011 only to the on-device ASR component 1150 without departing from the disclosure. For example, the speech controllable device 110 may process the audio data 1011 on-device without sending the audio data 1011 to the system 120.

The on-device ASR component 1150 is configured to receive the audio data 1011 from the hybrid selector 1124, and to recognize speech in the audio data 1011, and the on-device NLU component 1160 is configured to determine a user intent from the recognized speech, and to determine how to act on the user intent by generating NLU output data which may include directive data (e.g., instructing a component to perform an action). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic API call with a same logical operation as a remotely-determined directive. In other words, a device-determined directive may mimic a remotely-determined directive by using a same, or a similar, format as the remotely-determined directive.

A NLU hypothesis (output by the NLU component 1160) may be selected as usable to respond to a natural language input, and local response data may be sent (e.g., local NLU output data, local knowledge base information, internet search results, and/or local directive data) to the hybrid selector 1124, such as a "ReadyToExecute" response. The hybrid selector 1124 may then determine whether to use directive data from the on-device components to respond to the natural language input, to use directive data received from the system 120, assuming a remote response is even received (e.g., when the speech controllable device 110 is able to access the system 120 over the network(s) 199), or to determine output audio requesting additional information from the user 5.

The speech controllable device 110 and/or the system 120 may associate a unique identifier with each natural language input. The speech controllable device 110 may include the unique identifier when sending the audio data 1011 to the system 120, and the response data from the system 120 may include the unique identifier to identify which natural language input the response data corresponds.

In at least some embodiments, the speech controllable device 110 may include, or be configured to use, one or more skill components 1125 that may work similarly to the skill component(s) 1025. The skill component(s) 1125 may correspond to one or more domains that are used in order to determine how to act on a spoken input in a particular way, such as by outputting a directive that corresponds to the determined intent, and which can be processed to implement the desired operation. The skill component(s) 1125 installed on (or in communication with) the speech controllable device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

In at least some embodiments, some or all of the functionality, described herein as being provided by the system 120, may instead by provided by the speech controllable device 110.

Figure 12:
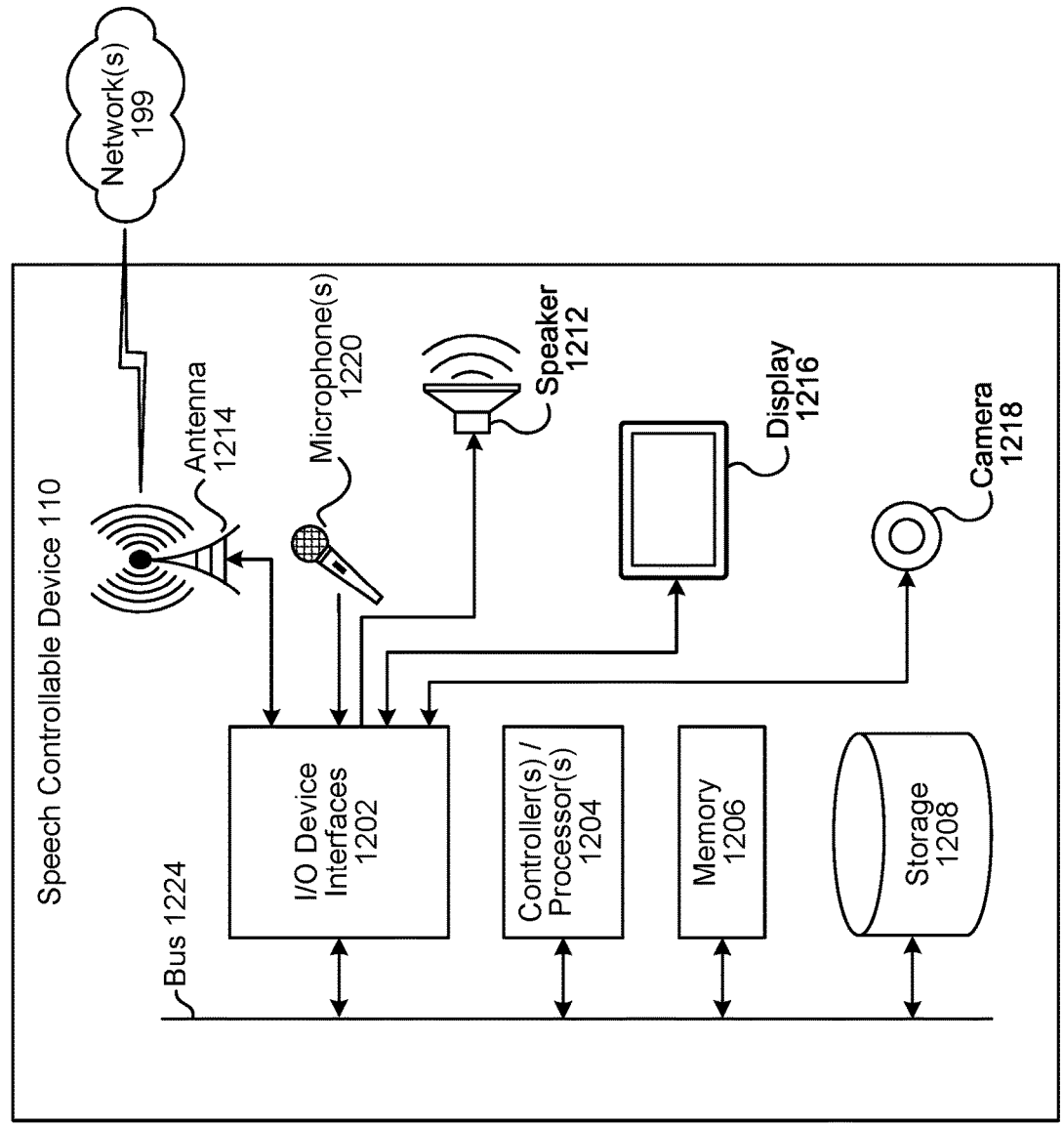
FIG. 12 is a block diagram conceptually illustrating example components of a device, according to embodiments of the present disclosure.
Figure 13:
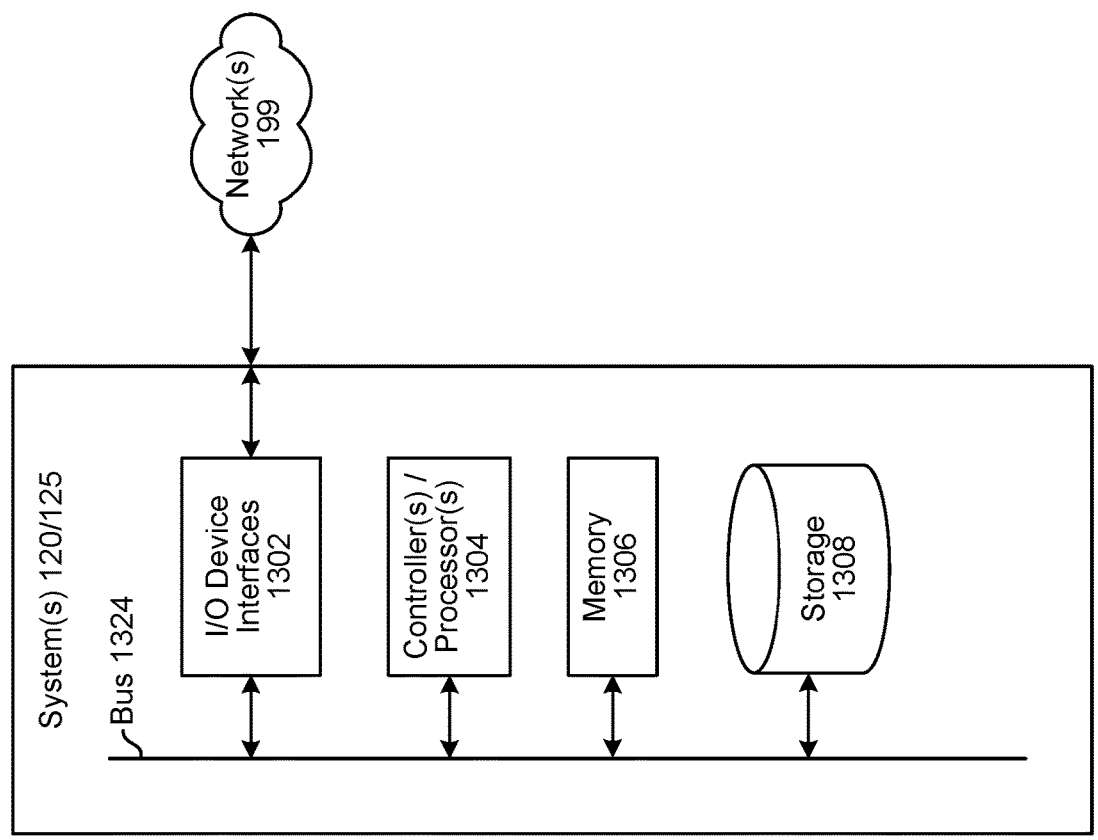
FIG. 13 is a block diagram conceptually illustrating example components of a system, according to embodiments of the present disclosure.

FIG. 12 is a block diagram conceptually illustrating a speech controllable device 110 that may be used with the system 120. FIG. 13 is a block diagram conceptually illustrating example components of a remote device, such as the system 120, which may assist with ASR processing, NLU processing, etc.; and a skill component 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the system 100 of the present disclosure, such as one or more systems 120 for performing ASR processing, one or more systems 120 for performing NLU processing, and one or more skill component 125, etc. In operation, each of these systems may include computer-readable and computer-executable instructions that reside on the respective device (120/125), as will be discussed further below.

Each of these devices (110/120/125) may include one or more controllers/processors (1204/1304), which may each include a central processing unit (CPU) for processing data and computer-readable instructions, and a memory (1206/1306) for storing data and instructions of the respective device. The memories (1206/1306) may individually include volatile random access memory (RAM), non-volatile read only memory (ROM), non-volatile magnetoresistive memory (MRAM), and/or other types of memory. Each device (110/120/125) may also include a data storage component (1208/1308) for storing data and controller/processor-executable instructions. Each data storage component (1208/1308) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1202/1302).

Computer instructions for operating each device (110/120/125) and its various components may be executed by the respective device's controller(s)/processor(s) (1204/1304), using the memory (1206/1306) as temporary "working" storage at runtime. A device's computer instructions may be stored in a non-transitory manner in non-volatile memory (1206/1306), storage (1208/1308), or an external device(s). Alternatively, some or all of the executable instructions may be embedded in hardware or firmware on the respective device in addition to or instead of software.

Each device (110/120/125) includes input/output device interfaces (1202/1302). A variety of components may be connected through the input/output device interfaces (1202/1302), as will be discussed further below. Additionally, each device (110/120/125) may include an address/data bus (1224/1324) for conveying data among components of the respective device. Each component within a device (110/120/125) may also be directly connected to other components in addition to (or instead of) being connected to other components across the bus (1224/1324).

Referring to FIG. 12, the speech controllable device 110 may include input/output device interfaces 1202 that connect to a variety of components such as an audio output component such as a speaker 1212, a wired headset or a wireless headset (not illustrated), or other component capable of outputting audio. The speech controllable device 110 may also include an audio capture component. The audio capture component may be, for example, a microphone 1220 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The speech controllable device 110 may additionally include a display 1216 for displaying content. The speech controllable device 110 may further include a camera 1218.

Via antenna(s) 1214, the input/output device interfaces 1202 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1202/1302) may also include communication components that allow data to be exchanged between devices such as different physical servers in a collection of servers or other components.

The components of the speech controllable device 110, the system 120, and/or a skill component may include their own dedicated processors, memory, and/or storage. Alternatively, one or more of the components of the speech controllable device 110, the system 120, and/or a skill component 125 may utilize the I/O interfaces (1202/1302), processor(s) (1204/1304), memory (1206/1306), and/or storage (1208/1308) of the speech controllable device(s) 110, system 120, or the skill component 125, respectively. Thus, the ASR component 1050 may have its own I/O interface(s), processor(s), memory, and/or storage; the NLU component 1060 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the speech controllable device 110, the system 120, and a skill component 125, as described herein, are illustrative, and may be located as a stand-alone device or may be included, in whole or in part, as a component of a larger device or system.

As illustrated in FIG. 14, multiple devices (110a-110j, 120) may contain components of the system and the devices may be connected over a network(s) 199. The network(s) 199 may include a local or private network or may include a wide network such as the Internet. Devices may be connected to the network(s) 199 through either wired or wireless connections. For example, a speech-controllable device 110a, a smart phone 110b, a smart watch 110c, a tablet computer 110d, a vehicle 110e, a speech-controllable display device 110f, a smart television 110g, a washer/dryer 110h, a refrigerator 110i, and/or a microwave 110j may be connected to the network(s) 199 through a wireless service provider, over a Wi-Fi or cellular network connection, or the like. Other devices are included as network-connected support devices, such as the system 120, the skill component(s), and/or others. The support devices may connect to the network(s) 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving a first device identifier corresponding to a first device associated with user profile data;
receiving a second device identifier corresponding to a second device physically connected to the first device;
determining the second device identifier is associated with a device type;
determining the device type is associated with first data prompting input of speech corresponding to an introduction portion of computing functionality;
processing the first data to generate first audio data including first synthesized speech corresponding to the first data;
sending the first audio data to a first voice controllable device for output;
after sending the first audio data, receiving, from the first voice controllable device, second audio data corresponding to a first spoken input corresponding to the introduction portion;
after receiving the second audio data, receiving, from the first voice controllable device, second data representing the computing functionality is to be generated; and
after receiving the second data, storing third data associating the user profile data with a first identifier corresponding to the computing functionality.

2. The computer-implemented method of claim 1, further comprising:
receiving, from the first device, third data representing the second device identifier, the device type, and an input field corresponding to the first device identifier; and
storing fourth data associating the first identifier with the third data.

3. The computer-implemented method of claim 2, further comprising:
after receiving the second audio data, receiving fourth data representing a button of the second device has been pressed;
based on receiving the fourth data, representing portion of the fourth data corresponding to the first spoken input;
processing the portion of the fourth data to generate third audio data including second synthesized speech corresponding to the first spoken input; and
sending the third audio data to the first voice controllable device for output.

4. The computer-implemented method of claim 2, further comprising:
after storing the fourth data, receiving fifth data representing the second device has been disconnected from the first device; and
based on receiving the fifth data, deleting the third data from the fourth data, wherein deleting the third data removes the introduction portion from the computing functionality.

5. A computer-implemented method comprising:
determining a first device has been located in a physical position with respect to a second device;
determining a first device identifier corresponding to the first device;
determining a second device identifier corresponding to the second device;
determining a device type of the first device;
storing first data associating the first device identifier, the device type, the second device identifier, and second data representing the first device is located in the physical position with respect to the second device;
storing third data corresponding to a processing component configured to include a first type of computing functionality associated with the device type;
after storing the third data, receiving fourth data representing a user input;
causing the processing component to perform the first type of computing functionality with respect to the user input; and
determining a response to the user input based at least in part on the processing component performing the first type of computing functionality with respect to the user input.

6. The computer-implemented method of claim 5, further comprising:
after storing the third data, outputting a prompt for input speech corresponding to the first type of computing functionality; and
after outputting the prompt, receiving first audio data corresponding to a first spoken input corresponding to the first type of computing functionality.

7. The computer-implemented method of claim 6, further comprising:
after receiving the first audio data, receiving fourth fifth data representing a button of the first device has been actuated;
based on receiving the fifth data, generating second audio data including synthesized speech corresponding to the first spoken input; and
outputting the synthesized speech.

8. The computer-implemented method of claim 6, further comprising:
performing automatic speech recognition (ASR) processing on the first audio data to generate ASR output data representing the first spoken input;
performing text-to-speech (US) processing on the ASR output data to generate second audio data including synthesized speech;
generating third audio data prompting input of speech confirming the synthesized speech corresponds to the first spoken input;
outputting the second audio data;
outputting the third audio data;
after outputting the second audio data and the third audio data, receiving fourth audio data corresponding to a second spoken input;

processing the fourth audio data to determine the second spoken input indicates the synthesized speech corresponds to the first spoken input; and after processing the fourth audio data, storing fifth data associating the ASR output data with a device identifier corresponding to the first device.

9. The computer-implemented method of claim 5, further comprising:

after storing the third data, receiving fifth data representing the second device has been moved away from the first device; and based on receiving the fifth data, storing sixth data corresponding to the processing component configured to no longer include the first type of computing functionality.

10. The computer-implemented method of claim 5, wherein the physical position of the first device with respect to the second device configures a voice user interface (VUI) of the processing component.

11. The computer-implemented method of claim 5,
wherein the second data further represents a first input/output (I/O) interface of the first device is physically connected to a second I/O interface of the second device.

12. A computing system comprising:
at least one processor; and
at least one memory comprising instructions that, when executed by the at least one processor, cause the computing system to:
determine a first device has been located in a physical position with respect to a second device;
determine a first device identifier corresponding to the first device;
determine a second device identifier corresponding to the second device;
determine a device type of the first device;
store first data associating the first device identifier, the device type, the second device identifier, and second data representing the second device is located in the physical position with respect to the second device;
store third data corresponding to a processing component configured to include a first type of computing functionality associated with the device type;
after storing the third data, receive fourth data representing a user input;
cause the processing component to perform the first type of computing functionality with respect to the user input; and
determine a response to the user input based at least in part on the processing component performing the first type of computing functionality with respect to the user input.

13. The computing system of claim 12, wherein the at least one memory further comprises instructions that, when executed by the at least one processor, further cause the computing system to:
after storing the third data, output a prompt for input speech corresponding to the first type of the computing functionality; and after outputting the prompt, receive first audio data corresponding to a first spoken input corresponding to the first type of the computing functionality.

14. The computing system of claim 13, wherein the at least one memory further comprises instructions that, when executed by the at least one processor, further cause the computing system to:
after receiving the first audio data, receive fifth data representing a button of the first device has been actuated;
based on receiving the fifth data, generate second audio data including synthesized speech corresponding to the first spoken input; and
output the synthesized speech.

15. The computing system of claim 13, wherein the at least one memory further comprises instructions that, when executed by the at least one processor, further cause the computing system to:
perform automatic speech recognition (ASR) processing on the first audio data to generate ASR output data representing the first spoken input;
perform text-to-speech (TTS) processing on the ASR output data to generate second audio data including synthesized speech;
generate third audio data prompting input of speech confirming the synthesized speech corresponds to the first spoken input;
output the second audio data;
output the third audio data;
after outputting the second audio data and the third audio data, receive fourth audio data corresponding to a second spoken input;
process the fourth audio data to determine the second spoken input indicates the synthesized speech corresponds to the first spoken input; and
after processing the fourth audio data, store fifth data associating the ASR output data with a device identifier corresponding to the first device.

16. The computing system of claim 12, wherein the at least one memory further comprises instructions that, when executed by the at least one processor, further cause the computing system to:
after storing the third data, receive fifth data representing the second device has been moved away from the first device; and
based on receiving the fifth data, store sixth data corresponding to the processing component configured to no longer include the first type of computing functionality.

17. The computing system of claim 12, wherein the physical position of the first device with respect to the second device configures a voice user interface (VUI) of the processing component.

18. The computing system of claim 12, wherein
the second data further represent a first input/output (I/O) interface of the first device is physically connected to a second I/O interface of the second device.

* * * * *